United States Patent
Komoto et al.

(10) Patent No.: US 8,390,696 B2
(45) Date of Patent: Mar. 5, 2013

(54) APPARATUS FOR DETECTING DIRECTION OF IMAGE PICKUP DEVICE AND MOVING BODY COMPRISING SAME

(75) Inventors: Ayako Komoto, Osaka (JP); Katsuhiro Kanamori, Nara (JP); Satoshi Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 289 days.

(21) Appl. No.: 12/935,321

(22) PCT Filed: Dec. 18, 2009

(86) PCT No.: PCT/JP2009/007034
§ 371 (c)(1),
(2), (4) Date: Sep. 29, 2010

(87) PCT Pub. No.: WO2010/079557
PCT Pub. Date: Jul. 15, 2010

(65) Prior Publication Data
US 2011/0018990 A1      Jan. 27, 2011

(30) Foreign Application Priority Data
Jan. 6, 2009    (JP) .................................. 2009-001074

(51) Int. Cl.
*H04N 5/228* (2006.01)
(52) U.S. Cl. ................................. 348/222.1; 348/221.1
(58) Field of Classification Search .......................... None
See application file for complete search history.

(56) References Cited

U.S. PATENT DOCUMENTS

| 5,028,138 A | * | 7/1991 | Wolff ............................ 356/369 |
| 5,052,799 A | | 10/1991 | Sasser et al. |
| 5,424,535 A | | 6/1995 | Albion et al. |
| 2006/0239584 A1 | * | 10/2006 | Motomura et al. ........... 382/274 |

(Continued)

FOREIGN PATENT DOCUMENTS

| CN | 101 149 390 A | 3/2008 |
| JP | 08-160507 | 6/1996 |

(Continued)

OTHER PUBLICATIONS

International Search Report for corresponding International Application No. PCT/JP2009/007034 mailed Mar. 16, 2010.

(Continued)

*Primary Examiner* — Nelson D. Hernández Hernández
(74) *Attorney, Agent, or Firm* — Renner, Otto, Boisselle & Sklar, LLP

(57) ABSTRACT

A polarization camera that can capture polarization images and a color image at the same time is used. Specifically, a clear sky polarization image, which provides information about the polarization of a part of the sky, is captured by a clear sky polarization image capturing section 100. And by reference to the information provided by a sun position determining section 1301 that determines the sun's position at the time of shooting, a camera direction estimating section 101 determines in what direction and in what area of the whole sky the clear sky polarization image is located as a polarization pattern. Finally, information about what direction or orientation on the globe the camera (image capture device) is now facing is output. In this manner, the direction of the camera and the relative position of the camera with respect to the sun can be known without providing a sensor separately and without capturing the whole sky or the sun.

25 Claims, 55 Drawing Sheets

U.S. PATENT DOCUMENTS

| | | | |
|---|---|---|---|
| 2007/0092132 A1* | 4/2007 | Sato et al. | 382/154 |
| 2007/0222781 A1* | 9/2007 | Kondo et al. | 345/426 |
| 2009/0135183 A1* | 5/2009 | Sato et al. | 345/426 |
| 2009/0141027 A1* | 6/2009 | Sato et al. | 345/426 |
| 2009/0290039 A1* | 11/2009 | Kanamori et al. | 348/222.1 |
| 2009/0304299 A1* | 12/2009 | Motomura et al. | 382/254 |
| 2010/0013965 A1* | 1/2010 | Pugh et al. | 348/254 |

FOREIGN PATENT DOCUMENTS

| | | |
|---|---|---|
| JP | 11-088820 | 3/1999 |
| JP | 2004-048427 | 2/2004 |
| JP | 2004-117478 | 4/2004 |
| JP | 2007-086720 | 4/2007 |
| JP | 2008-016918 | 1/2008 |
| JP | 2008-026353 A | 2/2008 |
| WO | 2008/149489 A1 | 12/2008 |

OTHER PUBLICATIONS

Daisuke Miyazaki et al., "Polarization Analysis of the Skylight Caused by Rayleigh Scattering and Sun Orientation Estimation using Fisheye-Lens Camera", Pattern Recognition and Media Understanding Society of the Institute of Electronics, Information, and Communication Engineers in Japan, vol. 108, No. 198, pp. 25(1)-32(8), 2008.

Pomozi et al., "How the clear-sky angle of polarization pattern continues underneath clouds: full-sky measurements and implications for animal orientation", The Journal of Experimental Biology 204, pp. 2933-2942 (2001).

Hitoshi Tokumaru, "Light and Radio Waves", Mar. 21, 2000, Morikita Publishing Co., Ltd.

M.V. Berry et al., "Polarization Singularities in the Clear Sky", New Journal of Physics 6 (2004) 162.

Shimizu et al., "Two-Dimensional Simultaneous Sub-pixel Estimation for Area-Based Matching", Transactions of the Institute of Electronics, Information and Communication Engineers (of Japan) D-II, vol. J87-D-II, No. 2, pp. 554-564, Feb. 2004 and English translation of the Abstract.

Form PCT-ISA-237 for corresponding International Application No. PCT/JP2009/007034 mailed Mar. 16, 2010 and English translation.

Extended European Search Report for corresponding European Application No. EP 09 83 7447 dated Sep. 21, 2012.

* cited by examiner (a)

(b)

(a) ρ

(b) φ

(c) C (d)

(a)

(b)

(c)

(d)

(a)

(b)

APPARATUS FOR DETECTING DIRECTION OF IMAGE PICKUP DEVICE AND MOVING BODY COMPRISING SAME

TECHNICAL FIELD

The present invention relates to an apparatus which can detect the direction of the optical axis of the image capture device, with which information about a relative position of an image capture device with respect to the sun can be obtained, and also relates to an image capture device and a vehicle with such a detector.

BACKGROUND ART

As digital cameras have become increasingly popular nowadays, the importance of image processing to be performed on images shot with those digital cameras has been increasing year after year. There are various kinds of such image processing, examples of which include (i) compensation for backlight, which has been a major cause of a failure in making a good shot with a camera, (ii) increasing the resolution of a so-called "digitally zoomed" image, (iii) recognizing a human face or something like that and automatically focusing on it, and (iv) superposing a virtual image, generated by computer graphics, on a real image as known as "Augmented Reality".

Each of these kinds of image processing is carried out based on the "appearance" of an object of shooting. Light that emitted from a light-source, is then reflected from the surface of the object, and finally received by an imager and the "appearance" of the object comes out. That is why the light-source information is very important in image processing, which means that it is very effective to obtain light-source information and utilize it for shooting and image processing. For example, there is a technique often used to give a natural 3D appearance to an object, by putting the object under semi-backlight on purpose. However, it heavily depends on the specific situation whether or not that special type of shooting can be done successfully. Consequently, in most cases, it is the shooter's instinct or experience that makes the difference.

Once the light-source information is known, it is possible to let the camera give instruction to the shooter, for example an instruction about the shooting direction, so as to allow him or her to copycat such a technique referred above to achieve a good shot. On top of that, it is also possible to make an automatic exposure correction based on the light-source information. Patent Document No. 1 discloses a technique for detecting a light-source with a sensor arranged at the top of a camera and instructing the shooter a recommended shooting direction. According to the technique disclosed in Patent Document No. 1, a photoelectric conversion element with a fish-eye lens is used as such a sensor for detecting the light-source direction. Specifically, the light-source direction is determined by the location of the point which has the maximum intensity on the sensor, where the light that comes from the whole sky gets condensed. In that case, however, if the sunlight reflected on a window is seen at a high position, there will be another intense light-source other than the sun itself and the detection of the sun direction could fail.

Patent Document No. 2 proposes a technique to use the whole sky polarization state in order to obtain the information about the position of the sun more accurately. According to the technique disclosed in Patent Document No. 2, a light-source detection section is arranged at the top of a camera as in Patent Document No. 1 to capture whole sky polarization images using the sensor that can capture the whole sky with a polarization filter attached to it. A number of images are shot with continually rotating the polarizer, and the whole sky polarization property is obtained from those images, thereby the sun direction is determined. Sky polarization is also discussed in Non-Patent Document No. 1, which proposes observing polarization state of sunlight using a fish-eye lens camera that can shoot wide areas of sky as in Patent Documents No. 1 and 2 cited above. Also, although no specific technique is disclosed, Non-Patent Document No. 1 also says that the sun direction could be determined based on the polarization state.

Patent Document No. 3 discloses a patterned polarizer for capturing multiple polarization images with mutually different polarization principal axes.

Also Non-Patent Documents No. 2, 3 and 4 refer to sky polarization patterns.

CITATION LIST

Patent Literature

Patent Document No. 1: Japanese Patent Application Laid-Open Publication No. 8-160507
Patent Document No. 2: Japanese Patent Application Laid-Open Publication No. 2004-117478
Patent Document No. 3: Japanese Patent Application Laid-Open Publication No. 2007-86720

Non-Patent Literature

Non-Patent Document No. 1: "Polarization Analysis of the Skylight Caused by Rayleigh Scattering and Sun Orientation Estimation Using Fisheye-Lens Camera", Daisuke Miyazaki et al, Pattern Recognition and Media Understanding Society of the Institute of Electronics, Information, and Communication Engineers in Japan, Vol. 108, No. 198, pp. 25-32, 2008
Non-Patent Document No. 2: "How the Clear-Sky Angle of Polarization Pattern Continues Underneath Clouds: Full-Sky Measurements and Implications for Animal Orientation", Istvan Pomozi et al., The Journal of Experimental Biology 204, 2933-2942 (2001)
Non-Patent Document No. 3: Hitoshi Tokumaru, "Light and Radio Waves", Mar. 21, 2000, Morikita Publishing, Co., Ltd.
Non-Patent Document No. 4: "Polarization Singularities in the Clear Sky", M. V. Berry, et al, New Journal of Physics 6 (2004) 162

SUMMARY OF INVENTION

Technical Problem

According to the conventional techniques, however, the sensor that can capture the whole sky is necessary in addition to the imager itself. That is why such techniques are not satisfactory as far as the size is concerned. Also, such an imager is not easy for the shooter to hold and would not come in handy for him or her.

What is more, according to those techniques, the sensor arranged at the top of the camera needs to capture whole sky images in order to collect the light-source information. Suppose a camera has been rotated 90 degrees to the right to shoot a photo that is longer vertically than horizontally. Or suppose the camera is actually used to shoot an outdoor scene while the shooter stays under the roof. In each of those cases, the sensor arranged at the top of the camera cannot obtain the light-source information. That is to say, because shooting can be done under various situations and postures, the sensor cannot capture the whole sky properly in many cases.

Furthermore, when the whole sky is shot with such a sensor, the sun almost always falls within the shooting range. However, the sunlight is so intense that some mechanism for reducing the incoming light component is needed, for example. That is to say, it is not easy to make a shot with a camera or make an input to a photoelectric conversion element when the sunlight directly gets into the sensor.

As can be seen, those conventional techniques have so many constraints, so a more flexible technique to detect sun orientation or camera direction is preferably adopted to shooting with camera which users place great importance on usability.

In order to overcome these problems, the present invention has an object of providing a device that can detect the relative position of an image capture device with respect to the sun, and the direction of the image capture device, based on only a partial sky of a given scene image without using the bulky sensor that can capture the whole sky.

Another object of the present invention is to provide a mobile device (which may be not only a personal digital assistant or a cellphone but also a vehicle such as a car) with such an image capture device that can detect the direction or orientation of that mobile device.

Solution to Problem

An apparatus, hereinafter called direction detector, according to the present invention is designed to detect the direction of the optical axis of the image capture device (hereinafter, simply to call it "direction of the image capture device"). The image capture device includes an image capturing section for capturing polarization images, including at least a polarization angle image, and a luminance image. The direction detector includes: an image processing section for generating a clear sky polarization angle image, which indicates the polarization angle of a clear sky part of the luminance image, based on the polarization images and the luminance image; a direction estimating section for estimating the direction of the image capture device, which is determined by the direction of the image capturing section, by reference to the clear sky polarization angle image; and an output section for providing information about the direction of the image capture device that has been estimated by the direction estimating section.

In one preferred embodiment, the direction detector includes a sun position determining section that obtains the information about the sun's position at the time of shooting, and the direction estimating section estimates the direction of the image capture device by reference to that information.

In this particular preferred embodiment, the direction detector includes a whole sky polarization map obtaining section to obtain a whole sky polarization map, indicating the polarization state of the sky at the time of shooting, by reference to the information about the sun's position, and the direction estimating section estimates the direction of the image capture device based on the clear sky polarization angle image and the whole sky polarization map.

In a specific preferred embodiment, the whole sky polarization map obtaining section retrieves a whole sky polarization map, which indicates the polarization state of the sky at the time of shooting, from a database including a whole sky polarization map.

In a more specific preferred embodiment, the direction detector includes a storage device which can retain the database referred above.

In an alternative preferred embodiment, the direction detector includes a telecommunication device to have access the data on an external storage device which can retain the database referred above.

In another preferred embodiment, the whole sky polarization map obtaining section perform calculations to generate the whole sky polarization map which indicates the polarization state of the sky at the time of shooting.

In still another preferred embodiment, the direction estimating section calculates the direction of the clear sky part based on the polarization angle of the clear sky part, thereby estimates the direction of the image capture device.

In yet another preferred embodiment, the direction detector includes a whole sky polarization map obtaining section to obtain a whole sky polarization map indicating the polarization state of the sky at the time of shooting. The direction estimating section operates in at least one of following two modes: "search mode" and "calculation mode". When operating in the "search mode", the direction estimating section searches for the direction of the clear sky part by reference to the clear sky polarization angle image and the whole sky polarization map. On the other hand, when operating in "calculation mode", the direction estimating section calculates the direction of the clear sky part based on the polarization angle of the clear sky part.

In yet another preferred embodiment, the direction detector includes a levelness adjusting section for correcting the tilt of the image capture device.

In this particular preferred embodiment, the tilt of the image capture device includes a tilt around the roll axis.

In a specific preferred embodiment, the image capture device includes a level which measures the degree of levelness of the image capture device, thereby to correct the tilt of the image capture device based on the measured levelness.

In yet another preferred embodiment, the direction detector includes an angle of view measuring section for measuring the angle of view of the range of shooting, thereby determining the range of the clear sky part by the angle of view measured.

In yet another preferred embodiment, the image capturing section includes multiple polarizers with mutually different polarization principal axis angles, and the polarization images are obtained as a combination of light rays that have been transmitted through the polarizers.

In yet another preferred embodiment, the polarization images further include a degree of polarization image as well as the polarization angle image.

In yet another preferred embodiment, if the degree of polarization of the sky is equal to or higher than a reference value, the image processing section cuts out the clear sky part based on the degree of polarization. But if the degree of polarization of the sky is lower than the reference value, the image processing section cuts out the clear sky part based on a hue and outputs the clear sky polarization angle image.

In yet another preferred embodiment, the direction detector includes a degree of reliability determining section for determination of the degree of reliability of the result of estimation and to present the information to its user as a result.

In this particular preferred embodiment, the direction detector includes a solar altitude determining section to determine, by the solar altitude derived from the information about the sun's position at the time of shooting, whether the result of estimation is reliable or not.

In yet another preferred embodiment, coordinate transformation is carried out based on the altitude and azimuth of the sun and the direction of the image capture device, thereby to determine the sun's position in a camera coordinate system.

An image capture apparatus (camera) according to the present invention includes: an image capture device including an image capturing section for capturing polarization images, including a polarization angle image, and a luminance image; and a direction detector according to any of the preferred embodiments of the present invention described above.

A vehicle according to the present invention includes an image capture device according to any of the preferred embodiments of the present invention described above, and further includes: an image capture device including an image capturing section for capturing polarization images, including a polarization angle image, and a luminance image; and a vehicle direction estimating section to determine the direction of the vehicle by the direction of the image capture device detected in accordance with a relation in direction between the vehicle and the image capture device.

A mobile device according to the present invention includes an direction detector according to any of the preferred embodiments of the present invention described above. The mobile device further includes: an image capture device including an image capturing section for capturing polarization images, including a polarization angle image, and a luminance image; and a mobile device direction estimating section to determine the direction of the mobile device by the detection of the optical axis of the image capture device detected in accordance with a relation in direction between the mobile device and the image capture device.

An image capture device according to the present invention includes: an image capturing section for capturing polarization images, including a polarization angle image, and a luminance image; an image processing section to generate a clear sky polarization angle image, which indicates the polarization angle of a clear sky part included in the luminance image, based on the polarization images and the luminance image; an direction estimating section for estimation of the direction of the image capture device, which is determined by the direction of the image capturing section, by reference to the clear sky polarization angle image; and an output section to output image data that has been obtained by the image capturing section and providing information about the direction of the image capture device that has been estimated by the direction estimating section.

An image format according to the present invention is used to retain: image data; data indicating the date and the exact time when the image was shot; data indicating the longitude and latitude of a location where the image was shot; and data indicating the direction of an image capture device at the time of shooting.

A method for detecting the direction of an image capture device according to the present invention includes the steps of: capturing polarization images and a luminance image with the image capture device; generating a clear sky polarization angle image, which indicates the polarization angle of a clear sky part of the luminance image, based on the polarization images and the luminance image; estimating the direction of the image capture device by reference to the clear sky polarization angle image; and outputting information about the direction of the image capture device.

A program according to the present invention is defined for the direction detector which can detect the direction of the image capture device at the time of shooting, by using a celestial polarization pattern. The program is defined so as to make a computer execute the steps of: capturing polarization images and a luminance image with the image capture device; generating a clear sky polarization angle image, which indicates the polarization angle of a clear sky part of the luminance image, based on the polarization images and the luminance image; estimating the direction of the image capture device by reference to the clear sky polarization angle image; and outputting the information about the direction of the image capture device.

Advantageous Effects of Invention

According to the present invention, no matter where it is or what posture is taken to carry out shooting on location, the direction of an image capture device or that of a vehicle can be detected by reference to the polarization information of just a part of the sky without using a sensor that can capture all of the sky.

Figure 5:
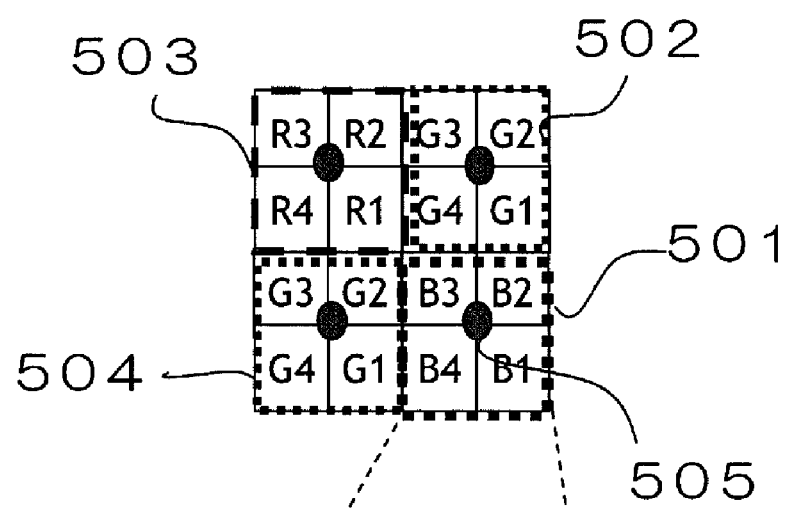
Figure 5:
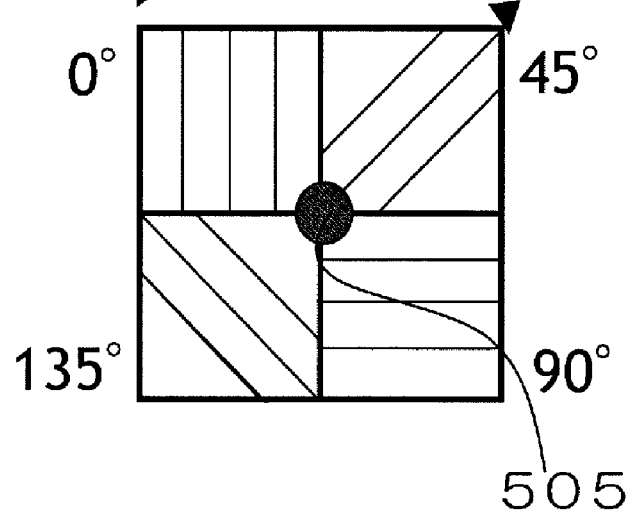

Portions (a) and (b) of FIG. 5 illustrate a portion of the image sensing plane of a polarization image capturing section as viewed from right over the plane.

Figure 6:
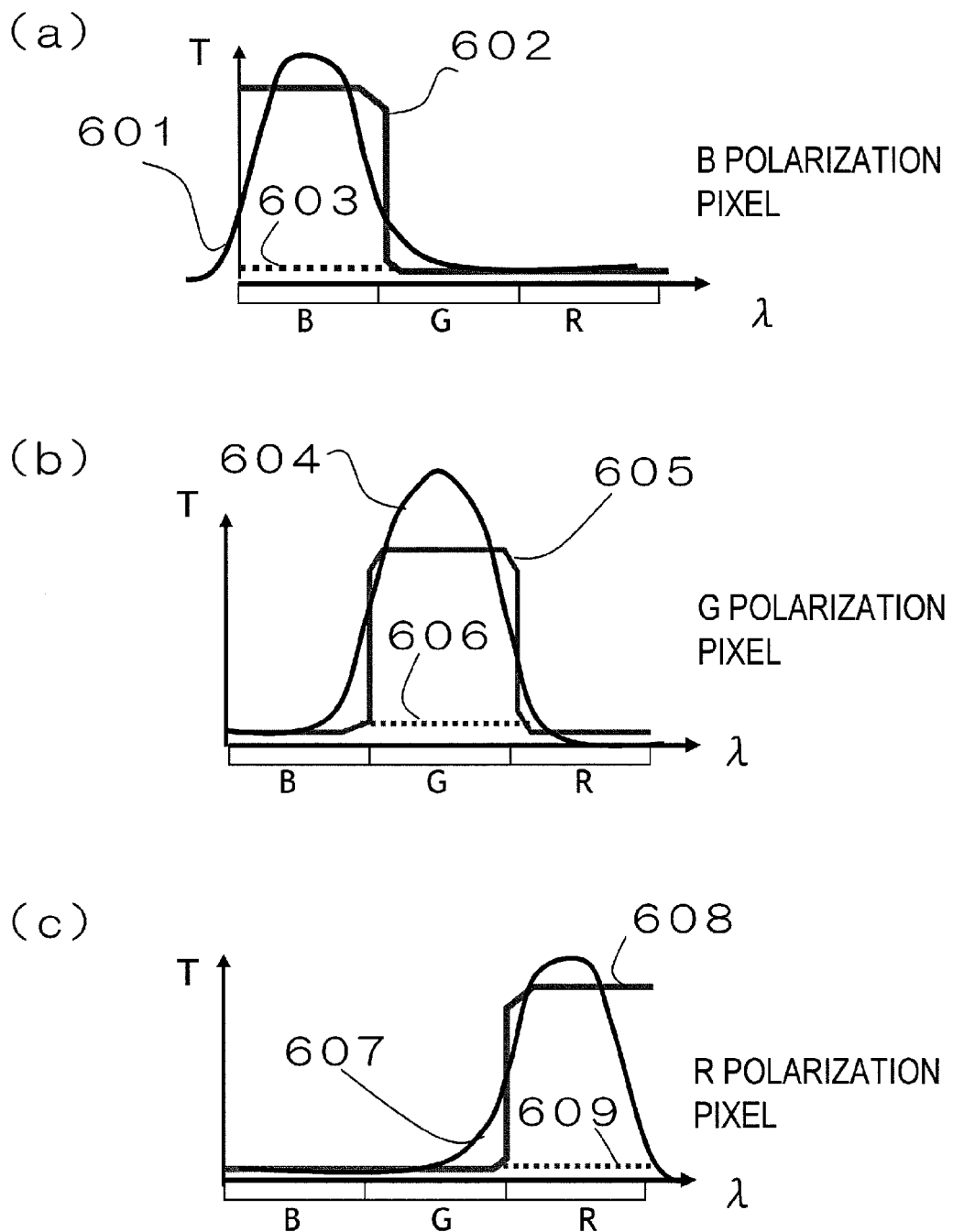

FIGS. 6(a), 6(b) and to 6(c) are graphs schematically showing the wavelength characteristics of polarization pixels corresponding to following colors: B (Blue), G (Green) and R (Red), respectively.

Figure 7:
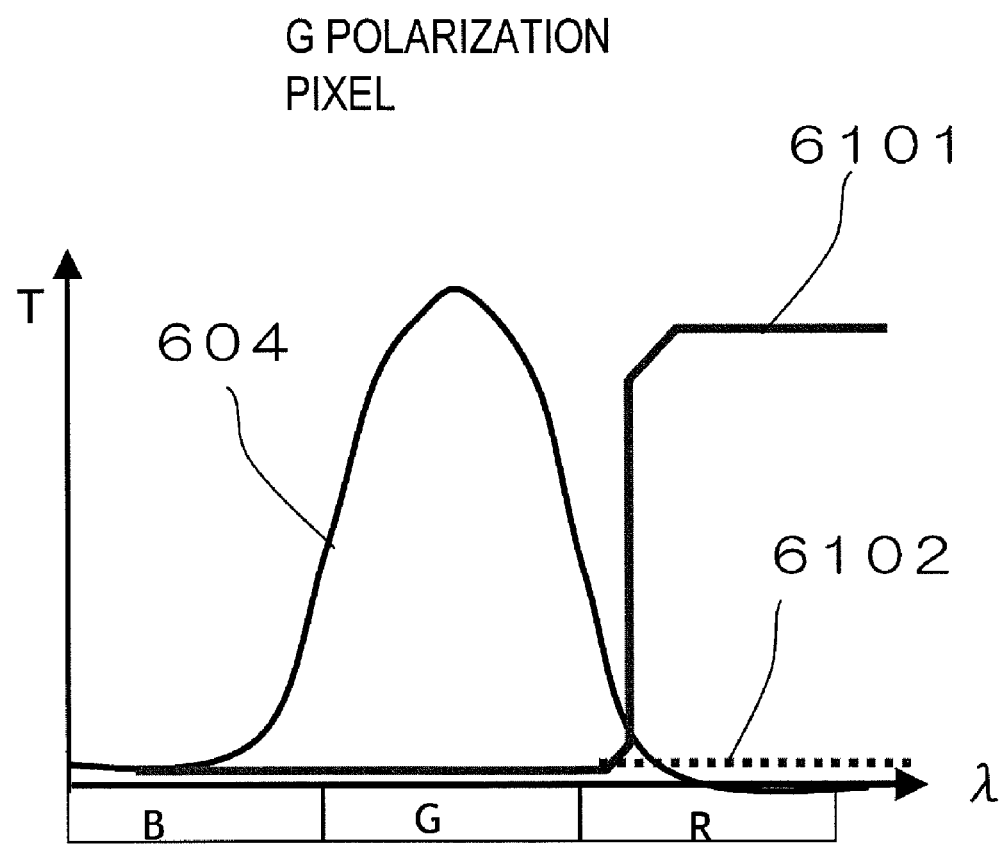

FIG. 7 is a graph in the case of a G color filter, which showing the range of wavelength that a filter transmits, and also the range of wavelength that the polarization separation occurs.

Figure 8:
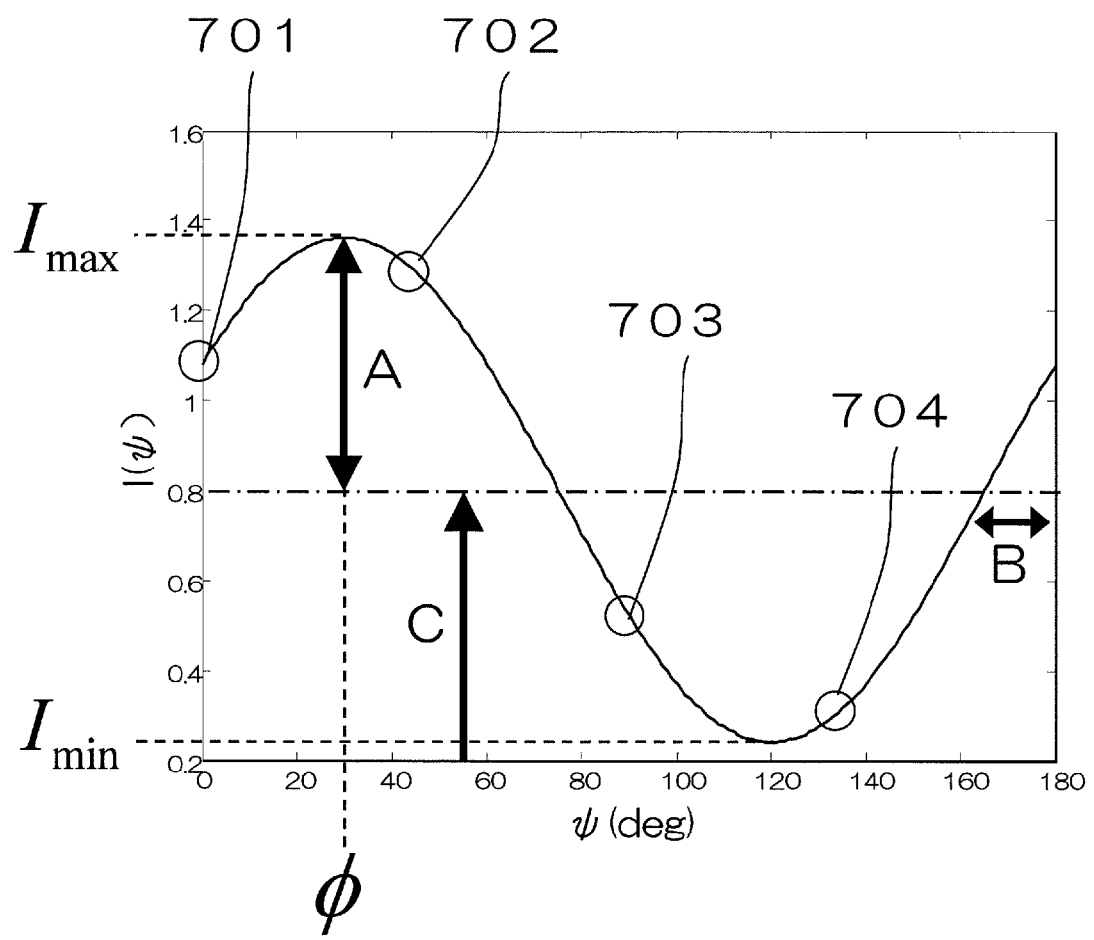

FIG. 8 is a graph showing the intensities of light rays that have been transmitted through four polarizers, each of which polarization principal axis has different directions.

FIGS. 9(a), 9(b) and 9(c) are a degree of polarization image, a polarization angle image, and a color image (luminance image) that have been captured by scene image and scene polarization image capturing section, respectively. FIG. 9(d) is a schematic representation of the color image.

FIGS. 10(a) and 10(b) are schematic representations illustrating how to adjust the roll angle levelness of an image.

Figure 11A:
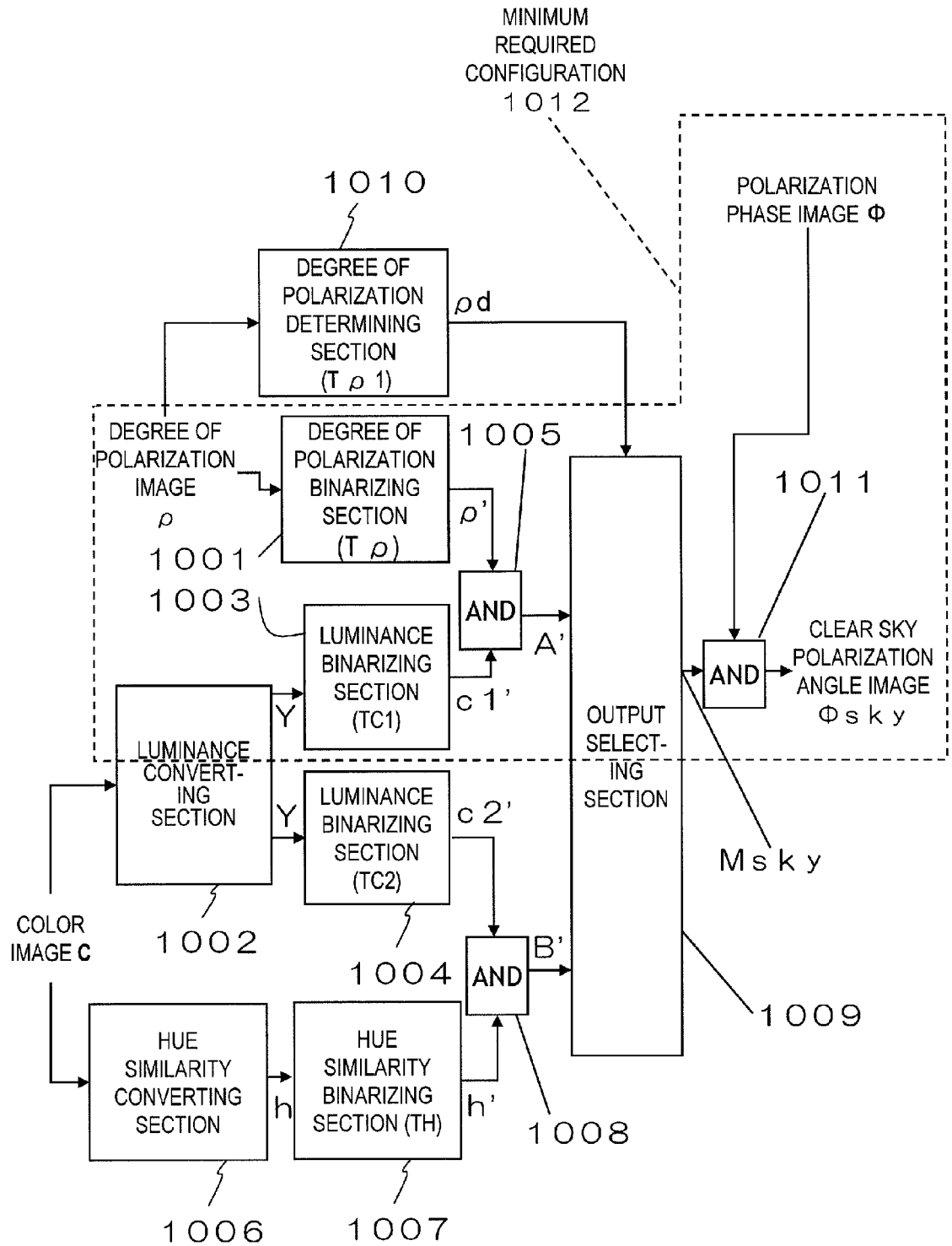

FIG. 11A is a block diagram illustrating a configuration of a clear sky polarization image processing section.

Figure 11B:
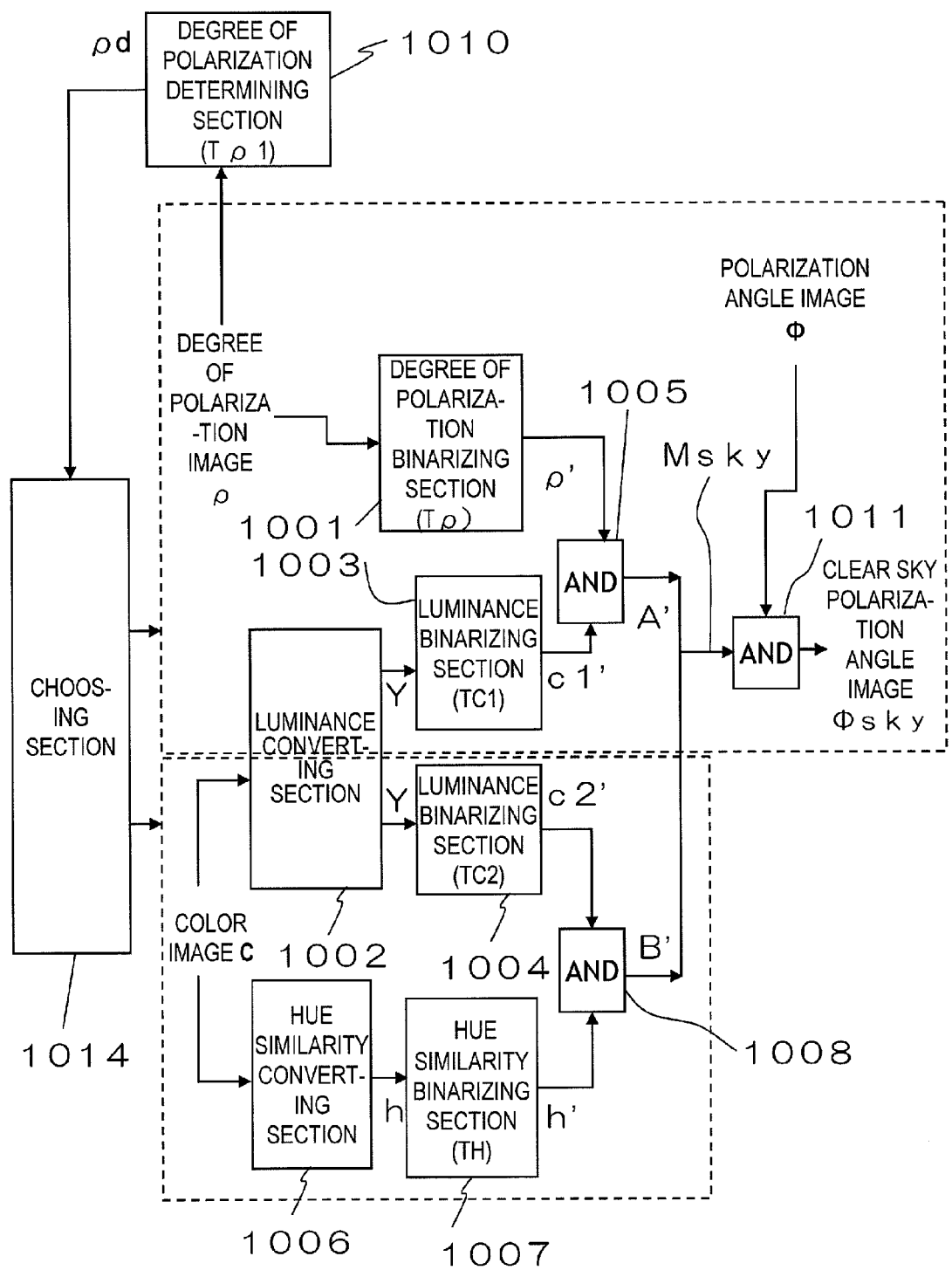

FIG. 11B is a block diagram illustrating another configuration of the clear sky polarization image processing section.

Figure 11C:
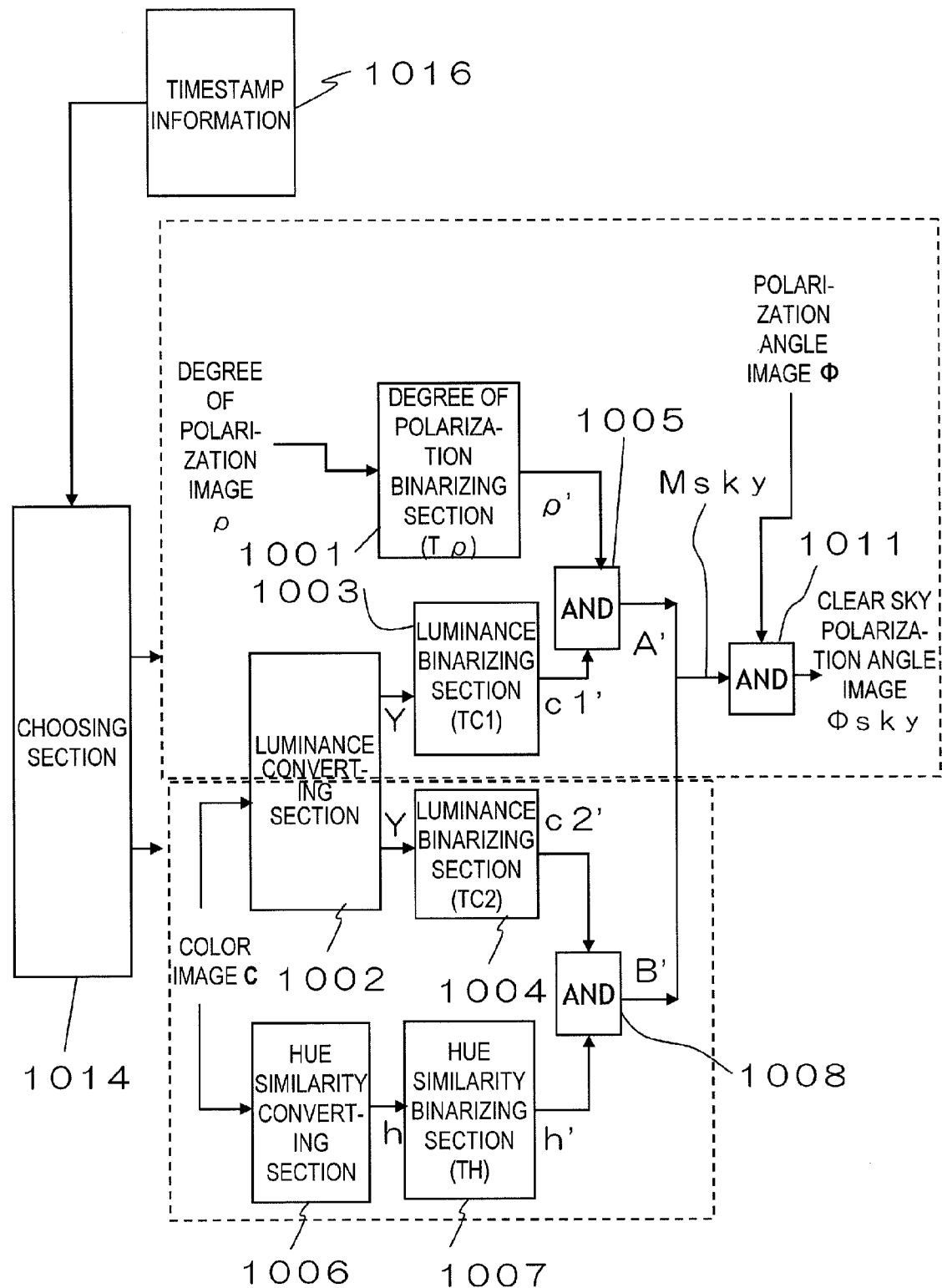

FIG. 11C is a block diagram illustrating still another configuration of the clear sky polarization image processing section.

FIGS. 12(a) through 12(f) show the results of processing that were obtained by applying the technique of the present invention to an actual scene image representing an eastern sky in the daytime.

Figure 12:
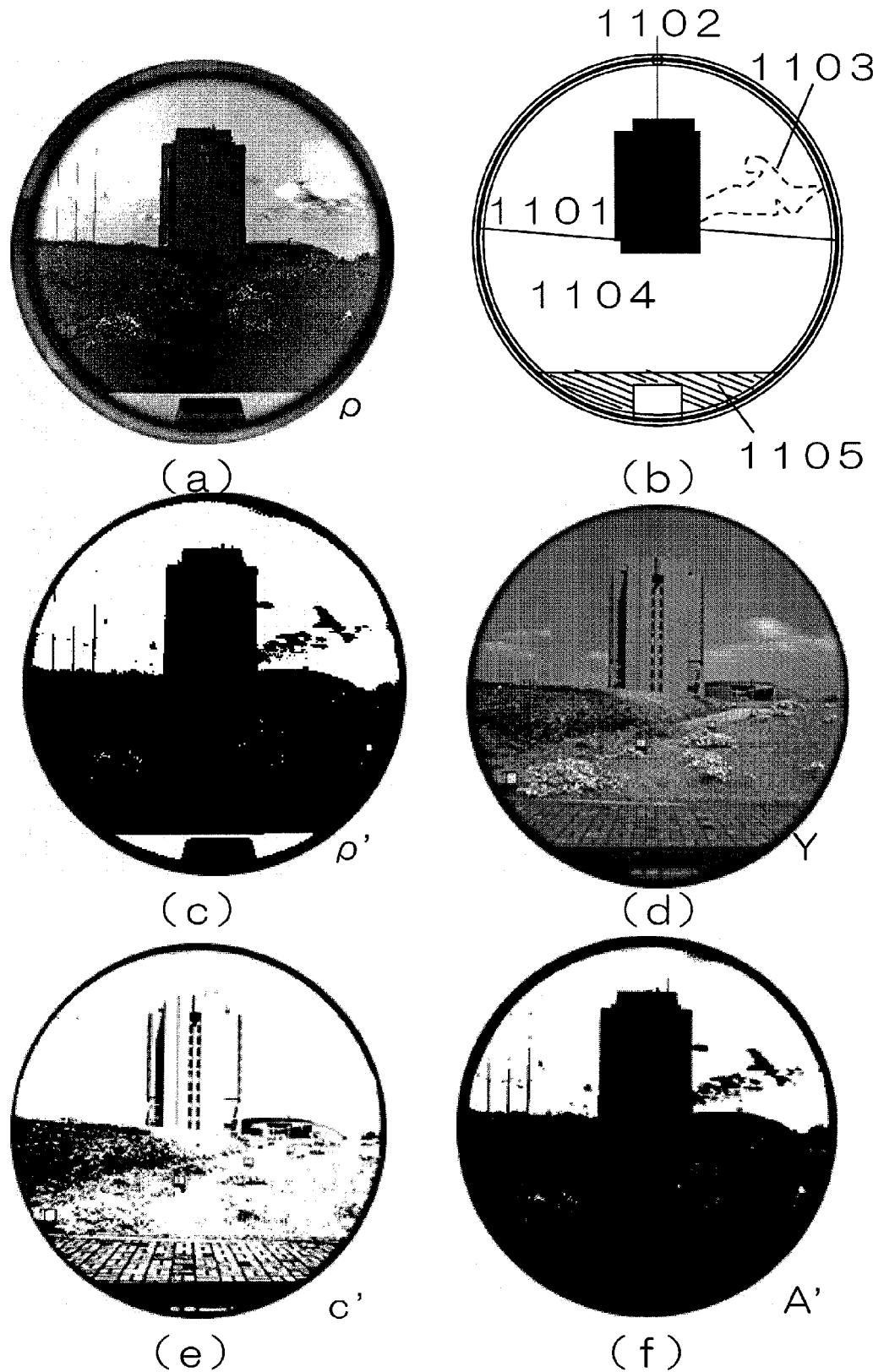

FIGS. 13(a) through 13(d) show the final results of the processing on the images shown in FIG. 12.

FIGS. 14(a) through 14(f) show the results of unsuccessful processing that were obtained by applying the technique of the present invention to an actual scene image representing an eastern sky early in the evening.

FIGS. 15(a) through 15(d) show the results of processing that were obtained by applying the technique of the present invention to a scene image representing an eastern sky early in the evening by reference to the hue similarity.

FIGS. 16(a) and 16(b) are block diagrams illustrating configurations of a camera direction estimating section.

FIGS. 17(a) through 17(c) illustrate conceptually a relation between a whole sky polarization map and clear sky polarization angle images.

Figure 18:
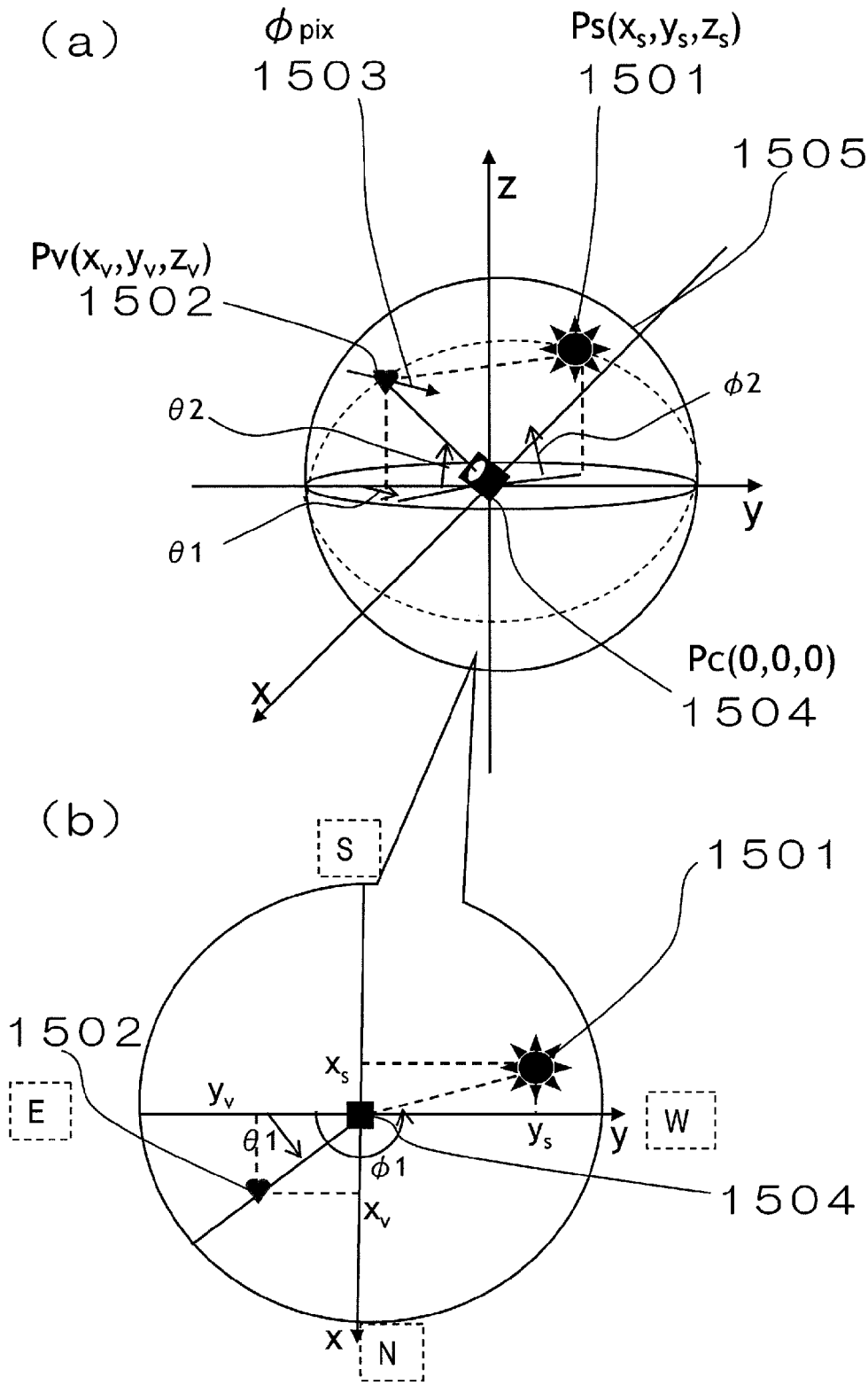

Portions (a) and (b) of FIG. 18 are schematic representations illustrating a celestial coordinate system.

Figure 19:
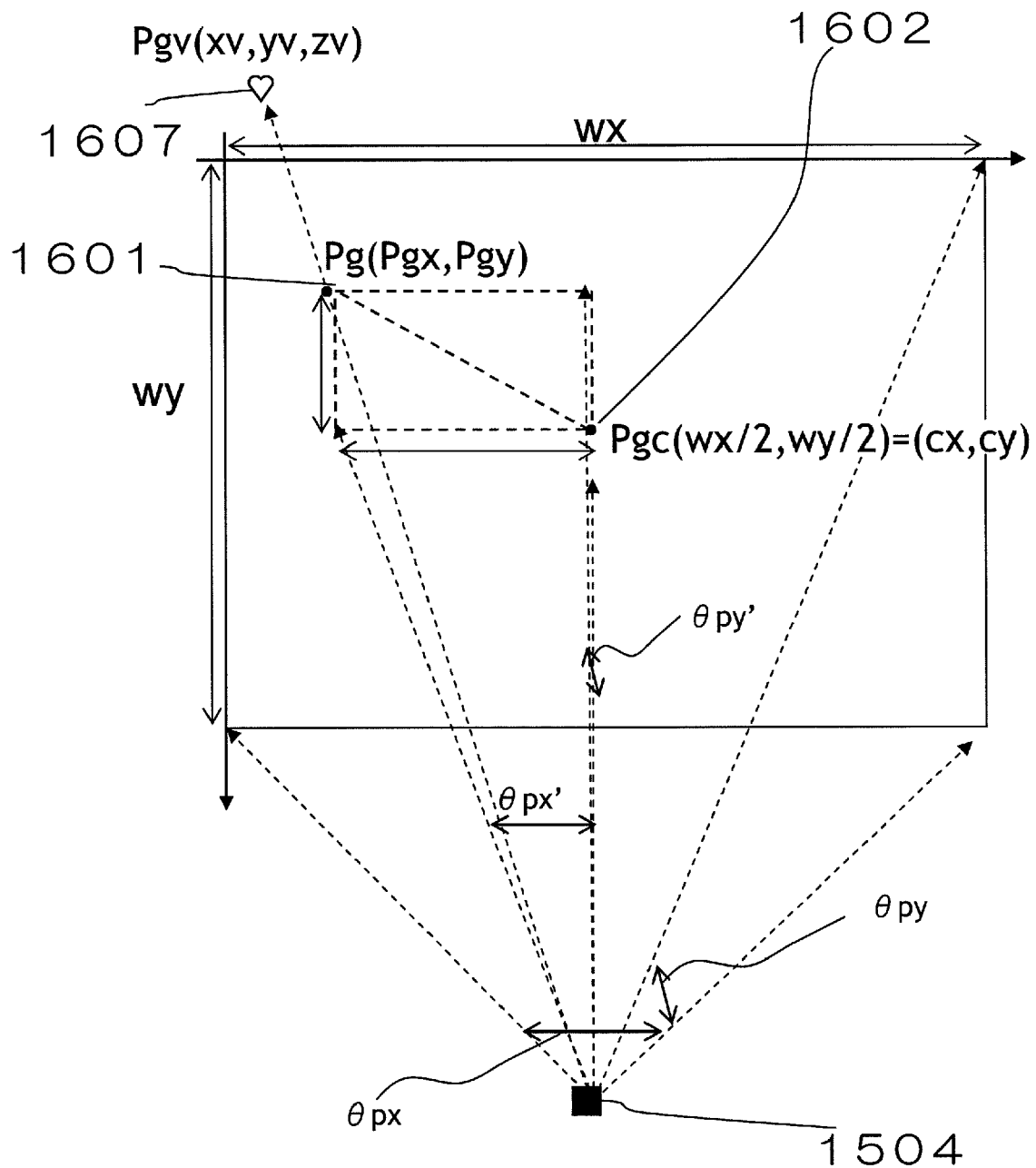

FIG. 19 is a schematic representation illustrating a relation between a camera and an image taken.

Figure 20:
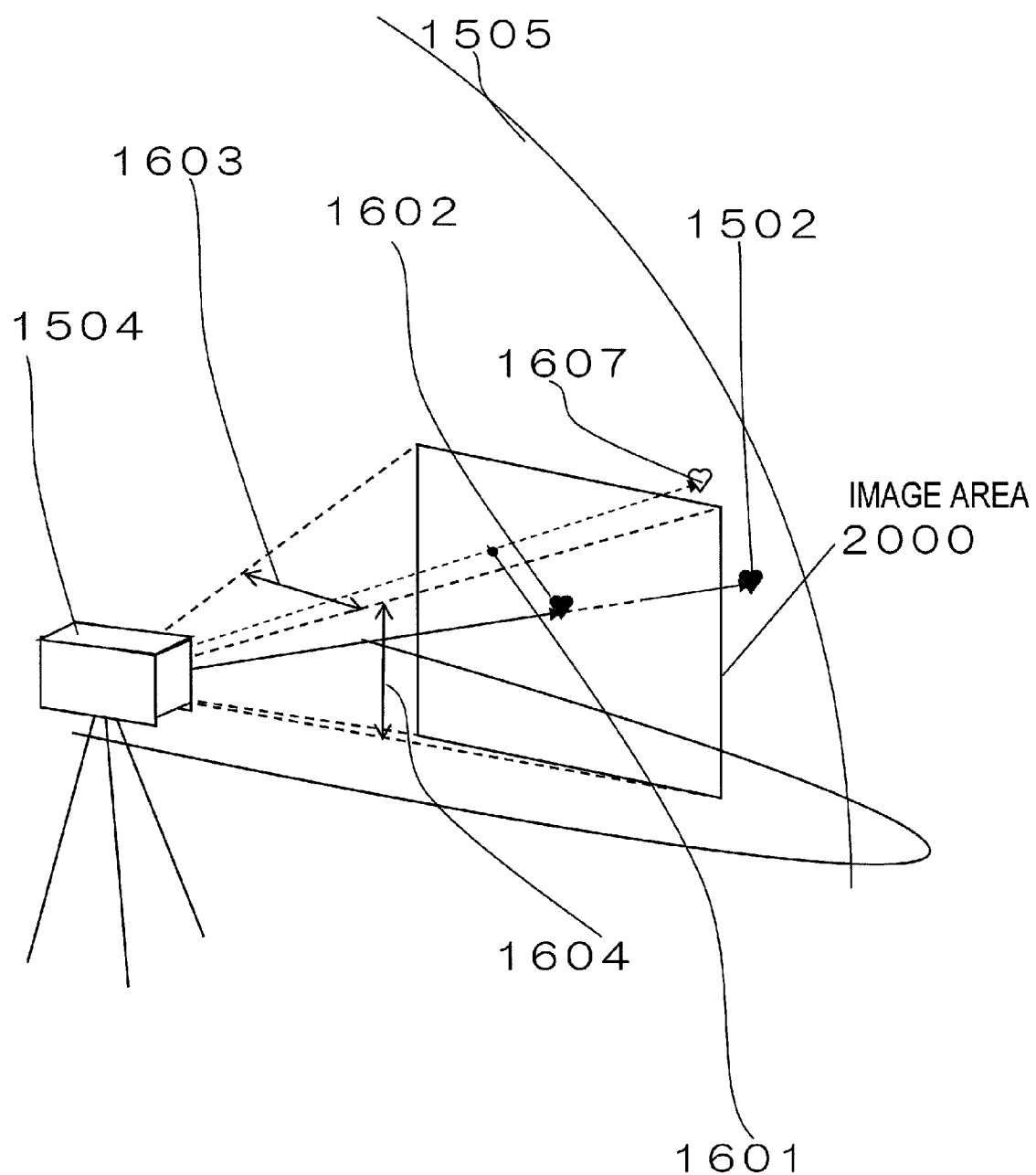

FIG. 20 is a schematic representation illustrating a relation between a camera, an image coordinate system and a celestial coordinate system.

Figure 21:
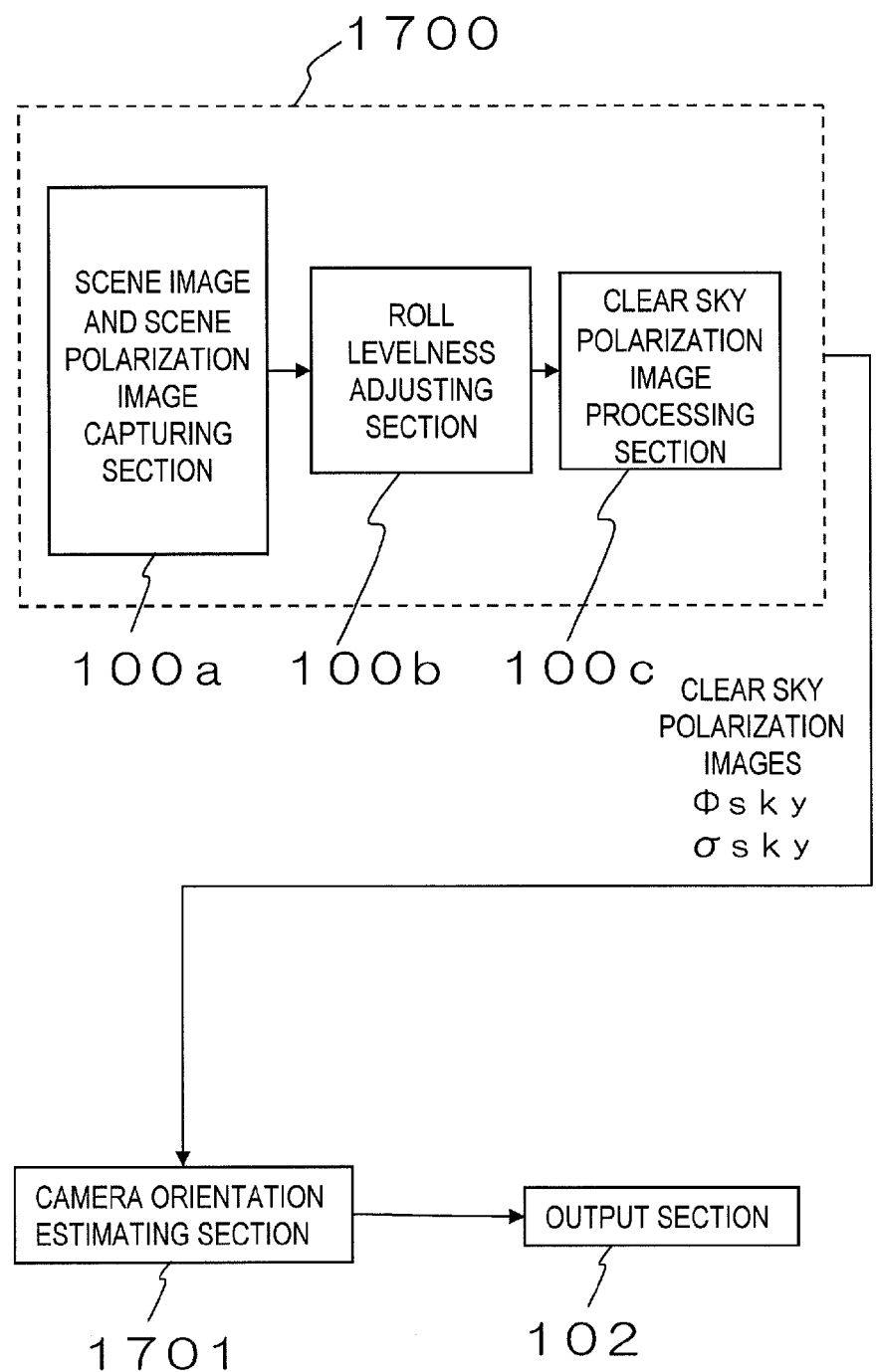

FIG. 21 is a block diagram illustrating a configuration of an image capture device as a second specific preferred embodiment of the present invention.

Figure 22A:
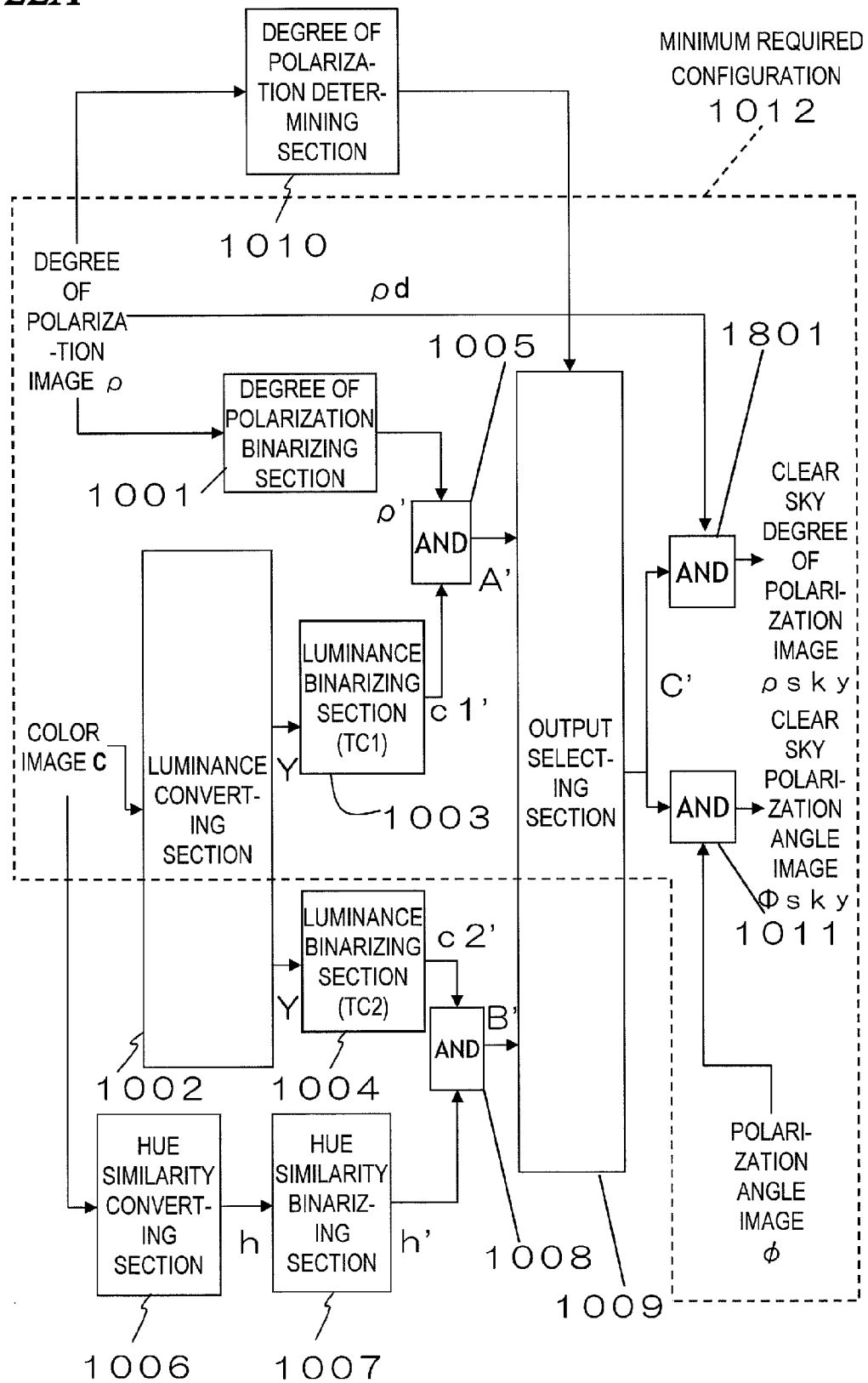

FIG. 22A is a schematic representation illustrating a clear sky polarization image processing section according to the second preferred embodiment.

Figure 22B:
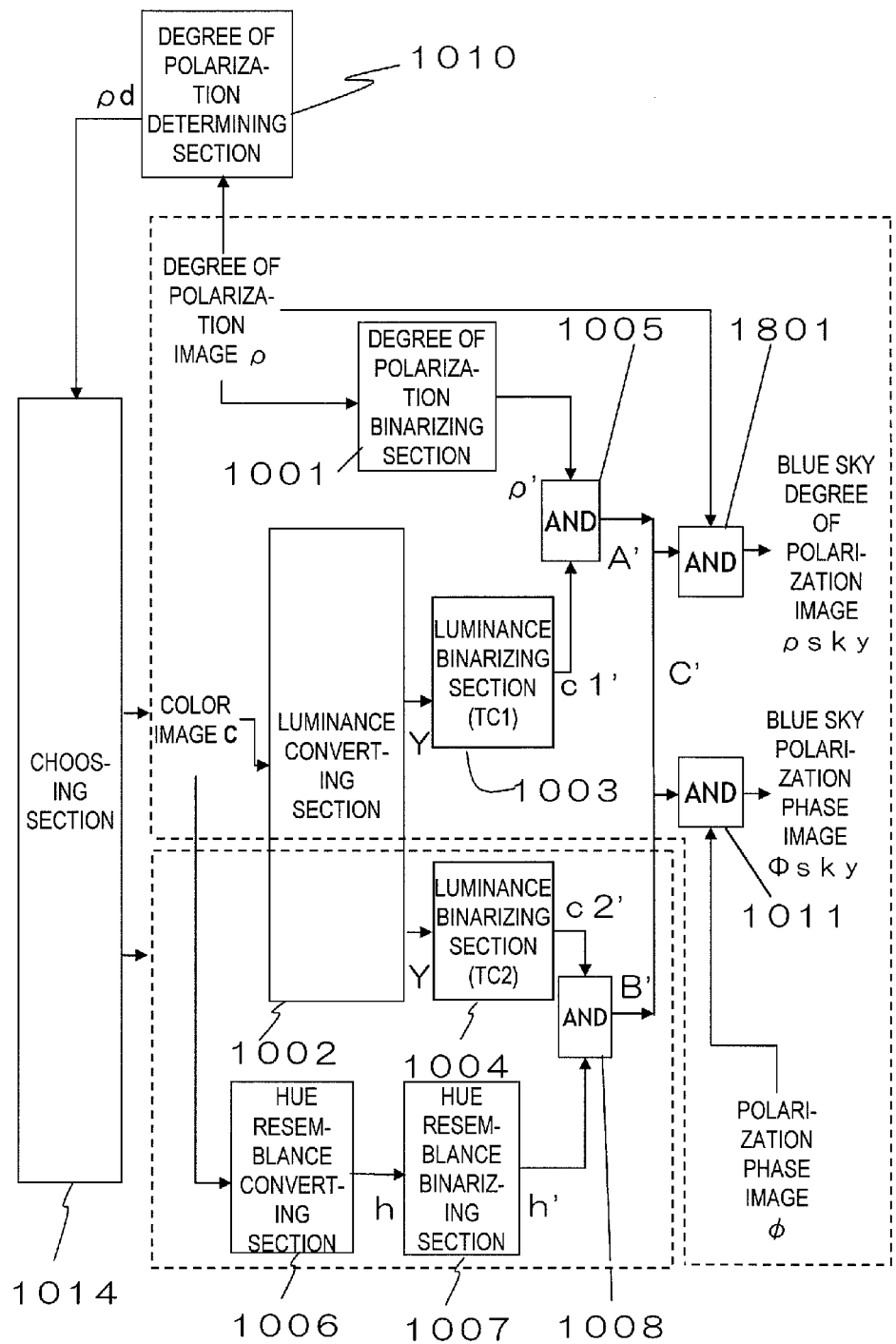

FIG. 22B is a block diagram illustrating another configuration of the clear sky polarization image processing section according to the second preferred embodiment.

Figure 22C:
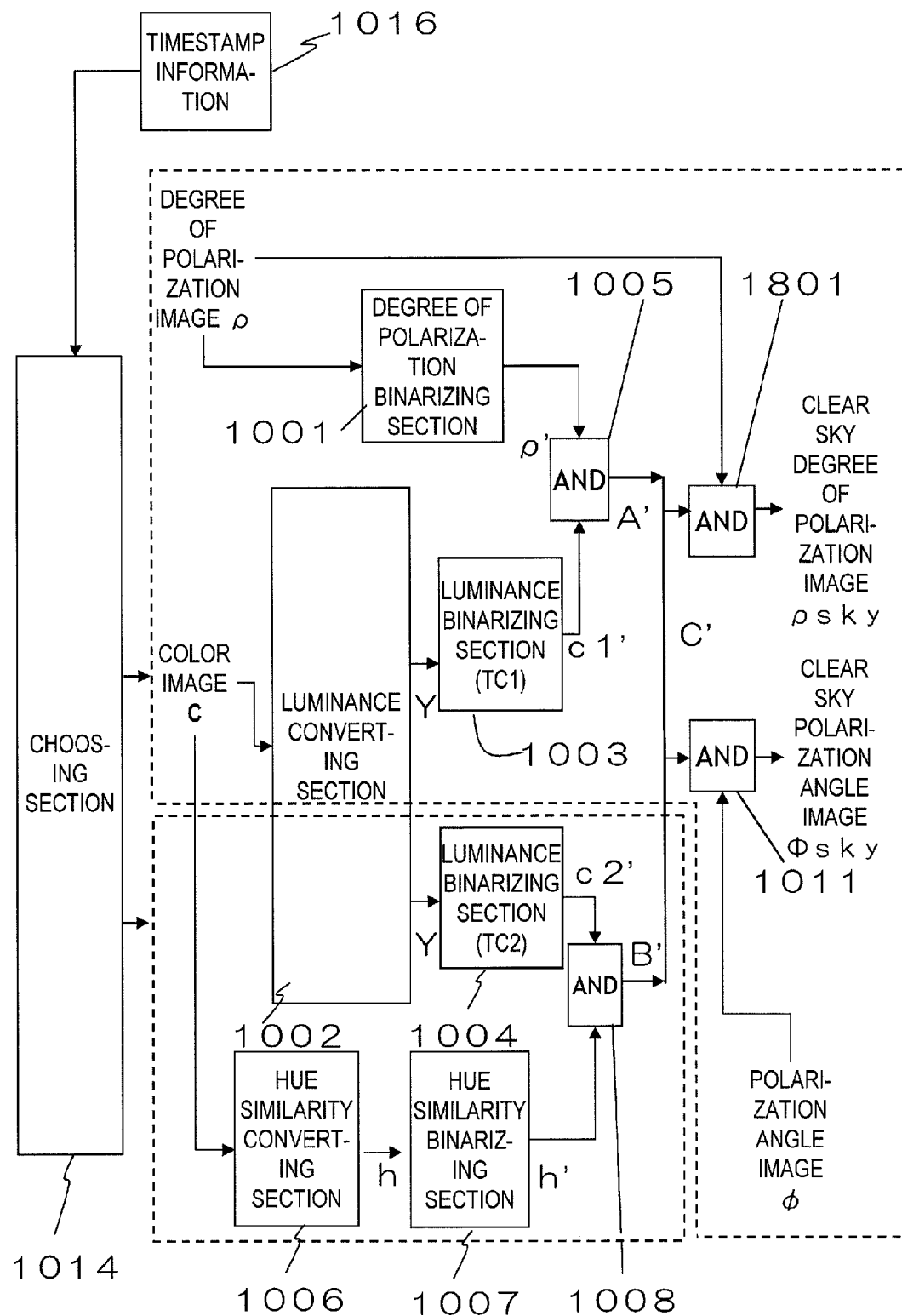

FIG. 22C is a block diagram illustrating still another configuration of the clear sky polarization image processing section according to the second preferred embodiment.

FIGS. 23(a) through 23(f) show the results of processing that were obtained by applying the technique of the present invention to an actual scene image representing an eastern sky in the daytime.

Figure 24:
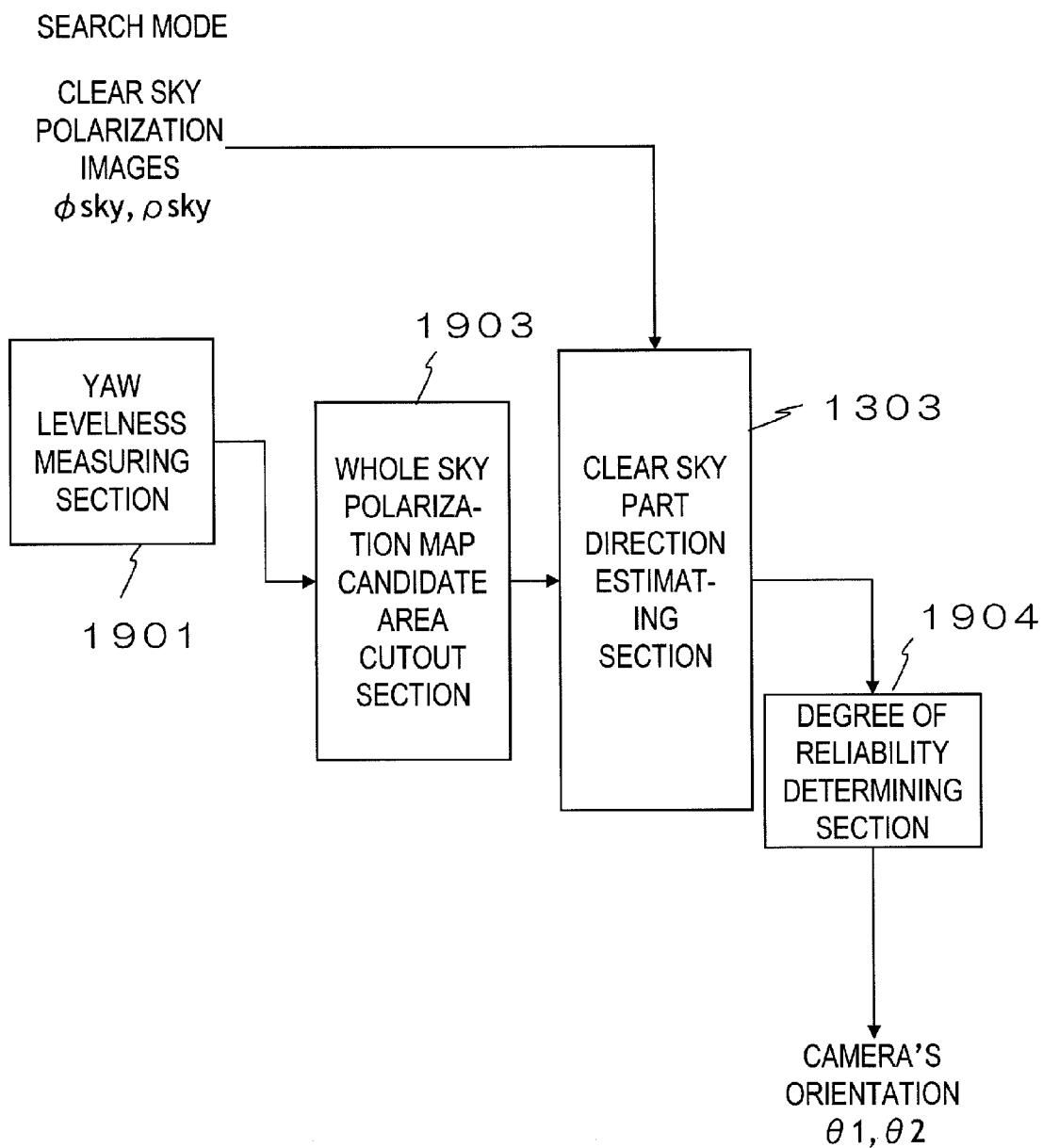

FIG. 24 is a block diagram illustrating a first mode configuration of a camera direction estimating section according to the second preferred embodiment of the present invention.

Figure 25:
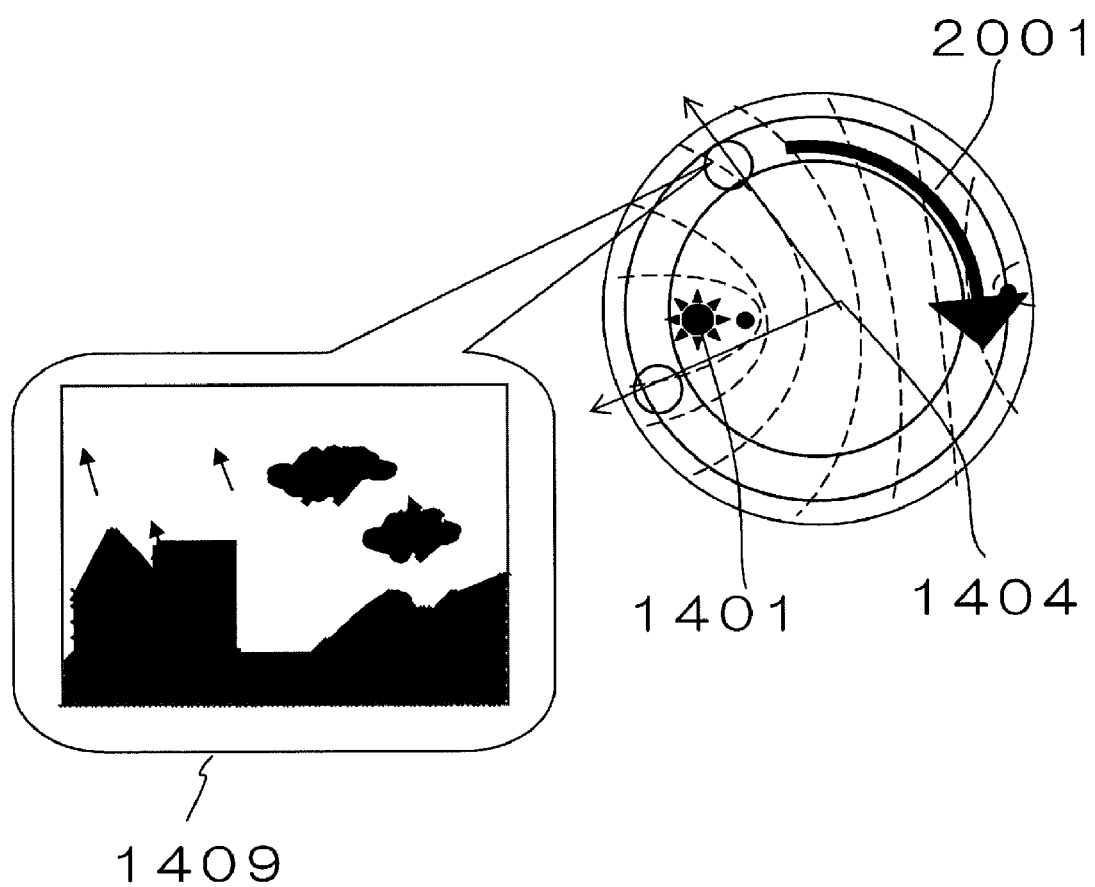

FIG. 25 illustrates conceptually a candidate searching area obtained by a whole sky polarization map obtaining section.

Figure 26A:
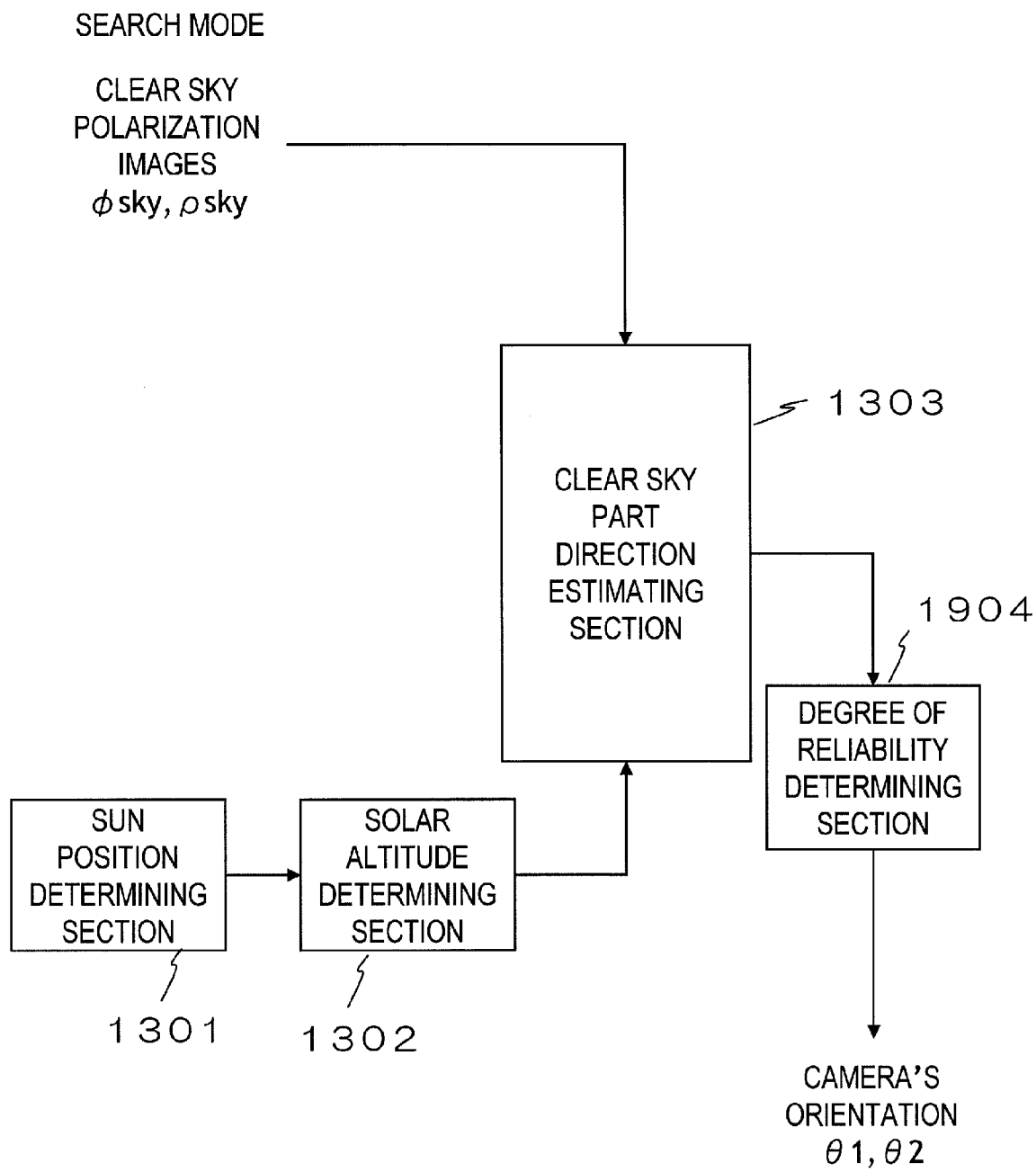

FIG. 26A is a block diagram illustrating an alternative first mode configuration of the camera direction estimating section of the second preferred embodiment of the present invention.

Figure 26B:
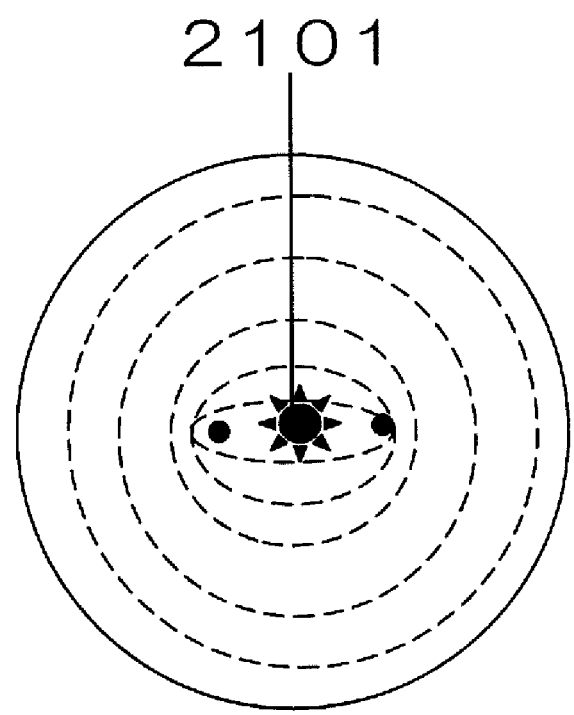

FIG. 26B illustrates conceptually what a whole sky polarization map in the cases when a whole sky polarization image can be searched with only a low degree of reliability.

Figure 27:
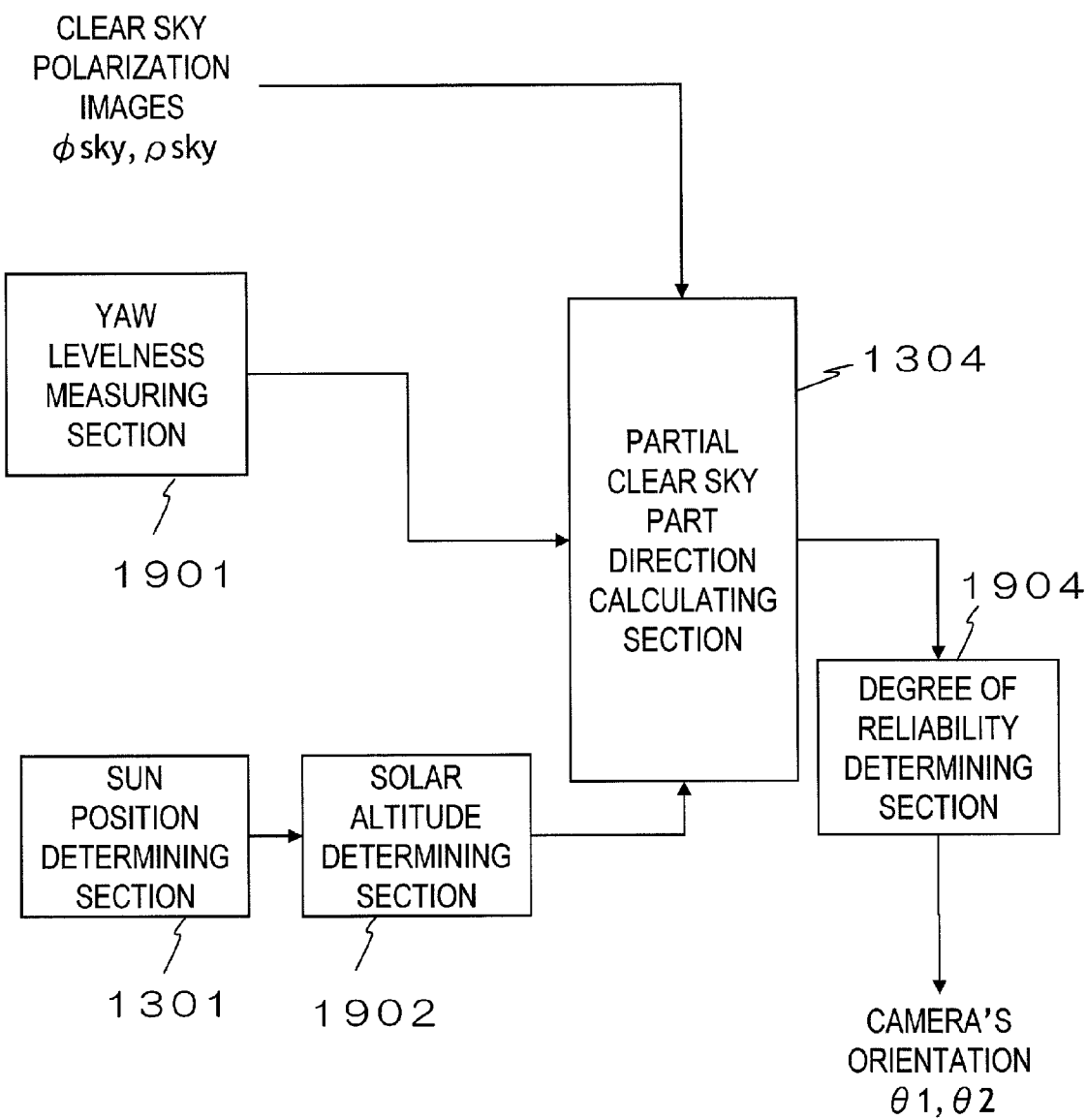

FIG. 27 is a block diagram illustrating a second mode configuration of the camera direction estimating section of the second preferred embodiment of the present invention.

Figure 28:
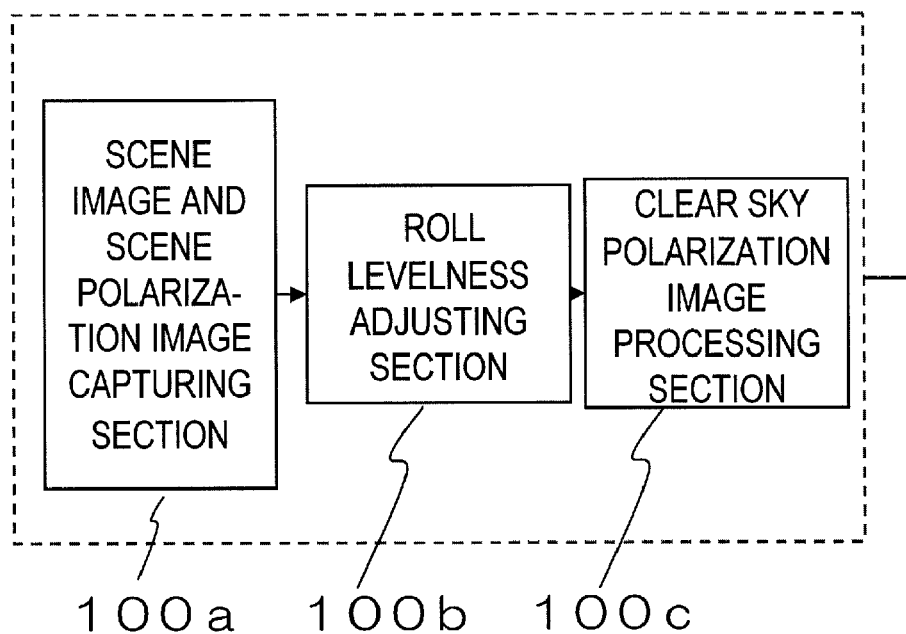
Figure 28:
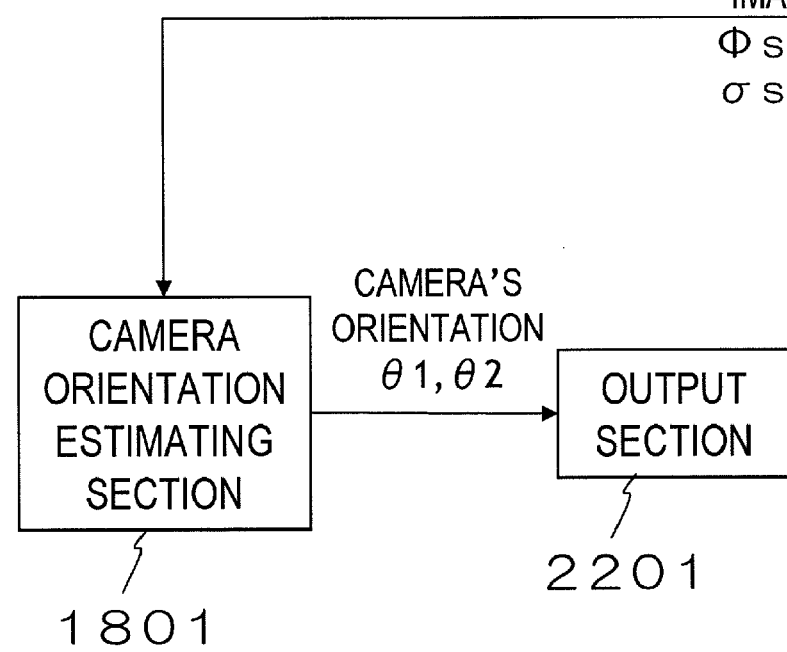

FIG. 28 is a block diagram illustrating a configuration of an image capture device as a third specific preferred embodiment of the present invention.

Figure 29:
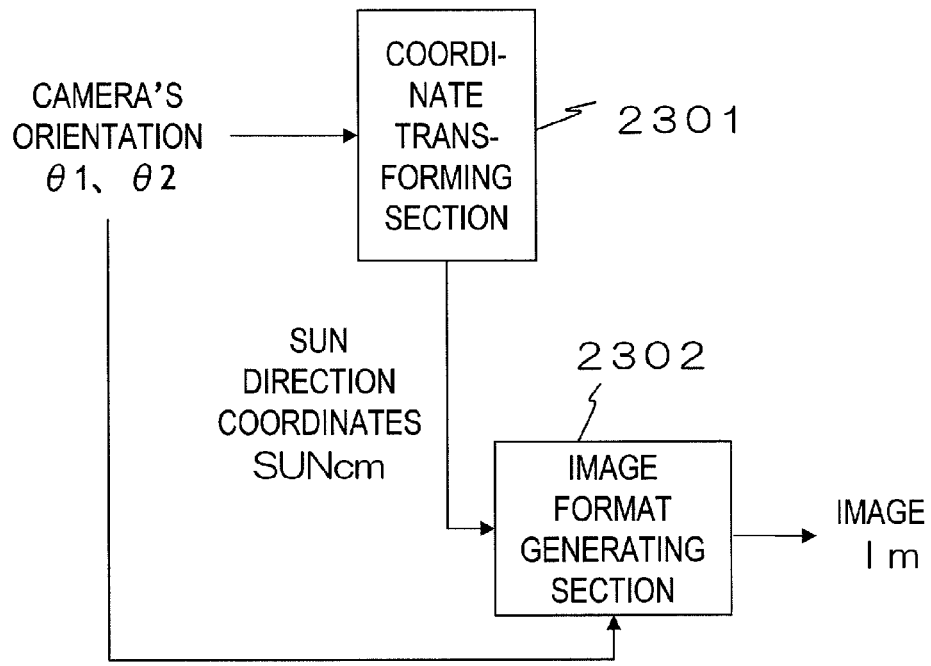

FIG. 29 is a block diagram illustrating a configuration of an output section according to the third preferred embodiment of the present invention.

Figure 30:
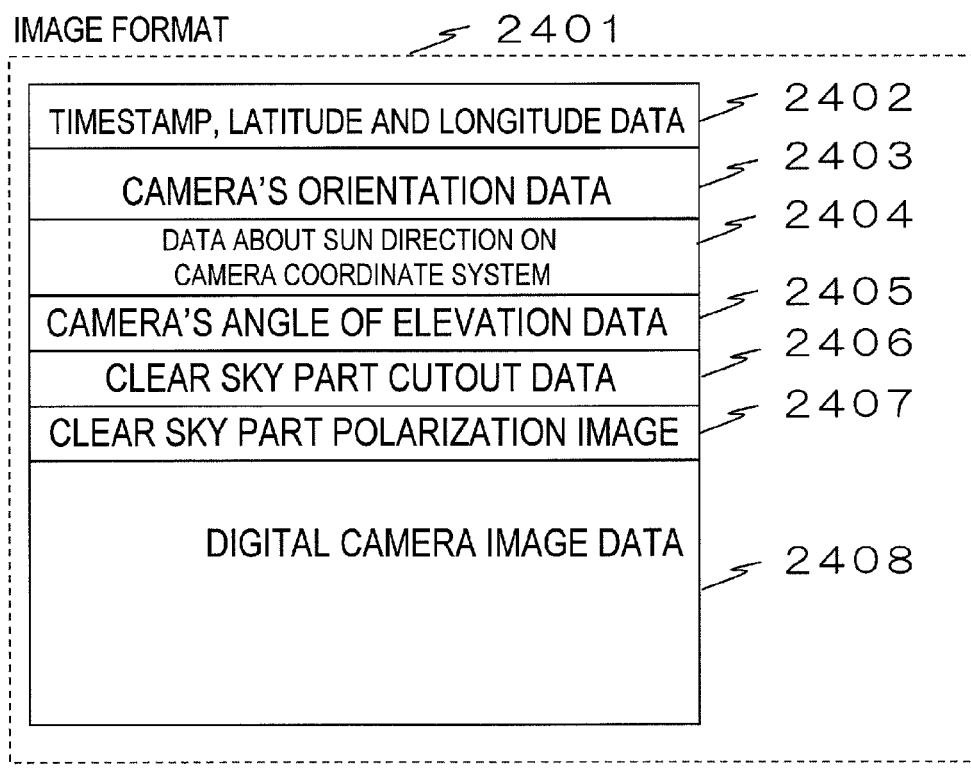

FIG. 30 is a schematic representation showing an image format.

Figure 31:
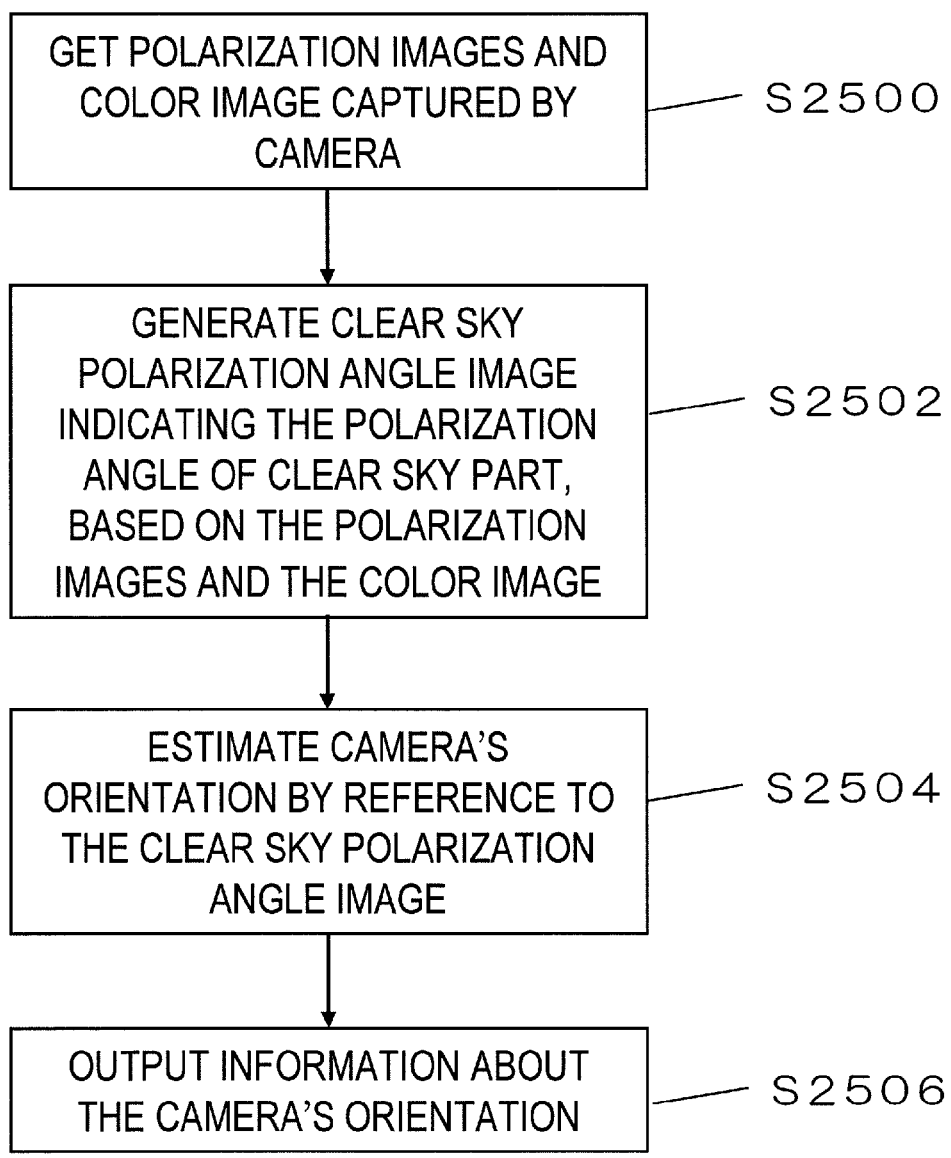

FIG. 31 is a flowchart showing an exemplary method for detecting camera direction according to the present invention.

Figure 32A:
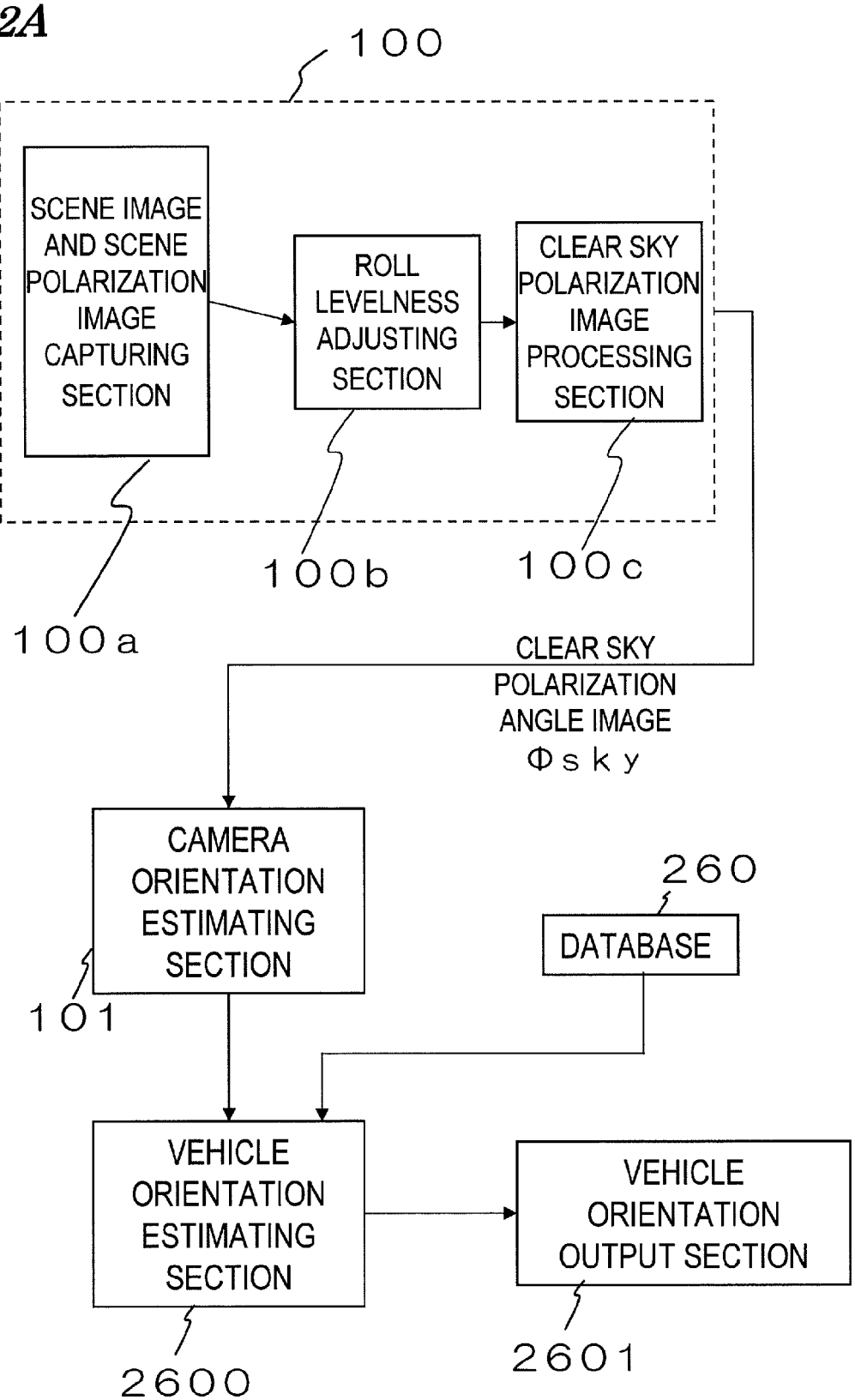

FIG. 32A is a block diagram illustrating a configuration of a vehicle direction detector as a fourth specific preferred embodiment of the present invention.

Figure 32B:
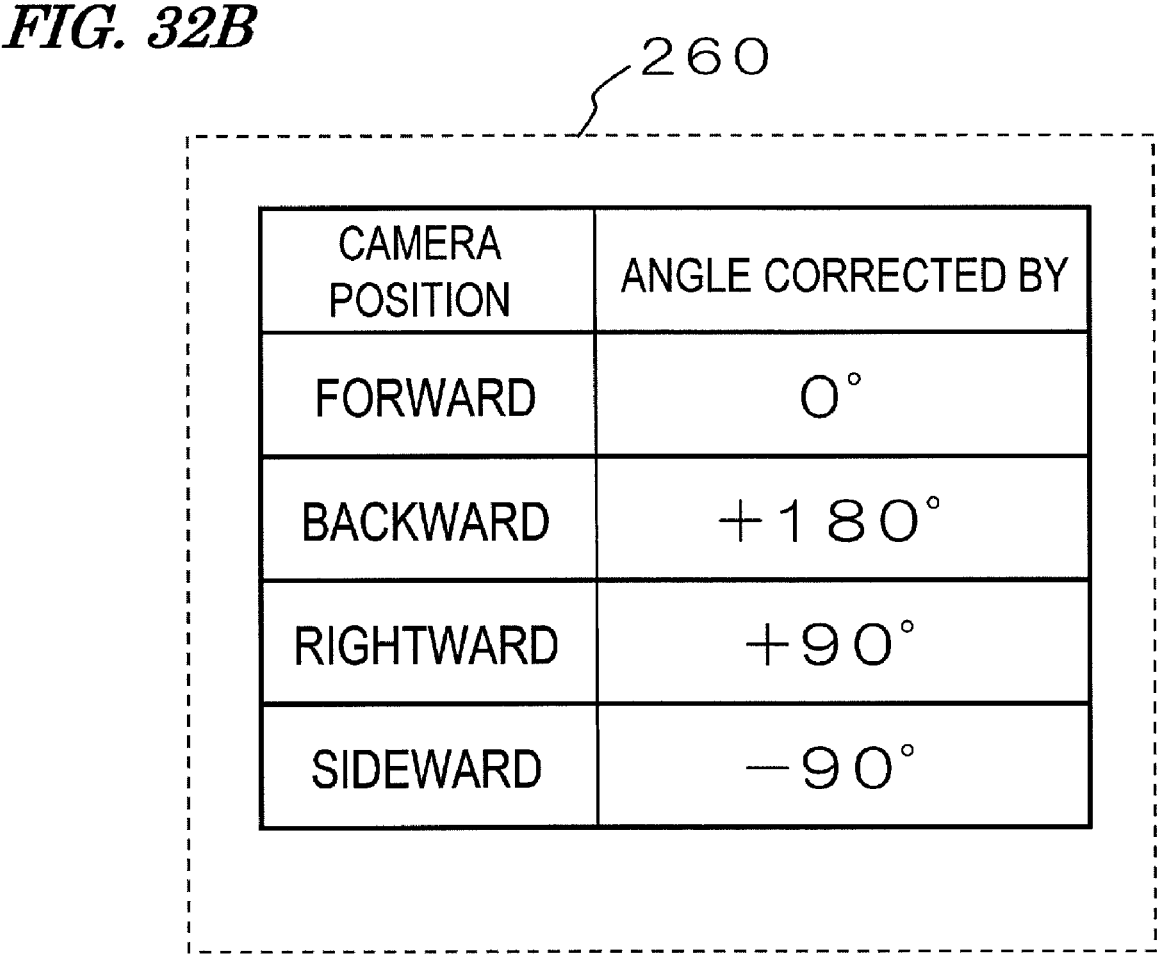

FIG. 32B shows an exemplary structure of the data stored in a database 260 according to the fourth preferred embodiment of the present invention.

Figure 33:
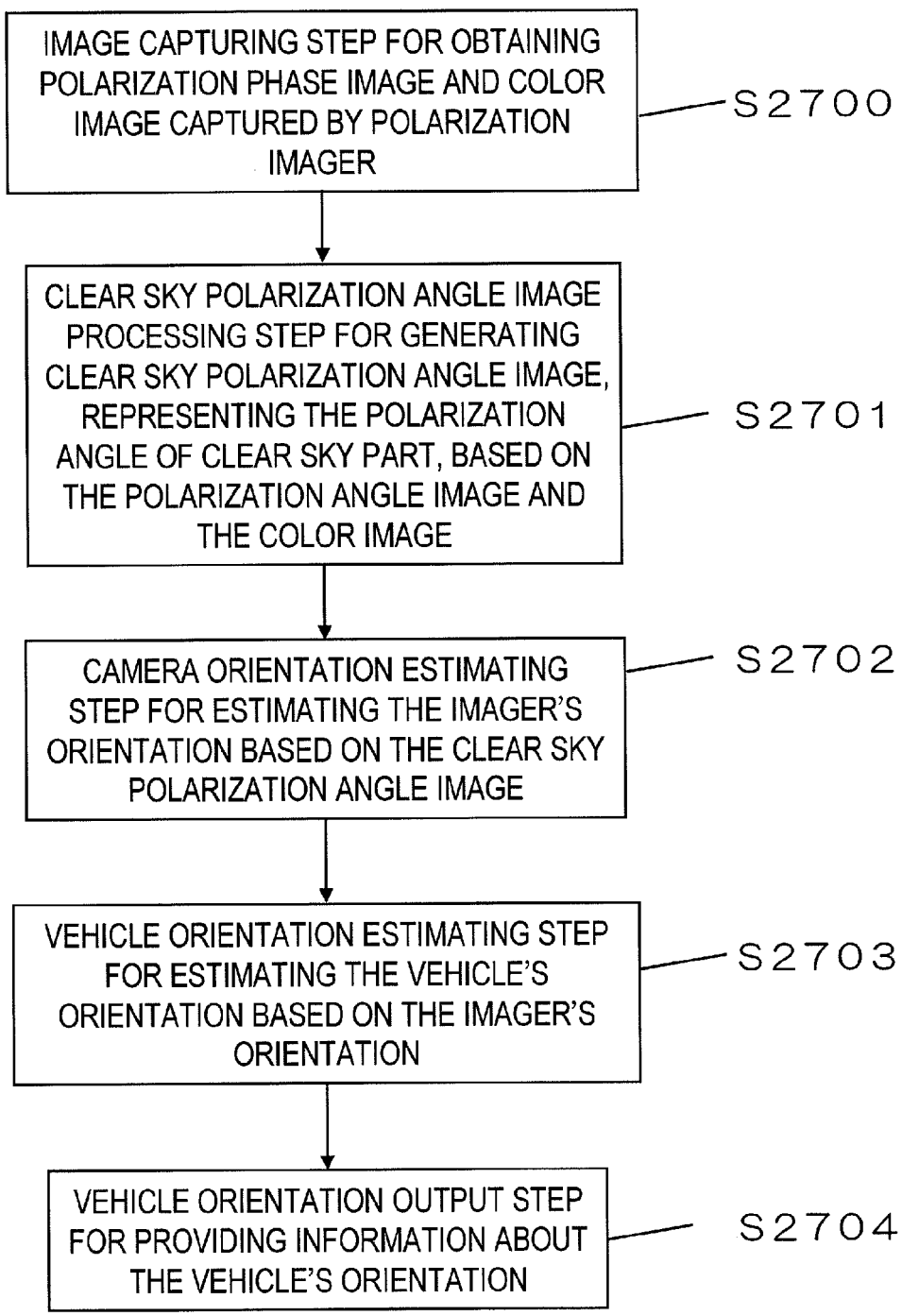

FIG. 33 is a flowchart showing an exemplary method for detecting the vehicle direction according to the fourth preferred embodiment of the present invention.

Figure 34:
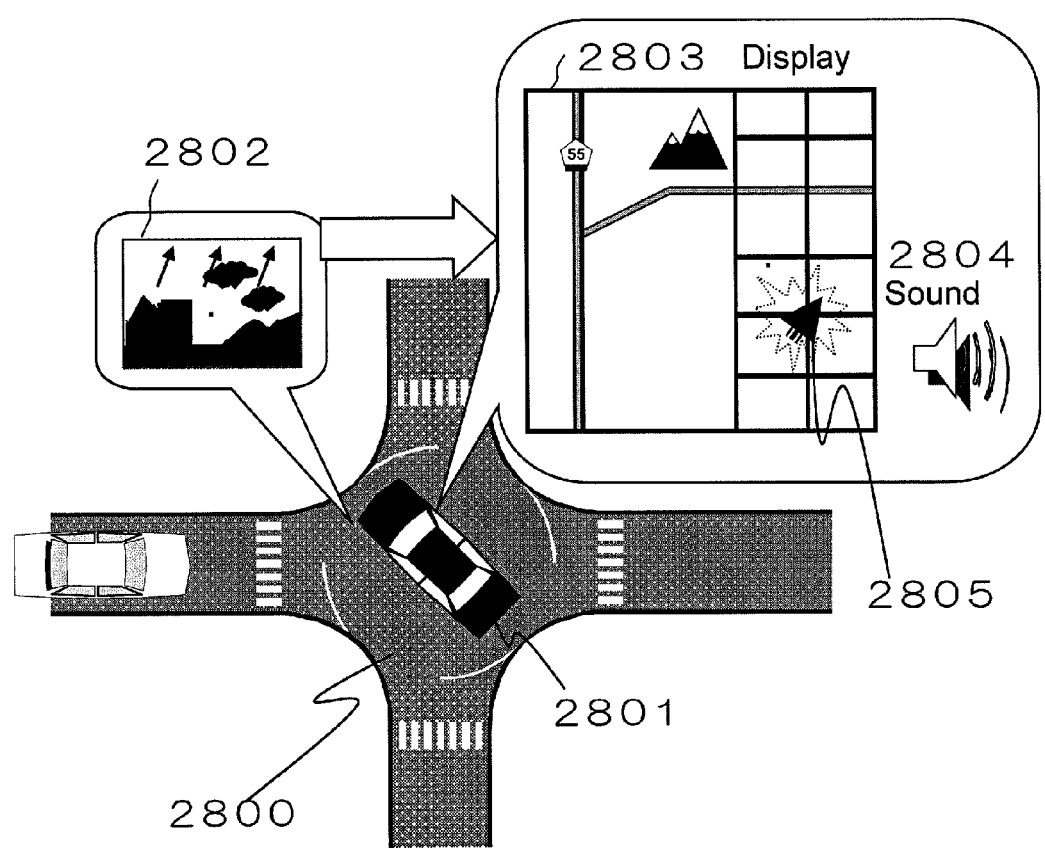

FIG. 34 illustrates, as an example, how a vehicle direction detector according to the fourth preferred embodiment of the present invention may be used.

Figure 35:
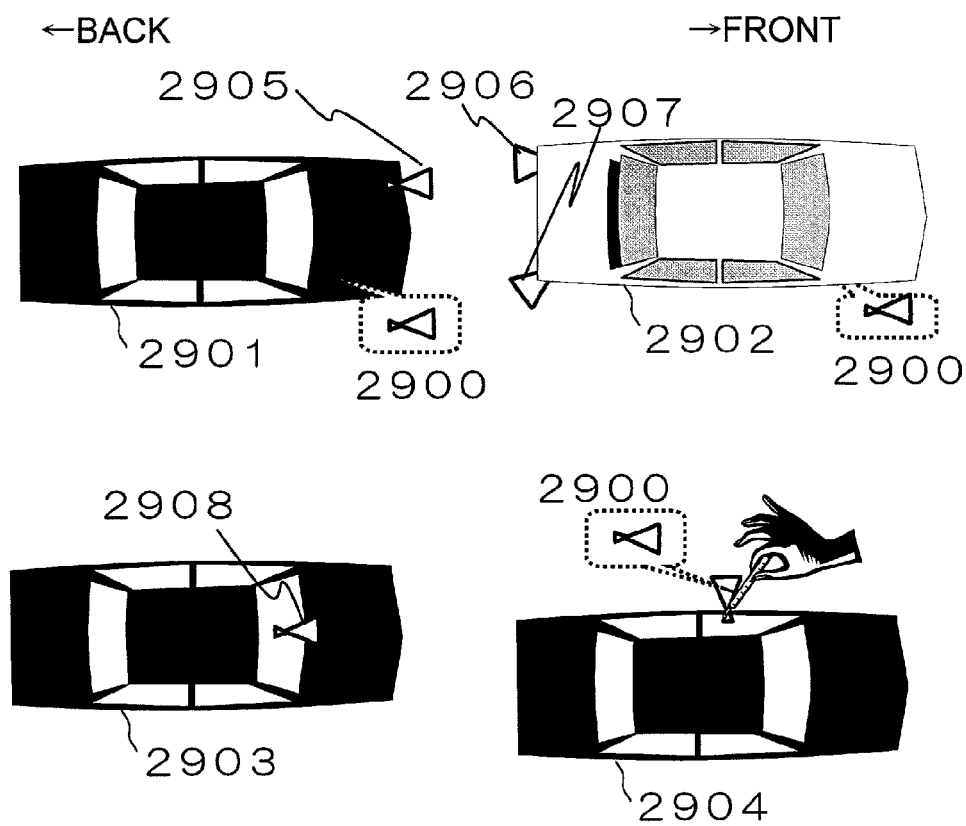

FIG. 35 illustrates exemplary positions where the vehicle direction detector of the fourth preferred embodiment of the present invention may be set up.

Figure 36:
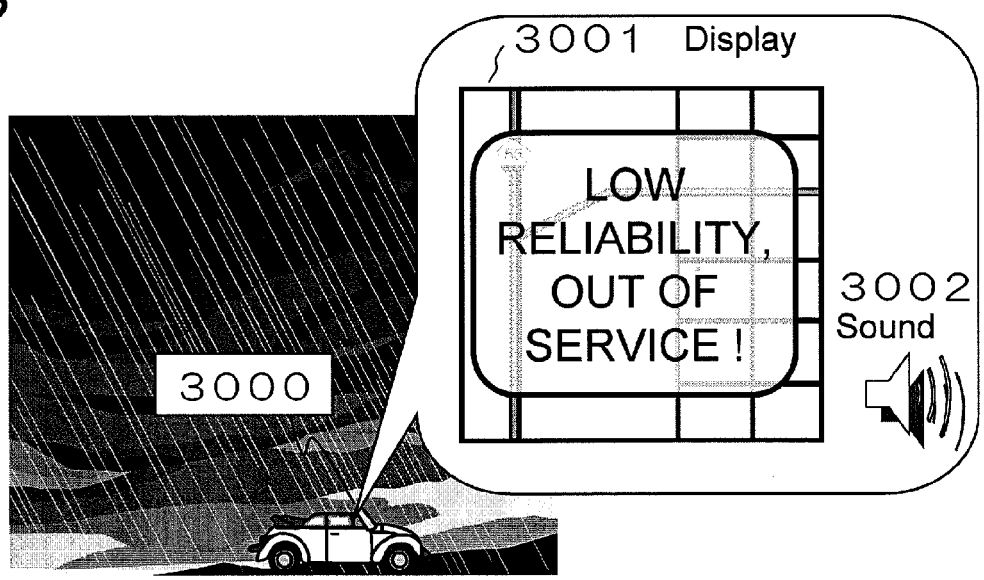

FIG. 36 illustrates how to indicate that the vehicle direction detector of the fourth preferred embodiment of the present invention is out of service.

Figure 37:
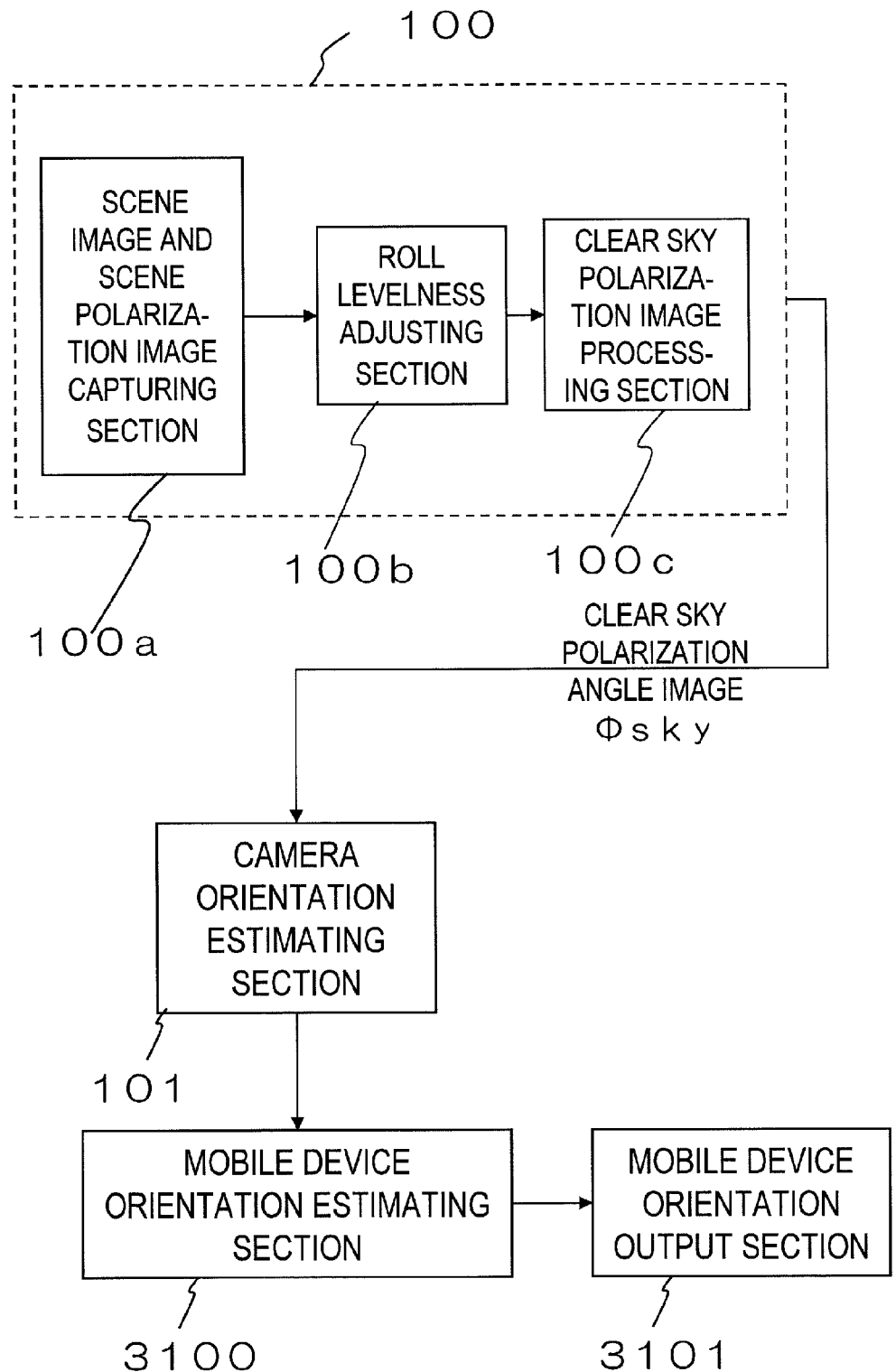

FIG. 37 is a block diagram illustrating a configuration of a mobile device direction detector as a fifth specific preferred embodiment of the present invention.

Figure 38:
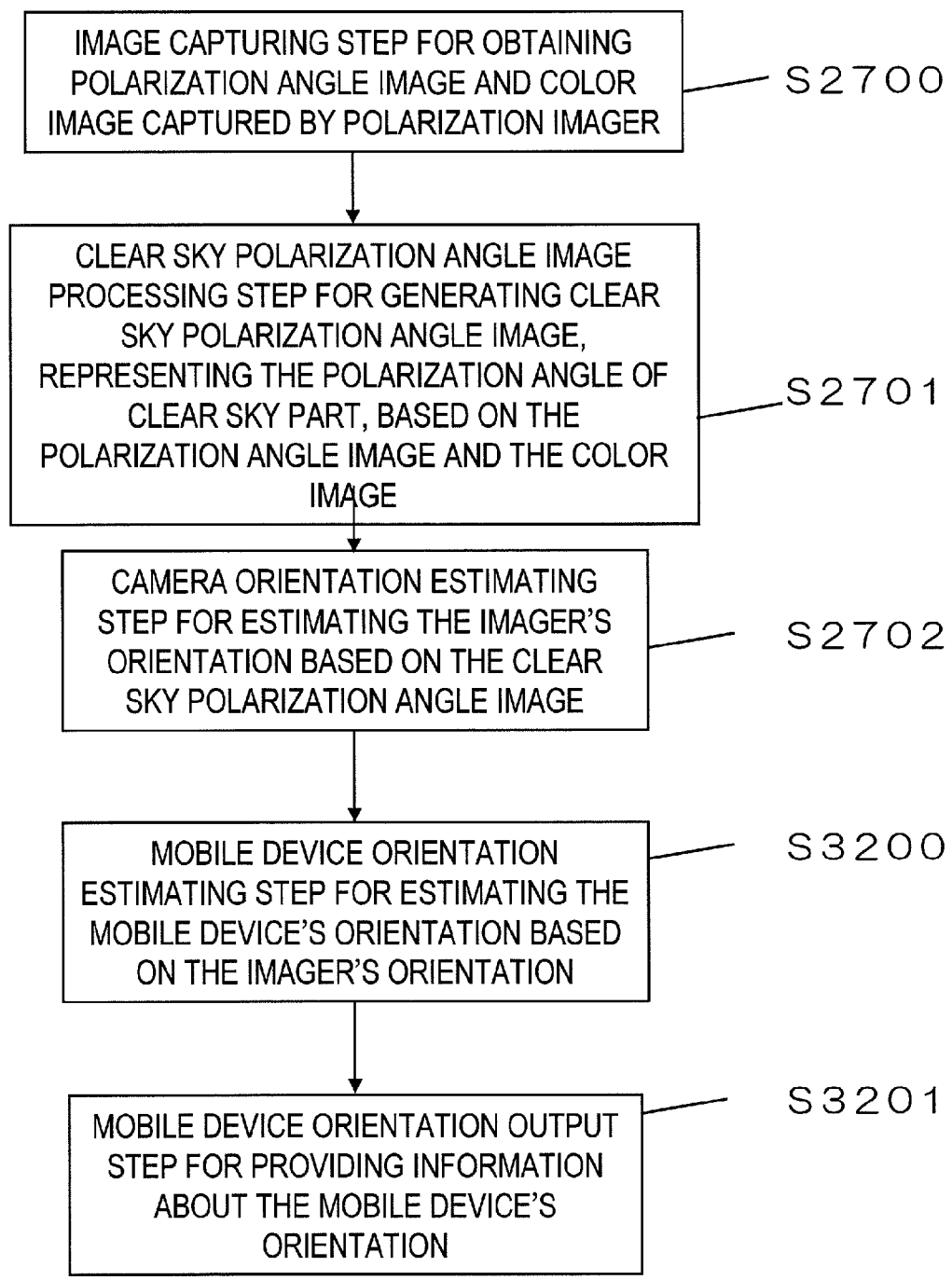

FIG. 38 is a flowchart showing an exemplary method for detecting the direction of the mobile device according to the fifth preferred embodiment of the present invention.

Figure 39:
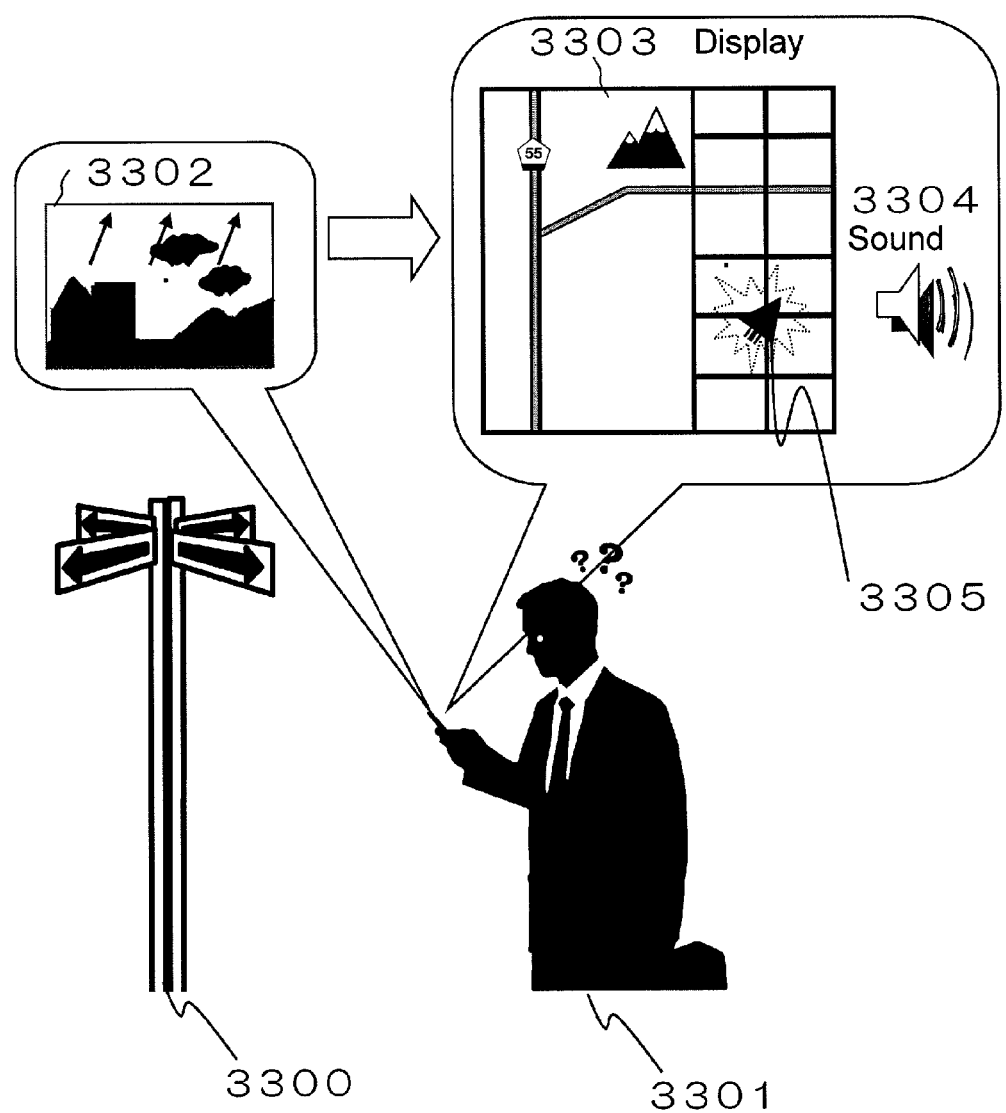

FIG. 39 illustrates as an example how the mobile device direction detector of the fifth preferred embodiment of the present invention may be used.

Figure 40:
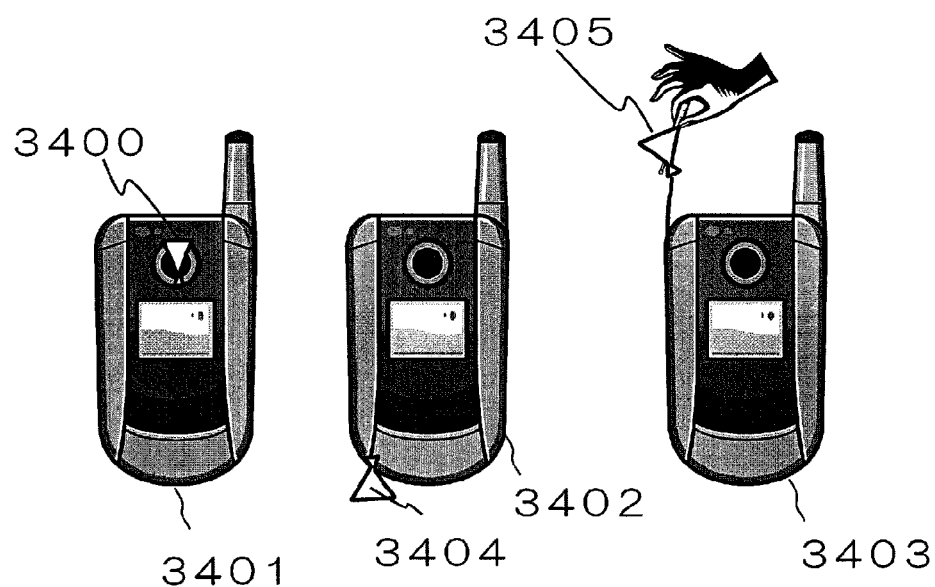

FIG. 40 illustrates exemplary positions where the mobile device direction detector of the fifth preferred embodiment of the present invention may be set up.

Figure 41:
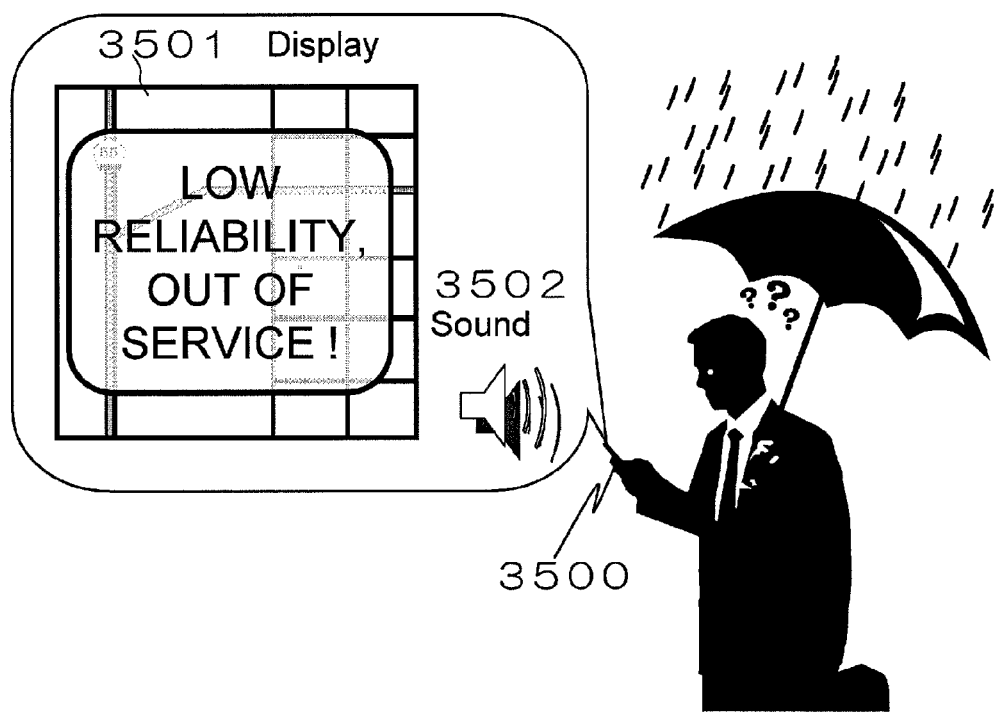

FIG. 41 illustrates how to indicate that the mobile device direction detector of the fifth preferred embodiment of the present invention is out of service.

Figure 42:
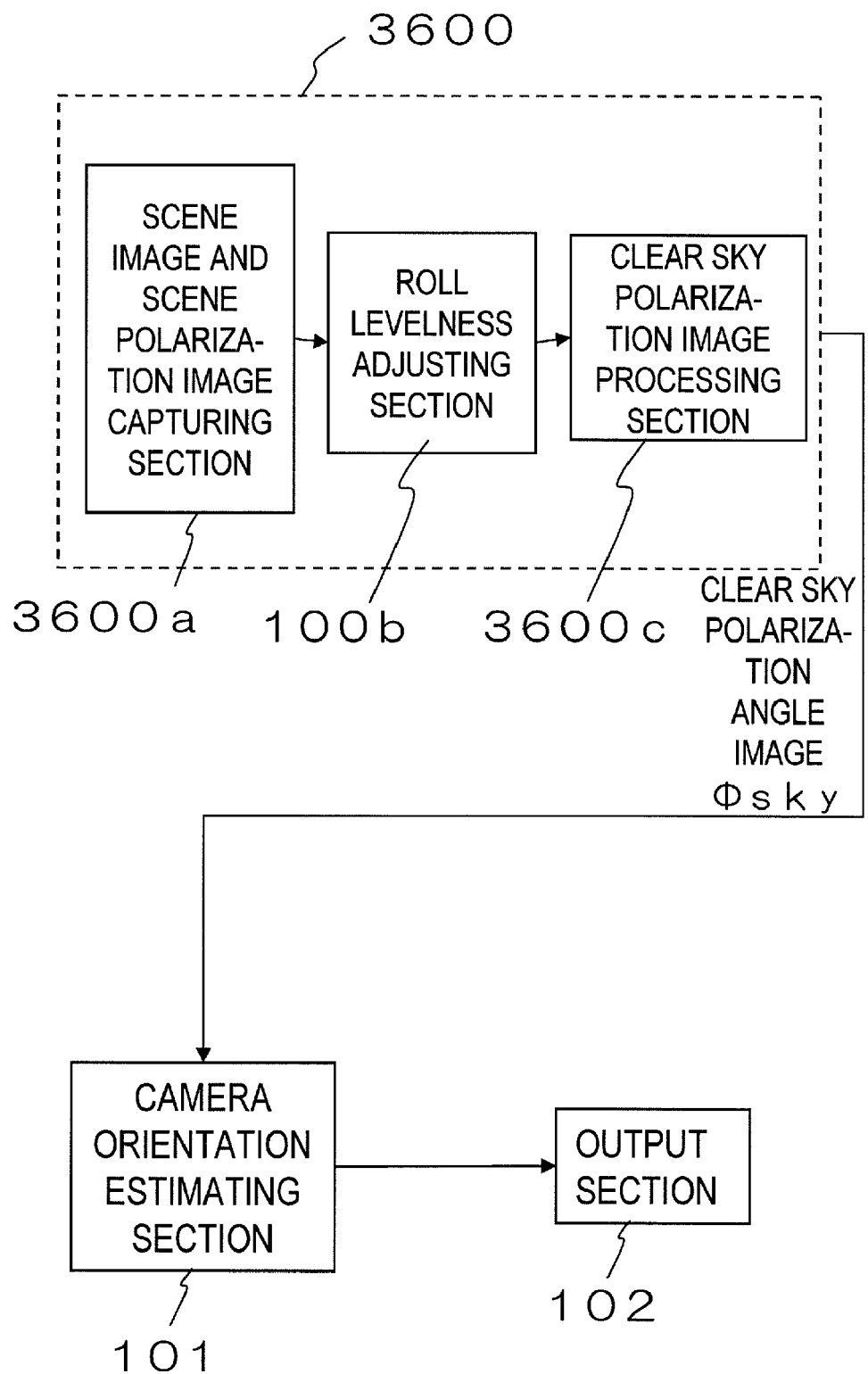

FIG. 42 illustrates a configuration of a camera direction detector as a sixth specific preferred embodiment of the present invention.

Figure 43:
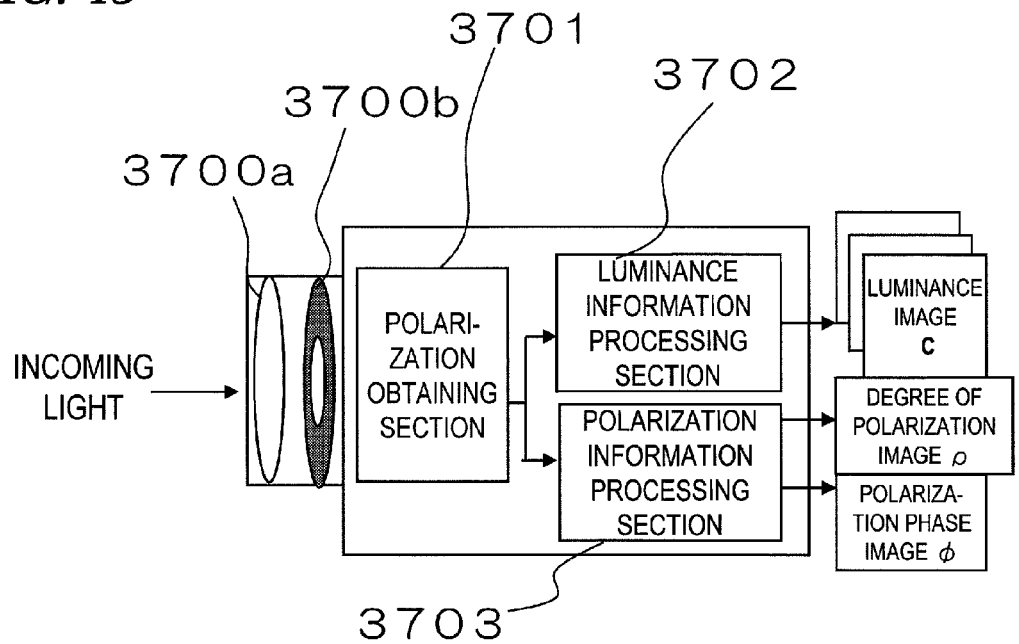

FIG. 43 is a block diagram illustrating a configuration of a scene image and scene polarization image capturing section according to the sixth preferred embodiment of the present invention.

Figure 44:
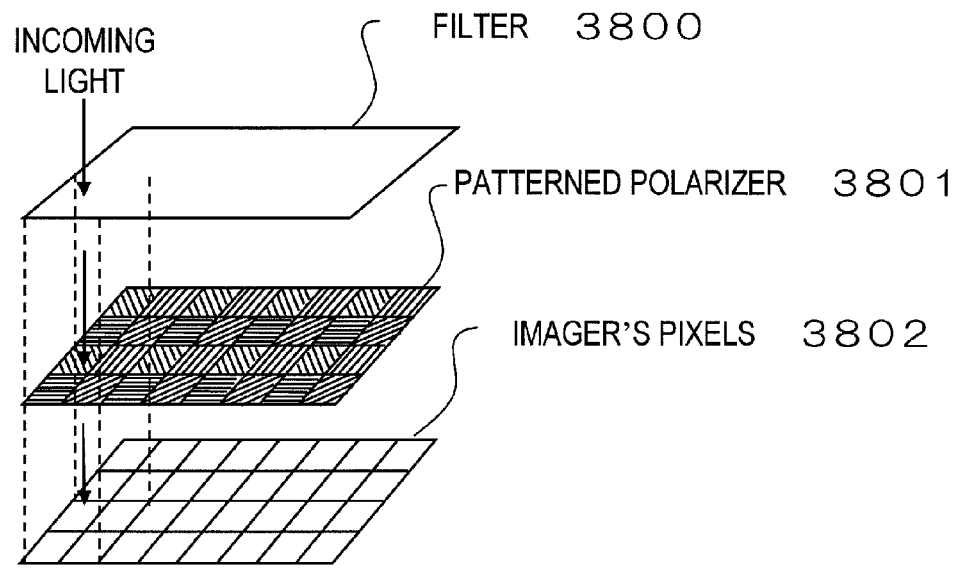

FIG. 44 is a schematic representation illustrating a basic arrangement for a polarization obtaining section according to the sixth preferred embodiment of the present invention.

Figure 45:
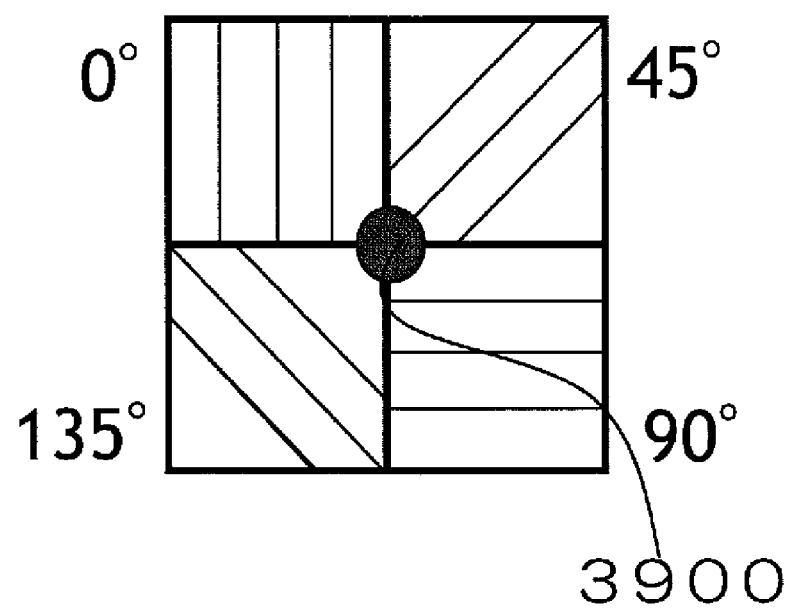

FIG. 45 is a schematic representation illustrating a top view of a part of the image sensing plane of a polarization image capturing section according to the sixth preferred embodiment of the present invention.

Figure 46A:
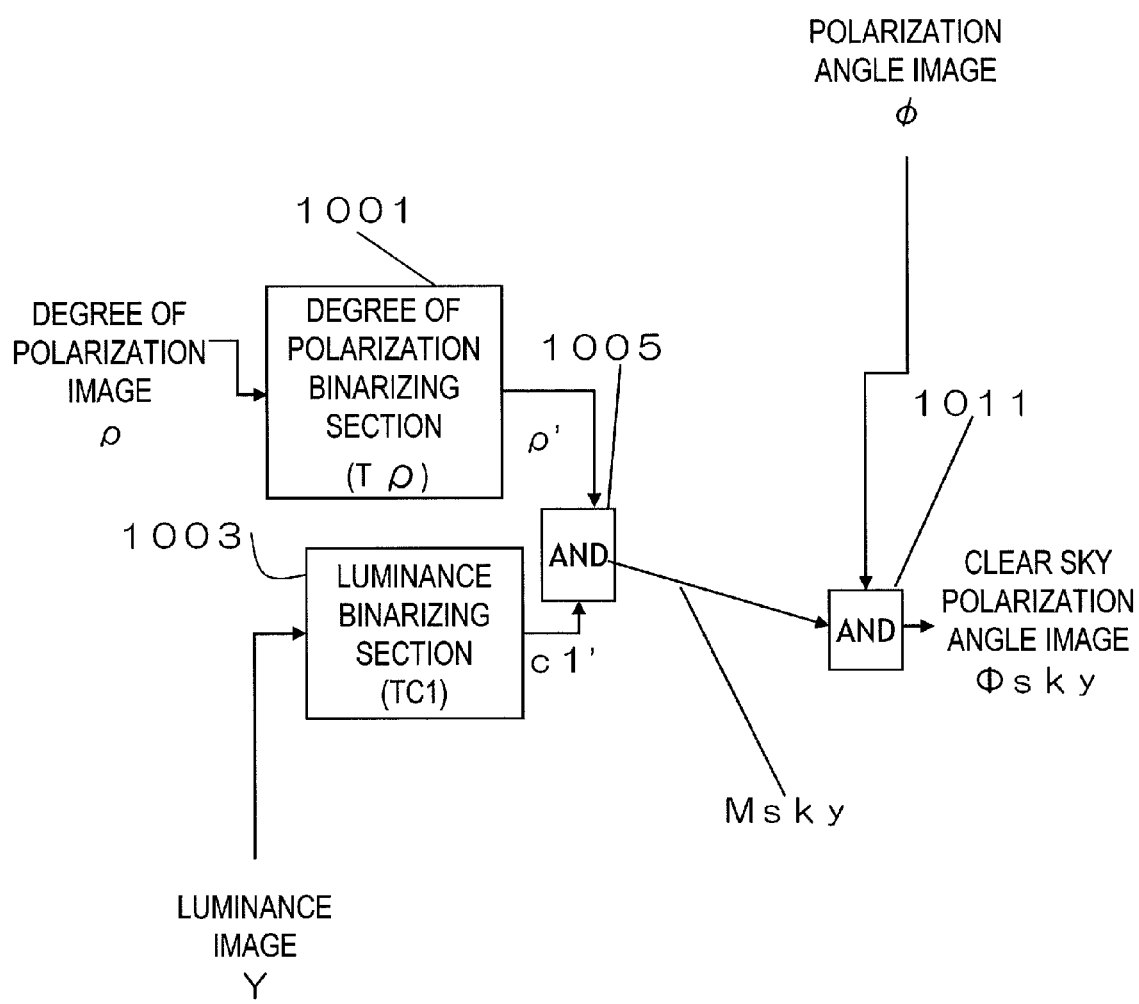

FIG. 46A is a block diagram illustrating a configuration of a clear sky polarization image processing section according to the sixth preferred embodiment of the present invention.

Figure 46B:
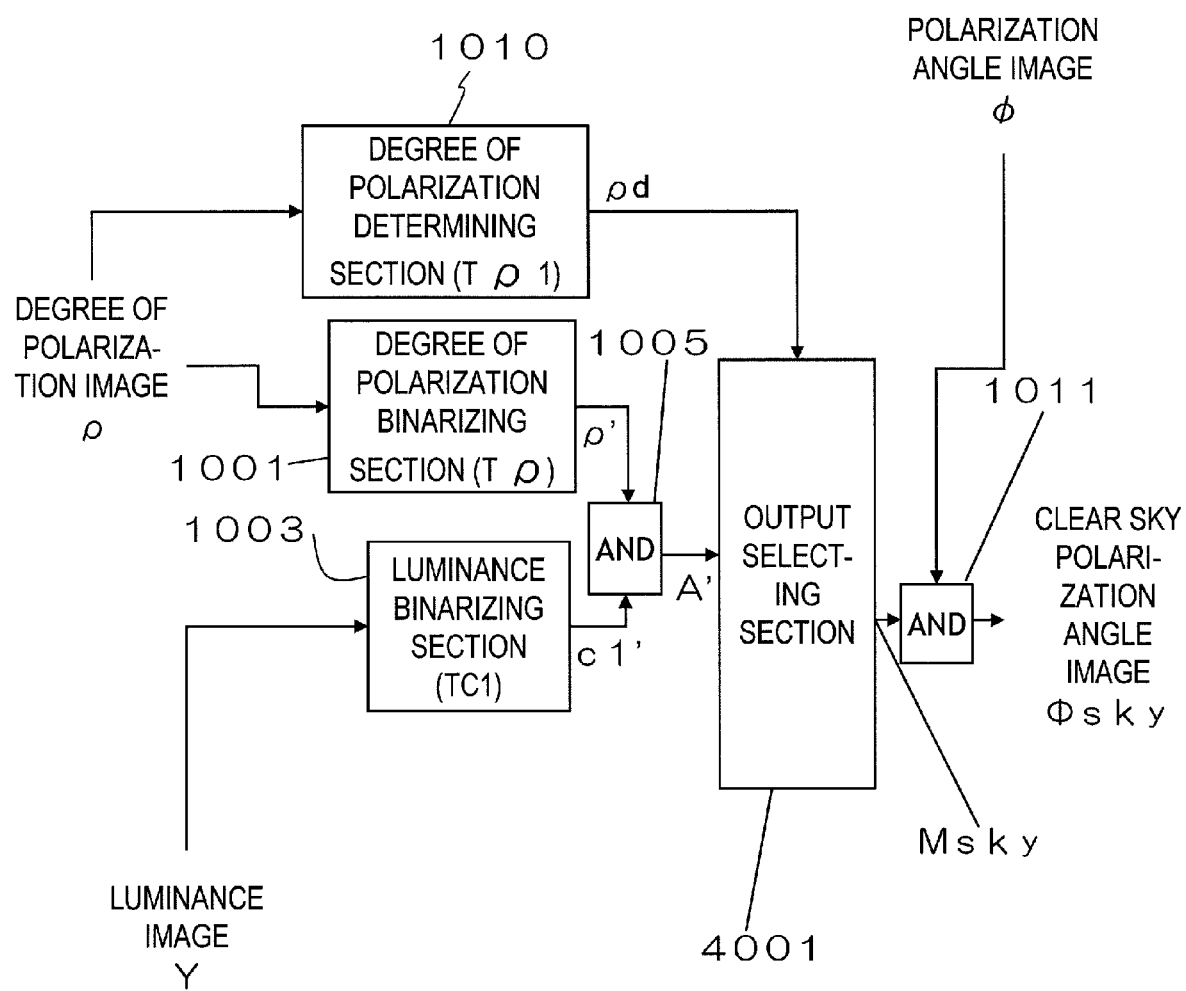

FIG. 46B is a block diagram illustrating another configuration of the clear sky polarization image processing section of the sixth preferred embodiment of the present invention.

Figure 46C:
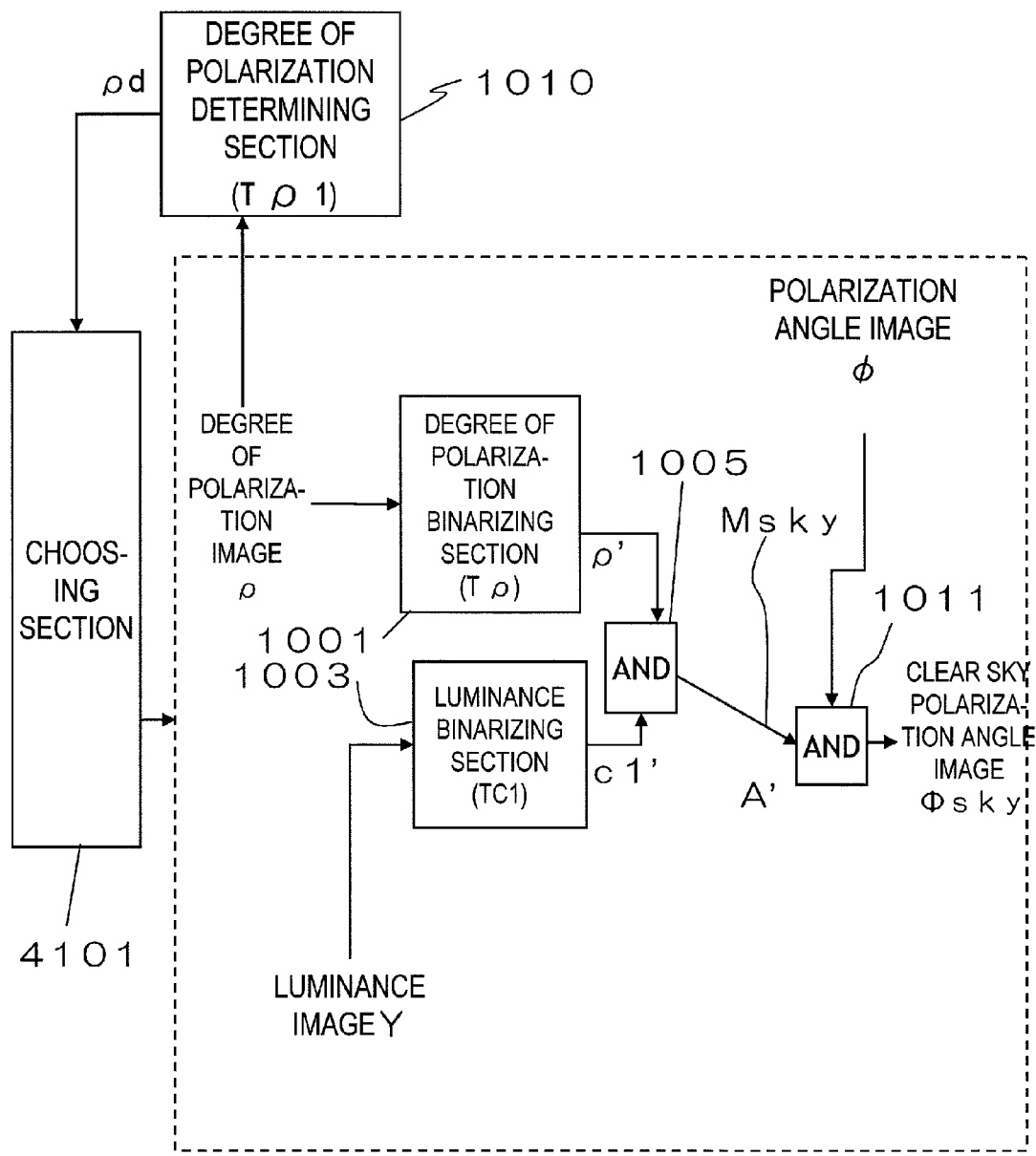

FIG. 46C is a block diagram illustrating still another configuration of the clear sky polarization image processing section of the sixth preferred embodiment of the present invention.

Figure 46D:
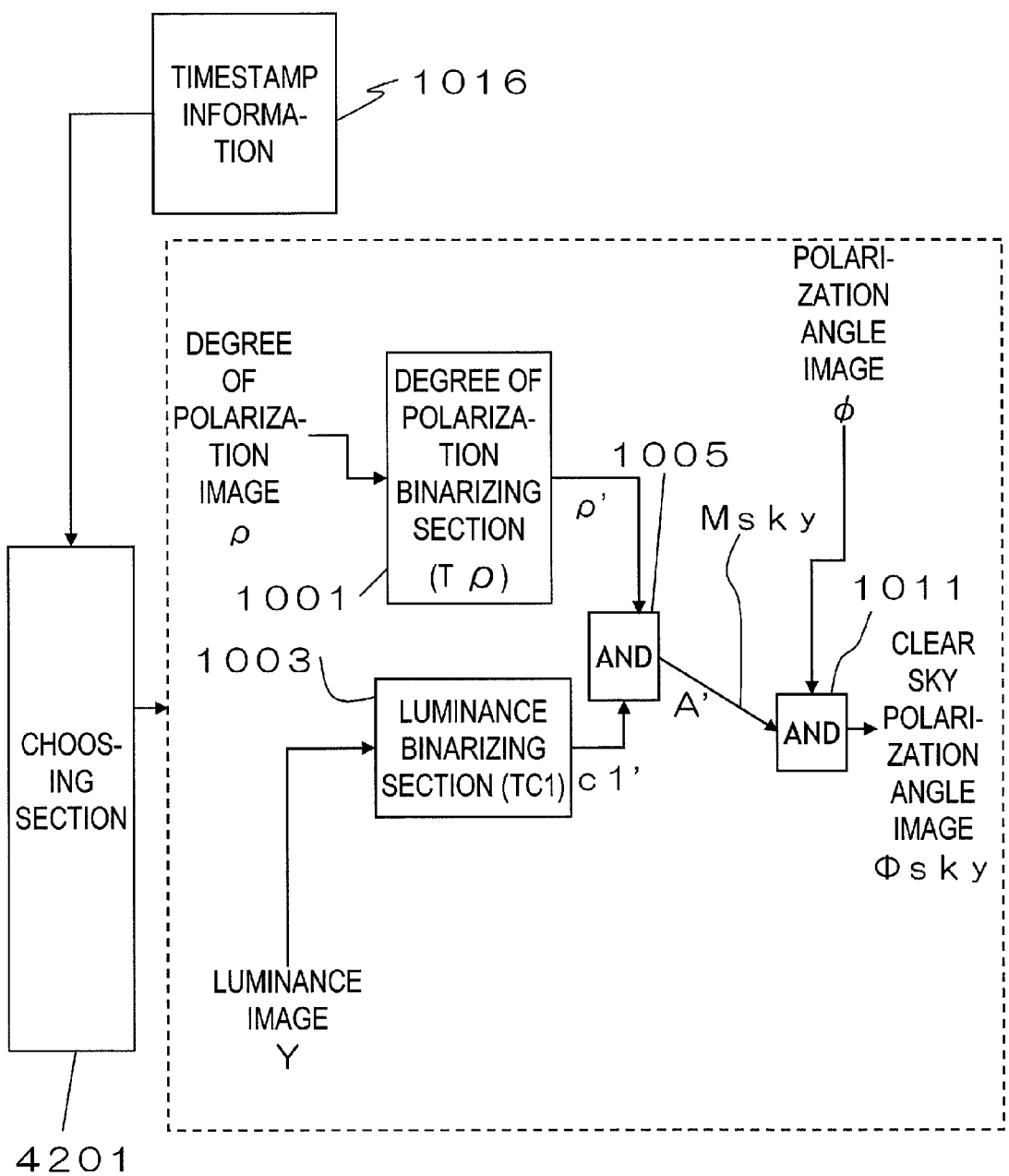

FIG. 46D is a block diagram illustrating yet another configuration of the clear sky polarization image processing section of the sixth preferred embodiment of the present invention.

Figure 47:
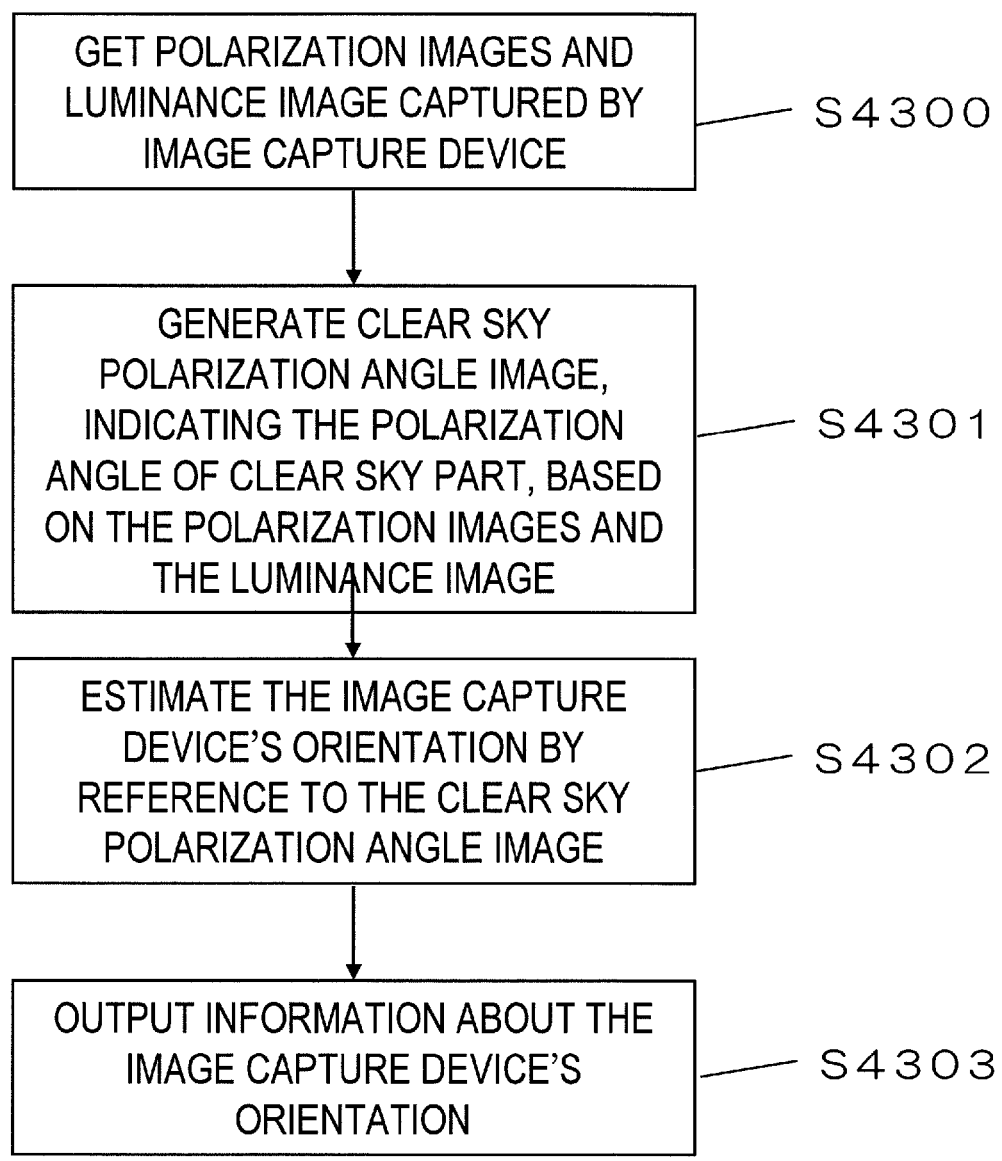

FIG. 47 is a flowchart showing an exemplary method for detecting the direction of the image capture device (camera) according to the sixth preferred embodiment of the present invention.

Figure 48:
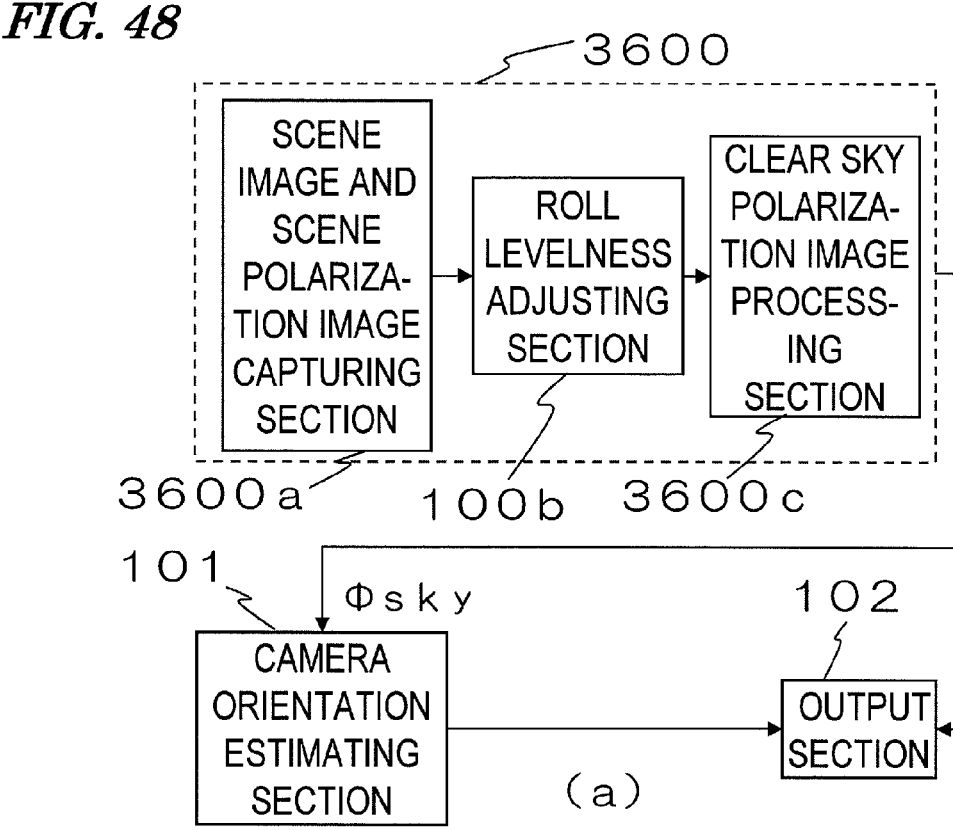
Figure 48:
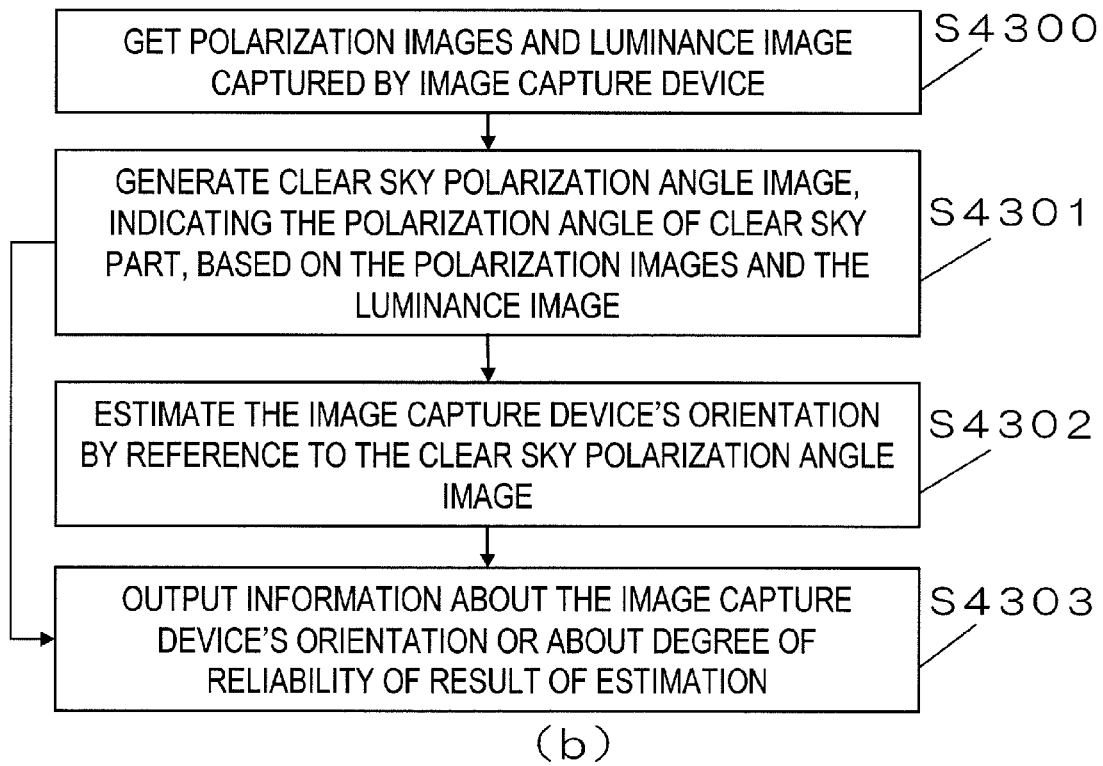

FIGS. 48(a) and 48(b) are respectively a block diagram and a flowchart illustrating method for detecting the optical axis of an image capture device (camera) according to the sixth preferred embodiment of the present invention.

DESCRIPTION OF EMBODIMENTS

The present inventors paid special attention to the fact that a clear sky is polarized. Our invention is based on the experimental knowledge that the direction of the optical axis of the image capture device could be estimated by reference to the polarization patterns of the whole sky and the polarization information of a clear sky part which is included in a scene image.

Figure 1A:
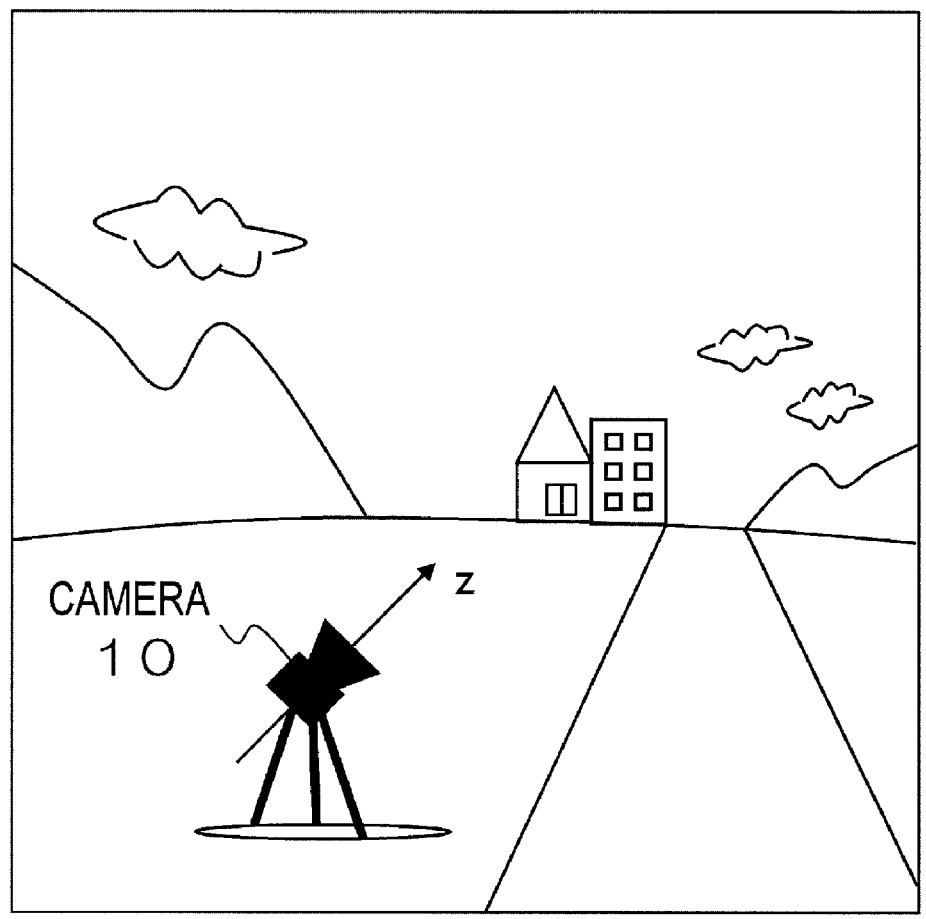
FIG. 1A illustrates how a camera makes a landscape shot outdoors in the direction of camera (optical) axis (i.e., in z-axis direction).
Figure 1B:
FIG. 1B is an example of an image that has been shot.

Suppose a situation where an image capture device 10 (which will be referred to herein as a "camera" for the sake of simplicity) is used outdoors to take a picture of a landscape in the direction of its optical axis (i.e., the z-axis direction). In this example, a part of the clear sky (which will be referred to herein as a "clear sky part") is supposed to be included the scene image shot as shown in FIG. 1B, in which the clear sky part is shadowed by oblique lines that are supposed to schematically represent the polarization angle of the clear sky. In this case, the "polarization angle" is the angle indicating the polarization principal axis direction (i.e., the polarization angle) and is defined by the angle of rotation about the optical axis of the image capture device.

Generally speaking, the polarization angle direction (phase angle) is not directly sensible to human eyes but is a piece of information that is not presented in a normal image (i.e., a luminance image). However, if a polarization filter is arranged in front of the camera 10 and rotated about the optical axis of the camera (i.e., the z-axis direction) shown in FIG. 1A, the (polarized) light that has come from the clear sky can be transmitted through the polarization filter with the highest transmittance at a particular angle of rotation. In that case, direction (angle) of the transmission axis of the polarization filter corresponds to the polarization direction (i.e., phase angle) of the clear sky part that is located at the far end of the direction of the optical axis of the camera (i.e., z-axis).

Figure 1C:
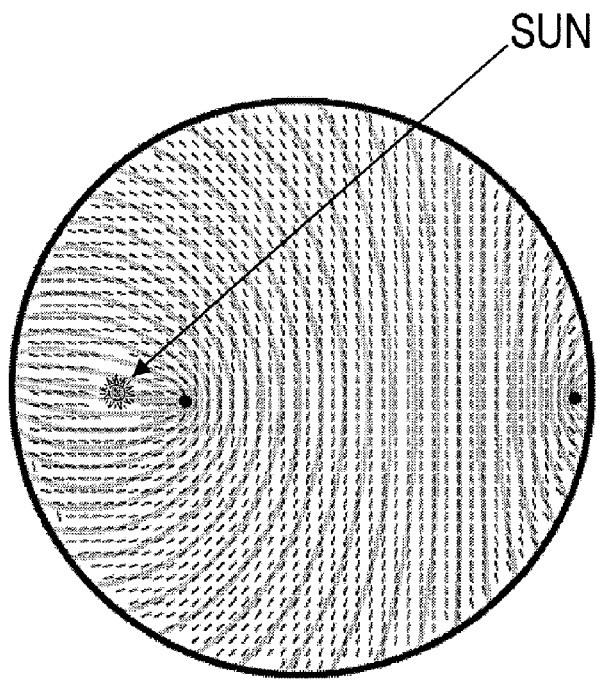
FIG. 1C illustrates a whole sky polarization pattern as an example.
Figure 1D:
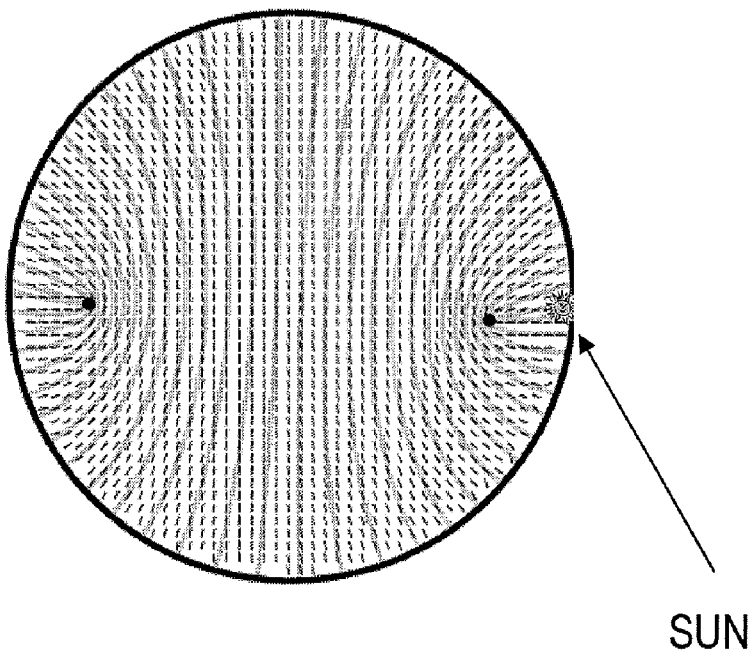
FIG. 1D illustrates a whole sky polarization pattern as another example.

FIGS. 1C and 1D illustrate examples of whole sky polarization angle patterns. In each of these circles, polarization pattern of the hemispherical whole sky is illustrated. And the center of each circle represents the zenith and its circumference represents the horizon. In FIGS. 1C and 1D, a lot of curves are drawn, and a tangential to an arbitrary position on any of those curves indicates the direction of the polarization angle at that position. In the simplest model, the whole sky polarization pattern has polarization directions defined concentrically around the sun at the center. However, it is known by actual measurements that the whole sky polarization pattern actually has four singular points with unique polarization properties as is disclosed in detail in Non-Patent Document No. 4.

As will be described in detail later, the polarization of the clear sky varies according to the sun's position. That is why once the sun's position has been determined by reference to various pieces of information including the image date and time, and location (i.e., the longitude and latitude thereof), the celestial polarization pattern then is fixed. Alternatively, the polarization angle at an arbitrary position on the sky may be obtained by making calculations once the information including the image date and time, and location have been given. Still alternatively, a map on which each celestial position is associated with a polarization angle (i.e., a whole sky polarization map) may also be stored in a database retained in a storage device as well.

Figure 1E:
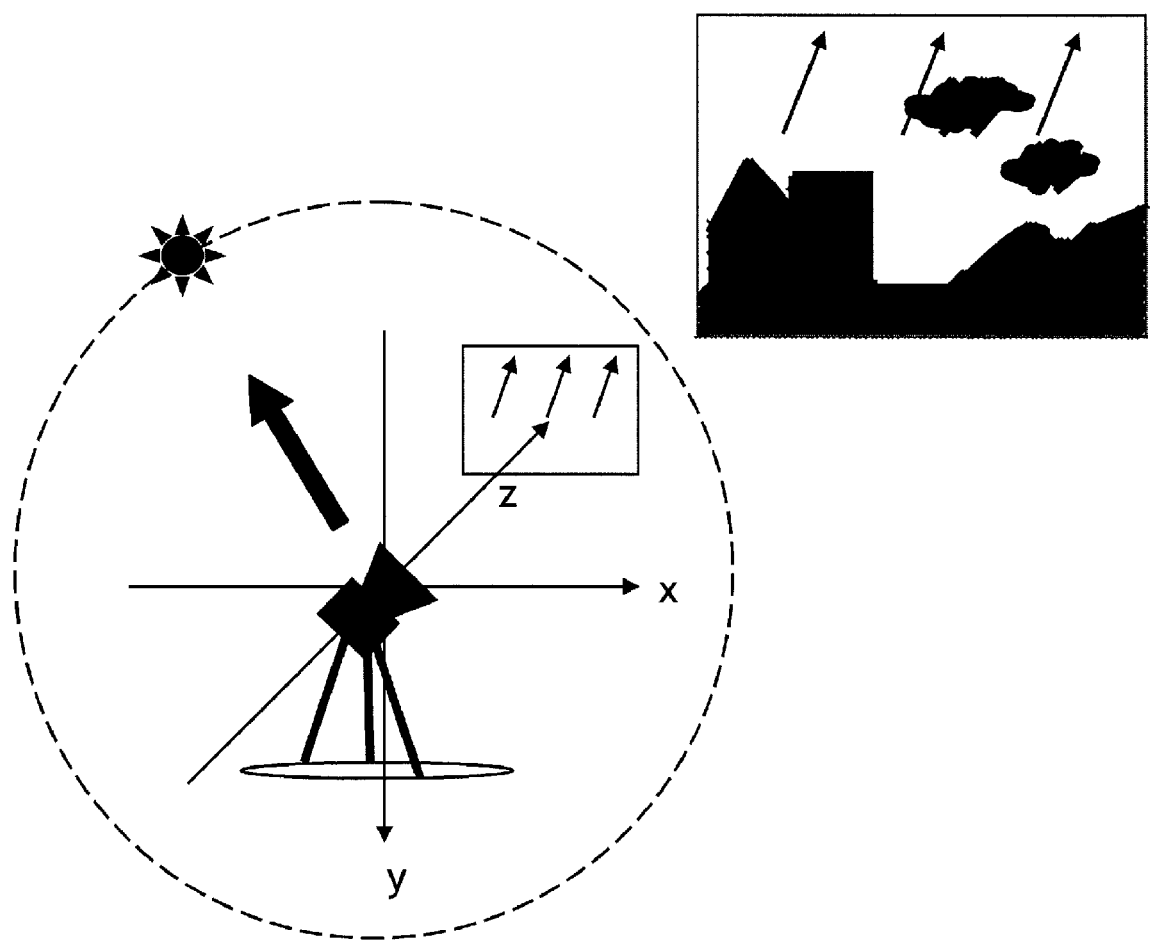
FIG. 1E illustrates an exemplary relative position of the direction of camera axis (z-axis direction) with respect to the sun.

FIG. 1E illustrates an exemplary relation between the direction of the optical axis of camera and the sun's position. At the end of the direction of the optical axis of camera, illustrated schematically is the rectangular area of a scene image to capture (i.e., the image area thereof). In this rectangular area, each arrow indicates the polarization direction of the clear sky part (i.e., the direction of the polarization) in that direction. The polarization angle of the clear sky at a certain date and time varies according to the position on the celestial sphere. That is why once the direction of the camera has changed, the direction of polarization of the clear sky part in the image also changes.

In a preferred embodiment of the present invention, the polarization state of a clear sky part in the shot image is estimated while the information on the polarization of the whole sky is either retrieved from a database or calculated. So, by comparing the polarization state of the clear sky part to the information on the polarization of the whole sky, the shooting direction and the relation between the sun's position and the camera can be obtained. Also, according to another preferred embodiment, the clear sky part direction may be just calculated without using a database to estimate the direction of the camera (i.e., the direction of the optical axis of the image capture device).

Hereinafter, preferred embodiments of the present invention will be described with reference to the accompanying drawings.

Embodiment 1

Figure 1F:
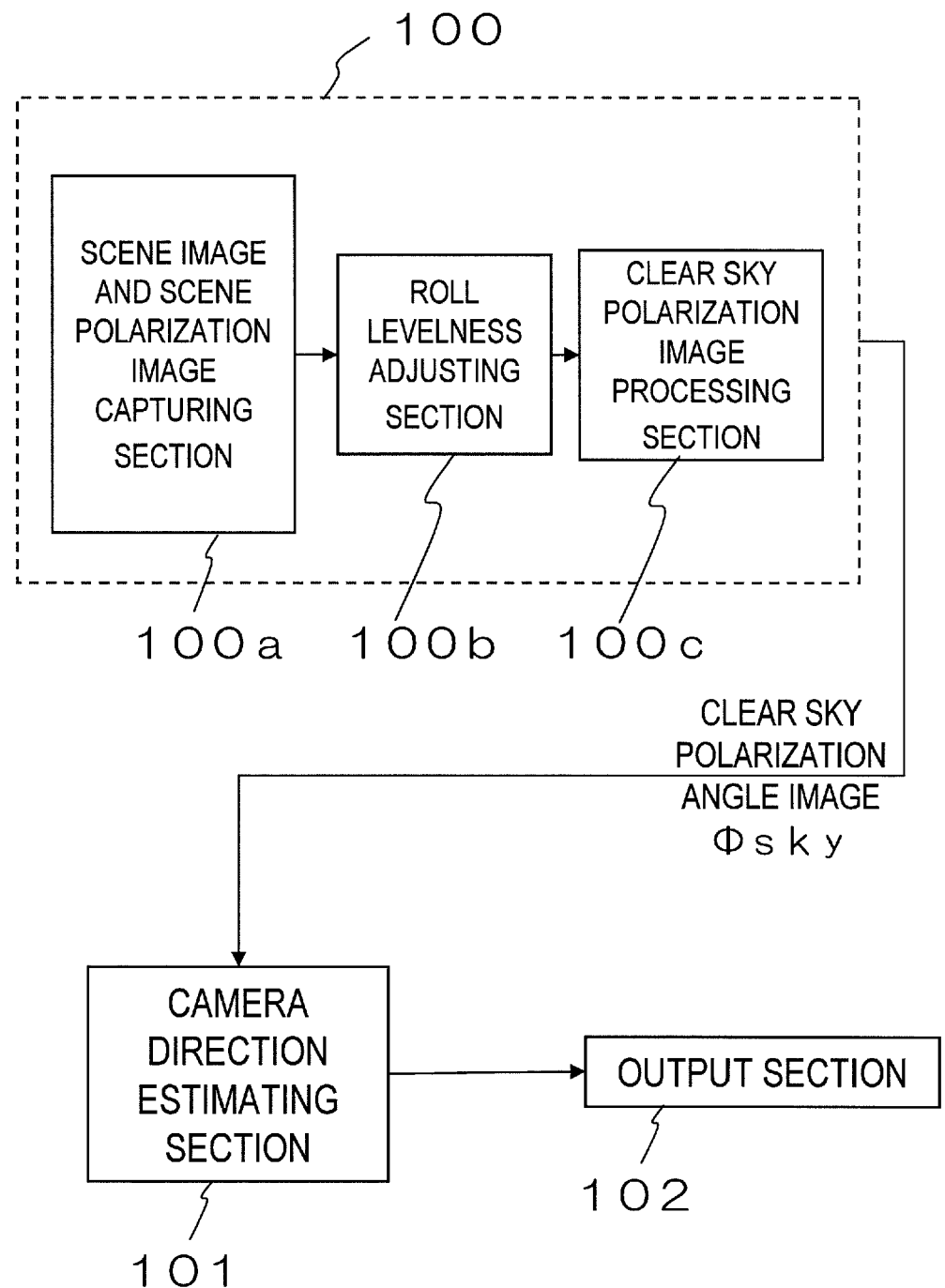
FIG. 1F is a block diagram illustrating a configuration of an image capture device as a first specific preferred embodiment of the present invention.

FIG. 1F Illustrates a configuration of an image capture device as a first specific preferred embodiment of the present invention. This image capture device includes a clear sky polarization angle image capturing section 100, a camera direction estimating section 101, and an output section 102. The clear sky polarization angle image capturing section 100 includes a scene image and scene polarization image capturing section 100a, a roll levelness adjusting section 100b, and a clear sky polarization image processing section 100c and outputs a clear sky polarization angle image ϕsky.

As used herein, the "polarization image" refers to an image composed of pixels showing its own polarization information respectively. Also, the "polarization information" includes the degree of polarization and the polarization angle (or direction of polarization). Therefore, unless stated otherwise, the "polarization image" collectively refers to a "degree-of-polarization image" representing the degrees of polarization of the respective pixels two-dimensionally and a "polarization angle image" representing the polarization angle of the respective pixels two-dimensionally.

The degree of polarization and the magnitude (numerical value) of the polarization angle of each pixel can be represented as either the lightness or hue of that pixel. Thus, in the drawings accompanying this application, the degree of polarization and the magnitude of the polarization angle are represented by the magnitude of lightness.

Hereinafter, the configuration and operation of an image capture device according to this preferred embodiment will be described in detail.

First of all, some terms for use herein to describe a rotation axis of the camera will be described with reference to FIG. 2.

The rotation of the camera about the axis that extends sideward from the camera (i.e., upon the x-axis) as indicated by the arrow 201 will be referred to herein as "yaw". On the other hand, the rotation of the camera about the axis that extends perpendicularly through the camera (i.e., upon the y-axis) as indicated by the arrow 202 will be referred to herein as "pitch". And the rotation of the camera about the axis that extends forward and backward through the camera (i.e., upon the z-axis) as indicated by the arrow 203 will be referred to herein as "roll".

Figure 2:
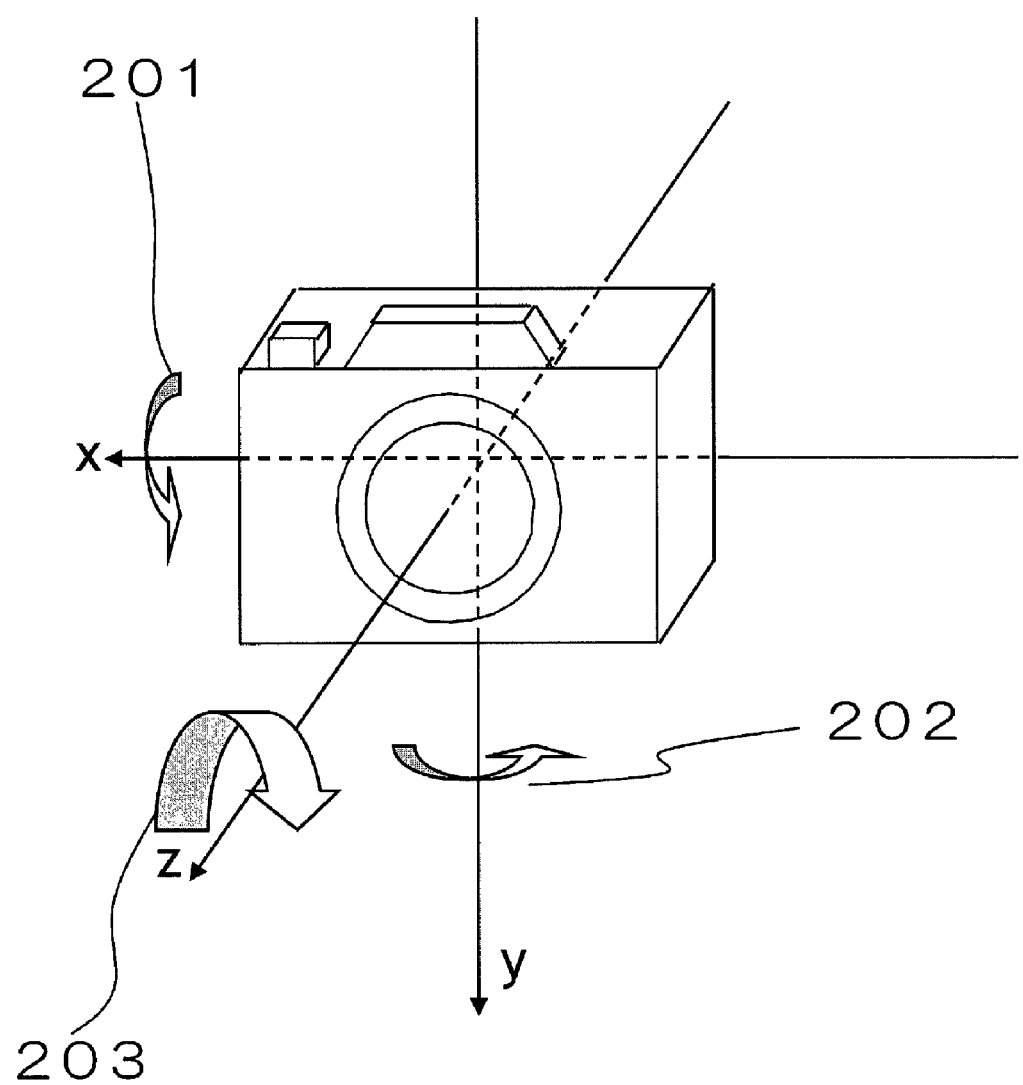
FIG. 2 illustrates three rotation axes of a camera used in the description of present invention.

It is preferred that every component shown in FIG. 1F be contained in the camera shown in FIG. 2. However, the scene image and scene polarization image capturing section 100a, and a level to measure the tilt angle of the camera towards the roll direction, could be contained in the camera shown in FIG. 2, while the roll levelness adjusting section 100b, the clear sky polarization image processing section 100c, the camera direction estimating section 101 and the output section 102 could be arranged outside of the camera, for example.

Since the camera includes an image capturing section that functions as the scene image and scene polarization image capturing section 100a, the contents of the scene image and the scene polarization image to be shot will vary according to the direction of the camera.

Series of steps to estimate the direction of the camera is preferably performed inside of the camera, but do not always have to be so.

In the following description, a device that includes an "image capturing section" for capturing a luminance image and polarization images and that allows the user to change the shooting directions will be referred to herein as a "camera", and a device for estimating the direction of the optical axis of the camera (or that of the image capture device) will be referred to herein as either a "camera direction detector" or just an "direction detector", no matter whether the detector is built in the camera or not. Meanwhile, a device that includes both the image capturing section and the direction detector (camera direction detector) will be referred to herein as an "image capture device". Data of a scene image and a scene polarization image are supplied from the image capturing section to the direction detector (camera direction detector). The data can be transmitted and received via a removable memory, a telecommunications line, the Internet or any of various kinds of information distribution media.

A device with such an direction detector does not have to be an image capture device such as a camera. Alternatively, the image capture device and the direction detector could also be attached to mobile devices such as personal digital assistants (including laptop computers) and cellphones. Optionally, a vehicle such as an automobile or a motorcycle could also be equipped with the image capture device and the direction detector.

It should be noted that the direction of a mobile device or a vehicle does not have to agree with that of its own image capture device. This is because the direction of a mobile device or a vehicle and that of the image capture device will satisfy a predetermined relation. That is why once the direction of the image capture device has been detected, the direction of the mobile device or vehicle can be estimated easily based on the detected direction of the image capture device.

Also, as used herein, the "camera" is not always a normal camera that is designed to be hand-held by a user to make a shot but may also be an image capture device to be attached to a vehicle such as an automobile.

Next, the configuration of the scene image and scene polarization image capturing section 100a of this preferred embodiment will be described with reference to FIG. 3. If a shooting on location is to be done satisfactory, both a scene image and a scene polarization image need to be captured at once. Also the clouds may be carried by wind, the polarization image is also preferably captured in real time. It is preferred that the scene image and the scene polarization image be captured at the same time. However, those images could be captured at an interval of at most several seconds.

According to a conventional technique, to capture a polarization image, normally a number of pictures are taken while rotating the polarizer. Such a technique, however, has been impractical for a shooting on location. A technique to simultaneously capture a monochrome image and a polarization image is disclosed in Patent Document No. 3. According to that technique, to capture a luminance image and an object's partial polarization image at the same time, a patterned polarizer with multiple different polarization principal axes (i.e., polarization transmission axes) is arranged spatially in an image capture device. As the patterned polarizer, either a photonic crystal or a form birefringent micro-retarder array can be used. Even if such a technique is adopted, however, a color image and a polarization image cannot be obtained at the same time, either.

Figure 3:
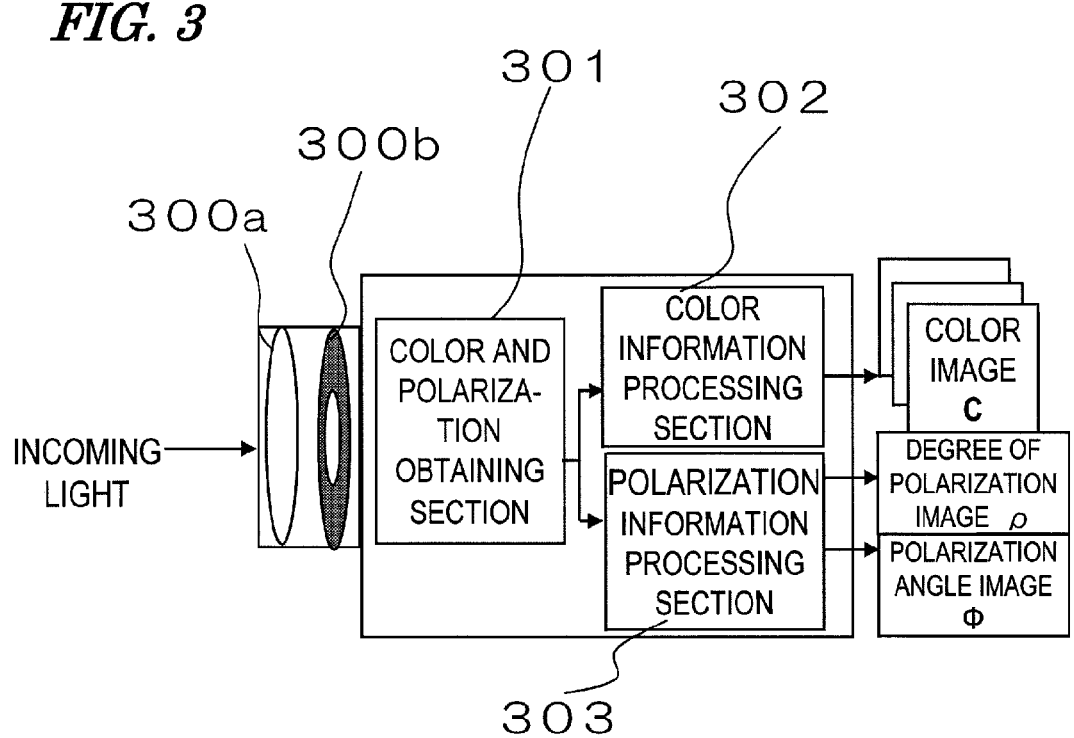
FIG. 3 is a block diagram illustrating a configuration of a scene image and scene polarization image capturing section.

On the other hand, the scene image and scene polarization image capturing section 100a shown in FIG. 3 can simultaneously obtain information on both color image and polarization image of object of shooting in real time, and outputs information on two different kinds of polarization image (i.e., a degree of polarization image ρ and a polarization angle image φ).

In the scene image and scene polarization image capturing section 100a shown in FIG. 3, the incident light passing through the lens 300a and the diaphragm 300b enters the color and polarization obtaining section 301. From this incident light, the color and polarization obtaining section 301 can obtain both the information on color image sequence, and polarization image in real time. The color and polarization obtaining section 301 outputs signals representing the information on color image sequence and the polarization image, to the color information processing section 302 and polarization information processing section 303, respectively, which subject those signals to various types of processing and output the color image C, the degree of polarization image ρ and the polarization angle image φ.

Figure 4:
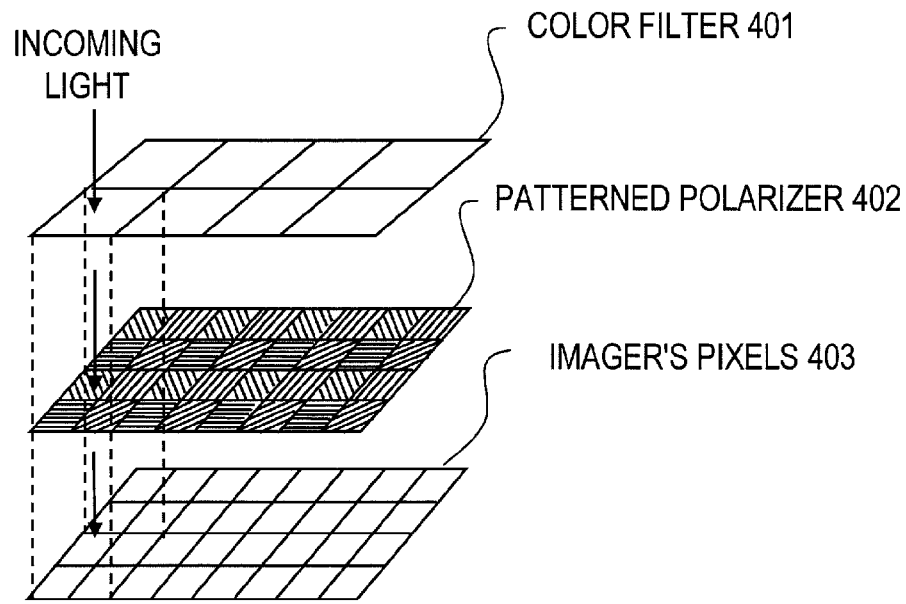
FIG. 4 is a schematic representation illustrating a basic configuration of a color and polarization obtaining section 301.

FIG. 4 is a schematic representation illustrating a basic arrangement for the color and polarization obtaining section 301. In the example illustrated in FIG. 4, a color filter 401 and a patterned polarizer 402 are stacked one upon the other in front of the pixels of the image capture device 403. The incident light transmitted through the color filter 401 and the patterned polarizer 402, finally reaches the image capture device of which pixels 403 monitors its intensity. Thus, according to this preferred embodiment, color image information and polarization image information can be obtained at the same time using a single chip color image capture device with a mosaic color filter.

Portion (a) of FIG. 5 illustrates a portion of the image sensing plane of the color and polarization obtaining section 301 as viewed from right over the plane in the optical axis direction. In portion (a) of FIG. 5, only 16 pixels (i.e., 4×4) on the image sensing plane are illustrated for the simplicity. Each of the four rectangular areas 501 through 504 illustrates an associated portion of a Bayer type color mosaic filter that is arranged over four pixel cells. Specifically, the rectangular area 501 is a B (blue) filter area and covers pixel cells B1 through B4, which B (blue) patterned polarizers with mutually different polarization principal axes make close contact with. As used herein, the direction of the "polarization principal axis" is parallel to the polarization plane (i.e., polarization transmission plane) of the light transmitted through a polarizer. In this preferred embodiment, a number of polarizer units, of which the polarization transmission planes define mutually different angles (i.e., fine polarization plates), are arranged adjacent to each other within each single color pixels. More specifically, four types of polarizer units with mutually different directions of the polarization transmission planes are arranged within each set of pixels of the same color that is R (red), G (green) or B (blue). In this case, one polarizer unit corresponds to four fine polarization pixels. In portion (a) of FIG. 5, the respective polarization pixels are identified by G1 and other reference signs.

Portion (b) of FIG. 5 shows the polarization principal axes that are assigned to the four fine polarization pixels, which the B (blue) patterned polarizers make close contact with. In portion (b) of FIG. 5, the lines drawn in each of these fine polarization pixels schematically indicate the polarization principal axis direction of its associated fine polarizing plate. Specifically, in the example illustrated in portion (b) of FIG. 5, the four fine polarization pixels have their polarization principal axes defined by angles ψi of 0, 45, 90 and 135 degrees, respectively.

Four G (green) patterned polarizers make close contact with the pixels in the rectangular area 502 and four more G patterned polarizers make close contact with the pixels in the rectangular area 504. On the other hand, four R (red) patterned polarizers make close contact with the pixels in the rectangular area 503. In FIG. 5, the location identified by the reference numeral 505 indicates a virtual pixel location representing its associated four pixels collectively in this image capture apparatus. The patterned polarizer in each of the other rectangular areas 502 through 504 has also been divided into four portions with four different polarization principal axes just as shown in portion (b) of FIG. 5.

As described above, this preferred embodiment is characterized in that each color pixel includes a number of fine polarization pixels with mutually different polarization principal axes. Thus, arrangement of color filters in the mosaic array itself may be chosen arbitrarily. In the following description, those fine polarization pixels will be simply referred to herein as "polarization pixels".

FIGS. 6(a) through 6(c) are graphs schematically showing the wavelength characteristics of the B (blue), G (green), and R (red) polarization pixels, respectively. In these graphs, the vertical axis represents the intensity of the transmitted light and the horizontal axis represents the wavelength. Each of these B, G and R polarization pixels has such a polarization property that transmits a transverse magnetic (TM) wave in the B, G or R wavelength range and reflects (i.e., not transmits) a transverse electric (TE) wave in that wavelength range. The TM wave is a wave in which magnetic field components are transverse to the incident plane, while the TE wave is a wave in which electric field components are transverse to the incident plane.

In FIG. 6(a), shown are the polarization properties 602 and 603 of the B polarization pixel and the transmission property 601 of a B color filter. The polarization properties 602 and 603 represent the transmittances of the TM and TE waves, respectively.

In FIG. 6(b), shown are the polarization properties 605 and 606 of the G polarization pixel and the transmission property 604 of a G color filter. The polarization properties 605 and 606 represent the transmittances of the TM and TE waves, respectively.

In FIG. 6(c), shown are the polarization properties 608 and 609 of the R polarization pixel and the transmission property 607 of an R color filter. The polarization properties 608 and 609 represent the transmittances of the TM and TE waves, respectively.

The properties shown in FIGS. 6(a) through 6(c) are realized by using the photonic crystal disclosed in Patent Document No. 3, for example. When the photonic crystal is used, light, of which the vibration plane of the incident electric field vector is parallel to the groove preformed on its surface, becomes a TE wave, and light, of which the vibration plane of the incident electric field vector is perpendicular to the groove preformed on its surface, becomes a TM wave.

What counts in this preferred embodiment is to use a patterned polarizer that exhibits polarization separation ability in each of the B, G and R transmission wavelength bands as shown in FIGS. 6(a) through 6(c).

FIG. 7 shows a situation where the transmission wavelength band of a G color filter and the range of wavelength that the polarization separation occurs determined by the polarization properties 6101 and 6102 are different. A polarizer that exhibits such characteristics cannot operate as intended by the present invention.

If the intensity of a monochrome image should be utilized with polarization filters, there is no need to optimize the range of wavelength in which the polarization separation is achieved. On the other hand, to obtain polarization information on and from a color pixel basis, the color separation ability and the polarization separation property should be matched to each other.

In this description, the property of a polarization pixel will be represented by a combination (such as "R1" or "G1") of one of the four numerals "1", "2", "3" and "4" representing the polarization principal axis direction of the polarization pixel and one of the three color codes "R", "G" and "B" representing the color of that polarization pixel. For example, the polarization pixels R1 and G1 have the same numeral, and therefore, their polarization principal axis directions are the same. However, since their RGB codes are different from each other, the ranges of the wavelength of the light to be transmitted to each of these polarization pixels are different. In this preferred embodiment, the arrangement of such polarization pixels is realized by the combination of the color filter 401 and the patterned polarizer 402 as shown in FIG. 4.

To obtain polarization components of specularly-reflected light from an object accurately even if the reflection is especially strong, or to obtain polarization components derive from object's shadow reliably, the dynamic range of the image capture device and bit-depth thereof are preferably as high and large as possible (which may be 16 bits, for example).

The information on brightness or intensity of light obtained from each polarization pixel arranged as shown in FIG. 5 is then processed by the polarization information processing section 303 shown in FIG. 3. Hereinafter, this processing will be described.

FIG. 8 shows the intensities 701 through 704 of light rays that have been transmitted through four types of polarizers, of which the polarization principal axes (with ϕi=0, 45, 90 and 135 degrees, respectively) are defined in four different directions. In this example, if the rotation angle of the polarization principal axis ϕ is ϕ$_i$, then the measured intensity of light will be identified by I$_i$, where i is an integer within the range of 1 to N and N is the number of samples. In the example shown in FIG. 8, N=4, and therefore, i=1, 2, 3 or 4. In FIG. 8, the intensities 701 through 704 associated with the four pixel samples (ϕ$_i$, Ii) are shown.

The relation between the angle ϕi of the polarization principal axis and the intensities 701 through 704 is represented by a sinusoidal curve. In FIG. 8, all of the four points representing the intensities 701 through 704 are illustrated as located on a single sinusoidal curve. However, if a sinusoidal curve is plotted based on a greater number of intensities measured, some of those intensities measured may be slightly off the sinusoidal curve in some cases but there will be no problem even in that case.

As used herein, the "polarization information" means information on the amplitude modulation factor and the phase (i.e., angle) of such a sinusoidal curve that represents the degree of dependence of the intensity on the angle of the polarization principal axis.

In actual processing, using four pixel intensity values in each of the areas 501 to 504 of the same color area shown in portion (a) of FIG. 5 as samples, the reflected light intensity I with respect to the principal axis angle φ of the patterned polarizer is approximated by the following Equation (1):

$$I(\psi) = A \cdot \sin 2(\psi - B) + C \quad (1)$$

where A, B and C are constants as shown in FIG. 8 and respectively represent the amplitude, phase(angle) and average of the polarized light intensity of which variation shown as a curve. In the example shown in FIG. 8, B has a negative value. Equation (1) can be expanded as in the following Equation (2):

$$I(\psi) = a \cdot \sin 2\psi + b \cdot \cos 2\psi + C \quad (2)$$

where A and B are given by the following Equations (3) and (4), respectively:

$$A = \sqrt{a^2 + b^2}, \quad \sin(-2B) = \frac{b}{\sqrt{a^2 + b^2}}, \quad \cos(-2B) = \frac{a}{\sqrt{a^2 + b^2}} \quad (3)$$

$$B = -\frac{1}{2}\tan^{-1}\left(\frac{b}{a}\right) \quad (4)$$

The relation between the intensity I and the polarization principal axis angle φ can be approximated by the sinusoidal function represented by Equation (1) if A, B and C that will minimize the following Equation (5) can be obtained:

$$f(a, b, C) = \sum_{i=1}^{N} (I_i - a \cdot \sin 2\psi_i - b \cdot \cos 2\psi_i - C)^2 \quad (5)$$

By performing these steps of processes, the three parameters A, B and C can be approximated by the sinusoidal function with respect to a single color. In this manner, a degree-of-polarization image representing the degree of polarization ρ and a polarization angle image representing the polarization angle φ are obtained. The degree of polarization ρ represents how much the light on a given pixel has been polarized. The polarization angle φ represents the angle defined by the principal axis of partial polarization of the light on a given pixel. It should be noted that the polarization principal axis angles of ρ and φ degrees (π) are equal to each other. The values ρ and φ (where $0 \leq \phi \leq \pi$) are calculated according to the following Equations (6) and (7), respectively:

$$\rho = \frac{I_{max} - I_{min}}{I_{max} + I_{min}} = \frac{A}{C} = \frac{A}{\bar{I}} \quad (6)$$

$$\phi = \frac{\pi}{4} + B \quad (7)$$

In this preferred embodiment, the patterned polarizer may be a photonic crystal, a film polarizer, a wire grid polarizer or a polarizer operating under any other principle.

The color information processing section 302 shown in FIG. 3 calculates a color intensity based on the information provided by the color and polarization obtaining section 301. The intensity of the light after transmitted through a polarizer is different from the original intensity of the light before reaching the polarizer surface. Theoretically, the average of the intensities of polarized light measured along all polarization principal axes under a non-polarized light corresponds to the original intensity of the light yet to be incident on the polarizer. Suppose the measured intensity of a polarization pixel R1 is identified by IR1, the color intensity can be calculated according to the following Equation (8):

$$\bar{I}_R = (I_{R1} + I_{R2} + I_{R3} + I_{R4})/4$$

$$\bar{I}_G = (I_{G1} + I_{G2} + I_{G3} + I_{G4})/4$$

$$\bar{I}_B = (I_{B1} + I_{B2} + I_{B3} + I_{B4})/4 \quad (8)$$

By obtaining the intensities of respective polarization pixels, a conventional color mosaic image can be generated. And by converting the mosaic image into a color image, of which the respective pixels have RGB pixel values, a color image C can be generated. Such a conversion can be done by a known interpolation technique such as a Bayer mosaic interpolation technique.

In each of the color image C, the degree-of-polarization image ρ and the polarization angle image φ, the intensity and polarization information of each pixel can be obtained by using the four polarization pixels shown in portion (b) of FIG. 5. That is why information on both each piece of light intensity and polarization can be regarded as representing a value at the virtual pixel point 505 that is located at the center of four polarization pixels shown in portion (b) of FIG. 5. Consequently, the resolution of a color image and that of a polarized image both reduced to quarter size (i.e., a half (vertically) by a half (horizontally)) of the original one of the single-panel color image capture device. For that reason, the number of pixels of the image capture device is preferably as large as possible.

Figure 9:
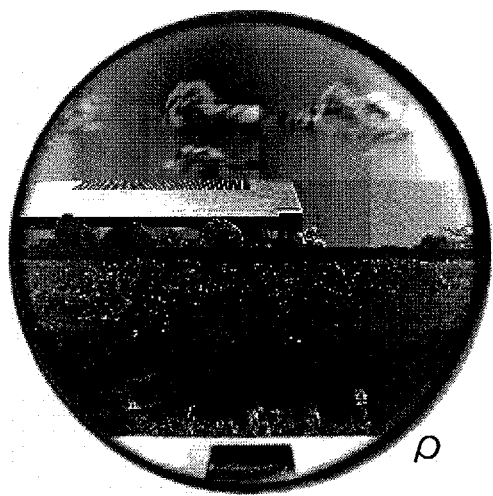
Figure 9:
Figure 9:
Figure 9:
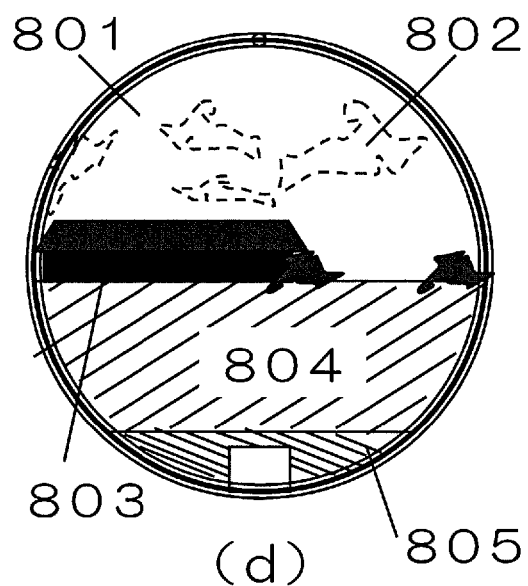

FIG. 9 illustrates examples of actual degree of polarization image ρ, polarization angle image φ and color image C showing a scene photography of a building at a distance. Specifically, the degree of polarization image ρ shown in FIG. 9(a) shows the intensity of polarization with the pixel values. In this case, the higher pixel value (i.e., the whiter the image) means higher degree of polarization of that pixel. On the other hand, the polarization angle image φ shown in FIG. 9(b) represents the polarization angles as pixel values. Specifically, the polarization angle is represented by allocating values of 0 through 180 degrees to the pixel (intensity) values. It should be noted that the polarization angle value is cyclic, the angle of white and black parts of the polarization angle image are actually continuous with each other. And the color image C shown in FIG. 9(c) derives from a conventional RGB color intensity image, but no hues are represented and only the intensities of the respective pixels are represented by lightness. FIG. 9(d) is a schematic representation corresponding to the image shown in FIG. 9(c). Although it cannot be easily seen from the photo, the reference numeral 801 denotes the sky, 802 denotes the clouds, 803 denotes the building, 804 denotes greenery, and 805 denotes a part of the pedestal.

Figure 10:
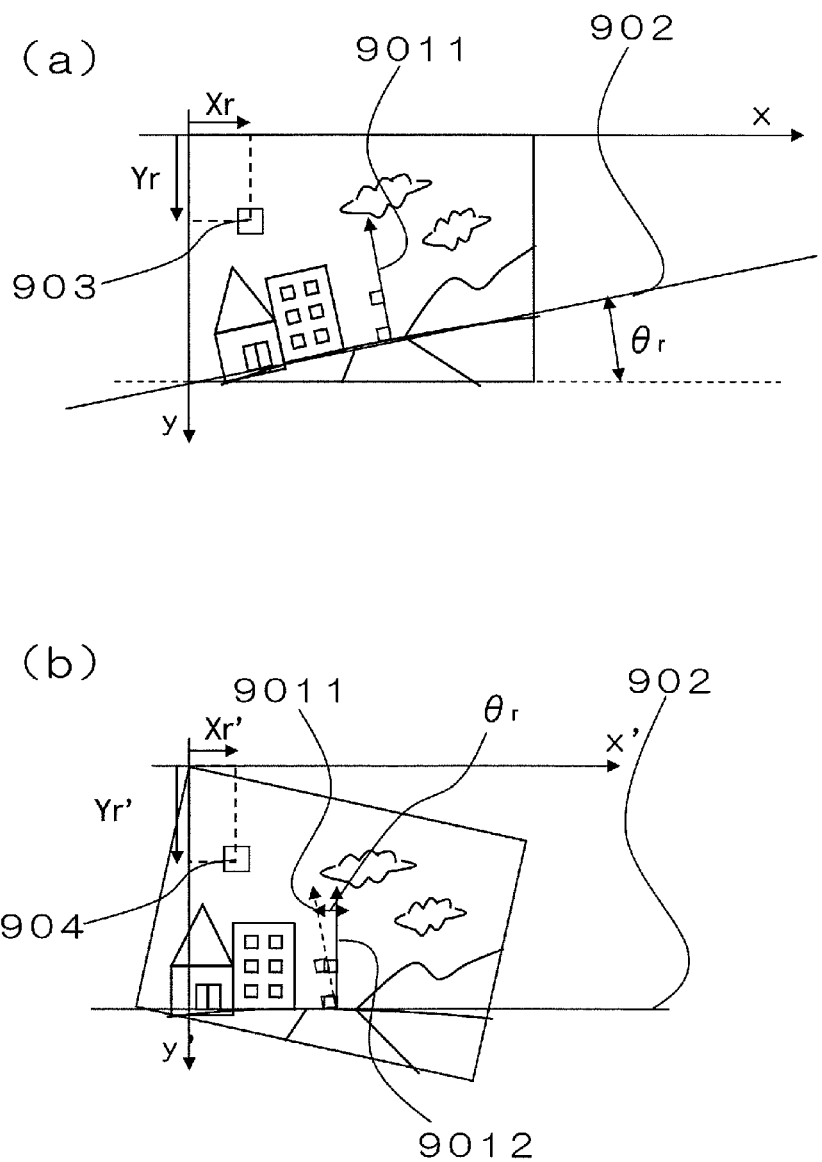

In the processing to be described below, when a scene is shot, correction to the images or the coordinates is supposed to be made so that the horizon-line within the frame levels as illustrated in FIG. 10. The tilts of the scene image and scene polarization image that have been shot are corrected by the roll levelness adjusting section 100b (see FIG. 1F). In this case, what needs to be corrected is the tilt around the optical axis of the camera. That is to say, the tilt is corrected by rotating the camera θr degrees in the direction 203 so that the x-axis shown in FIG. 2 becomes parallel to the ground.

Hereinafter, it will be described with reference to FIG. 10 how the levelness may be adjusted.

First of all, suppose a tilted image has been shot as schematically shown in FIG. 10(a). A perpendicular 9011 from the ground and the horizon line 902 of the ground are defined as shown in FIG. 10(a). In that case, if the image is a distortion-free ideal one (or an image that has been corrected into such an ideal one), then the camera's x-axis shown in FIG. 2 can be regarded as equivalent to the x-axis shown in FIG. 10(a), and the horizon line 902 on the image (i.e., the tilt of the camera with respect to the ground in the x-axis direction) will form an angle of θr degrees. That is why first of all, that tilt θr needs to be detected with a level that is built in the camera. Any level may be used as long as the level can be built in the camera as disclosed in Japanese Patent Application Laid-Open Publication No. 2007-240832.

Next, using the tilt θr that has been detected by the level, the polarization angle of the polarization angle image is corrected. Specifically, by correcting polarization angle φ obtained by Equation (7) by the following Equation (9), a corrected polarization angle φnew can be obtained:

$$\phi_{new} = \phi + \theta_r \quad (9)$$

Also, if possible, the scene image and scene polarization image are also subjected to tilt correction (or levelness adjustment) in order to prepare for subsequent steps of processes. The tilt correction of the scene image and scene polarization image is not an indispensable one but the subsequent steps of processes could be carried out with those images left tilted. However, for the sake of simplicity of description, those images are also supposed to be subjected to the tilt correction. FIG. 10(b) illustrates an image obtained by making the tilt correction. The perpendicular 9011 from the ground in the uncorrected image shown in FIG. 10(a) has rotated θr degrees to be a new perpendicular 9012 that crosses at right angles with the horizon line 902, which is now parallel to the X'-axis on the image shown in FIG. 10(b).

By rotating the image θr degrees, the coordinates (Xr, Yr) of the pixel 903 shown in FIG. 10(a) are transformed into the coordinates (Xr', Yr') represented by the following Equations (10):

$$x_r' = x_r \cos\theta - y_r \sin\theta$$

$$y_r' = x_r \sin\theta + y_r \cos\theta \quad (10)$$

The pixel with the coordinates (Xr', Yr') is identified by the reference numeral 904 in FIG. 10(b). By applying this transformation to every pixel in the image, the image shot that has been tilted towards the roll can be corrected into a non-tilted one (which is referred to herein as "tilt correction").

This correction can be made any time as long as the polarization angle defined by the sky part with respect to the horizon is known. That is why it may be carried out after the cloud part has been removed. Meanwhile, unless this correction is made, the whole sky polarization map may be entirely transformed into camera coordinates when the camera direction estimating section performs calculations after that.

Next, the configuration of the clear sky polarization image processing section 100c will be described with reference to FIG. 11A.

The clear sky polarization image processing section 100c receives a degree of polarization image ρ a polarization angle image φ and a color image C, and outputs a clear sky polarization angle image φ sky, which is used to estimate the directions of the camera and the sun from the scene.

In this clear sky polarization image processing section 100c, a degree of polarization binarizing section 1001 binarizes the degree of polarization image ρ with a threshold value Tρ. A luminance converting section 1002 converts the color image C into a luminance image Y. Luminance binarizing sections 1003 and 1004 binarize the luminance image Y converted with threshold values TC1 and TC2, respectively. An image computing section 1005 executes the logical AND (product) operation between the degree of polarization image ρ' that has been binarized by the degree of polarization binarizing section 1001 and the luminance image C1' that has been binarized by the luminance binarizing section 1003, to thereby output a mask image A'.

A hue similarity converting section 1006 performs an HSV conversion on the color image C to thereby output a hue similarity image h representing the degree of resemblance with the hue of sky blue color. A hue similarity binarizing section 1007 subjects the hue similarity image h to threshold processing with a threshold value TH to thereby output an image h' in which only the region with the hue of sky blue has been extracted. An image computing section 1008 executes the logical AND operation between the luminance C2' that has been binarized by the luminance binarizing section 1004 and the image that has been binarized with particular hue by the hue similarity binarizing section 1007.

Based on the output ρd of the degree of polarization determining section 1010, an output selecting section 1009 determines whether a first clear sky part mask A' that has been generated based on the binarized luminance and degree of polarization images C1' and ρ' or a second clear sky part mask B' that has been generated based on the binarized luminance and hue similarity images C2' and h' should be adopted.

And an image computing section 1011 executes the logical AND product operation between the clear sky part mask Msky adopted and the polarization angle image φ, thereby generating a clear sky polarization angle image φsky.

According to a conventional technique, the clear sky part is detected by searching a given color image for a flat and featureless image area, of which the hue resembles that of the color blue. Applying this technique to the sky including clouds, clear sky part is obtained probabilistically based on color information and texture information. As color information is used, however, it would be impossible to distinguish the clear sky part from cloud or to extract that part from the whole sky (i) in cases when hue of the sky varies gradually from blue to magenta or red as in the sunset sky, or (ii) in cases when the color of a building in the scene is blue or white.

So, it is preferable to detect the sky by reference to only the monochrome luminance information without using color information that would vary significantly according to phenomena of the sky. To detect such a sky part, for example, a part of a scene image with the highest luminance could be assumed to be the sky. According to such an assumption-based technique, however, the results of experiments showed that reasonably good results were achieved when the sky was cloudy or red, but the results were not satisfactory in fair weather because the luminance of the specular reflected light from a building was higher than that of the sky more often than not. This may be because of the specular reflection from an artificial smooth surface, which is illuminated all around with the sunlight from the clear sky, is stronger than expected, rather than the specular reflection of the sunlight.

For these reasons, according to this preferred embodiment, the clear sky part is detected by using not only the luminance but also the degree of polarization of the scene as well. This technique takes advantage of the fact that the sky has a very high degree of polarization in the vicinity of the horizon in the daytime with fair weather. Non-Patent Document No. 2 reports the polarization states of the whole sky that were recorded every hour from morning (sunrise) through early in the evening (sunset) over twelve hours. According to this document, the sky almost always has a high degree of polarization near the horizon except for the western sky in the morning and the eastern sky in the evening. Also, the results of experiments reveal that the degree of polarization of the sky is even higher in many cases than that of a mountain at a distance or that of an artificial structure such as a building. That is why it would be effective to detect the sky part based on the degree of polarization. Even though very strong polarization is also observed on the roof or glass of a building, a mask generated based on the threshold values of the degree of polarization and luminance may be used to detect and remove such strong polarization caused by the building and so on.

Nevertheless, the degree of polarization will decrease as described above in the east-west direction near the horizon which is defined by the pass of the sun. Among other things, the western sky in the morning and the eastern sky early in the evening often have not only a low degree of polarization but also a low luminance as well, so sometimes this technique may not be applicable. In such cases, the clear sky part may be detected using the hue and the luminance. Such a situation will be described in detail later.

Hereinafter, it will be described with reference to FIG. 12, representing an actual scene image, how the clear sky polarization image processing section 100c works. In the following description, captured image range is supposed to be circular. However, this is due to vignetting of an actual camera device, so the image could essentially be regarded as a rectangular one.

If certain conditions are met, the clear sky polarization image processing section 100c can be comprised of the minimum configuration 1012 indicated by the dashed line in FIG. 11A. First of all, it will be described with reference to FIGS. 12 and 13 how the minimum configuration 1012 works.

FIG. 12(a) shows a degree of polarization image ρ of a scene image, while FIG. 12(b) schematically illustrates the contents of the degree of polarization image ρ shown in FIG. 12(a). As shown in FIG. 12(b), the scene image includes a sky part 1101, a building part 1102, a cloud part 1103, a ground part 1104 and a camera pedestal 1105.

FIG. 12(c) shows an image (ρ') obtained by having the degree of polarization image ρ processed by the degree of polarization binarizing section 1001 (where the binarization threshold value Tρ=0.14). The binarization threshold value Tρ is determined by reference to a histogram of degree of polarization. In the histogram of degree of polarization of this scene, a bimodal distribution composed of two separated distributions make a sharp contrast with each other: high degree of polarization derived from the sky part 1101, and low degree of polarization derived from non-sky parts 1102 and 1104 of a building and so on. In this histogram of degree of polarization, the intermediate value between its two peaks is supposed to be the threshold value Tρ. In this case, the binarization threshold value Tρ is a threshold value for use to determine whether the degree of polarization is high or low, and satisfies the following relation: 0<Tρ<1.

In FIG. 12(c), if the cloud part 1103 on the right-hand side of the building has a low degree of polarization, the cloud part 1103 would also be removed. However, only the black camera pedestal 1105 is polarized too strongly to remove and would remain even after the degree of polarization binarization.

FIG. 12(d) shows a luminance image Y obtained by having the color image C of the scene processed by the luminance converting section 1002. On the other hand, FIG. 12(e) shows an image C1' obtained by binarizing the luminance image, that has been obtained by luminance conversion, by the luminance binarizing section 1003 (where TC1=0.4). In this scene, the luminances of the sky part 1101 and the building 1102 are so close to each other that it is difficult to separate them from each other according to the luminance. Even so, by setting appropriate threshold values TC1 and TC2, dark parts such as the camera pedestal could be removed successfully. In this preferred embodiment, the threshold values TC1 and TC2 have been normalized so that both of the following conditions are satisfied to estimate the luminance value: 0<TC1<1 and 0<TC2<1. If defined in 8-bit, for example, the luminance value of 0 through 255 is normalized between 0 and 1, and then compared to the threshold value TC1 or TC2. On the other hand, if defined in 16-bit, a luminance value of 0 through 65535 is normalized between 0 and 1 and then compared to the threshold value TC1 or TC2.

By having these two kinds of mask images ρ' and C1' subjected to the logical AND operation at the image computing section 1005, a mask image A', in which only the clear sky part separated and the cloud part with low degree of polarization removed, can be obtained as shown in FIG. 12(f). Then, that mask image A' is selected by the output selecting section 1009 and then is subjected to an logical AND operation with the polarization angle image φ (shown in FIG. 13(a)) at the image computing section 1011. FIG. 13(b) is a same schematic illustration as in FIG. 12(b). FIG. 13(c) is a mask image A' same as in FIG. 12(f).

By performing these steps of processes, the clear sky polarization angle image φsky shown in FIG. 13(d) can be obtained.

It should be noted that in determining the clear sky part, the cloud part is preferably removed In the subsequent process of detecting the direction of the optical axis of the camera, corresponding points between the clear sky polarization angle image φsky and the whole sky polarization map need to be searched. Obviously, the whole sky polarization map does not take account of cloud. So if the polarization angle of the clear sky polarization angle image φsky has been disturbed with the presence of cloud, estimation errors could occur in such cases.

However if the cloud were thin enough, the polarization angle could not be disturbed even in the cloud part. In that case, the clear sky part could include such cloud. The magnitude of decrease in the degree of polarization in the cloud part gives an indication whether the polarization angle is disturbed by the cloud or not. The benefit of the processes of this preferred embodiment which detects the clear sky part based on the polarization is that cloud part with a low degree of polarization can be removed automatically.

Figure 14:
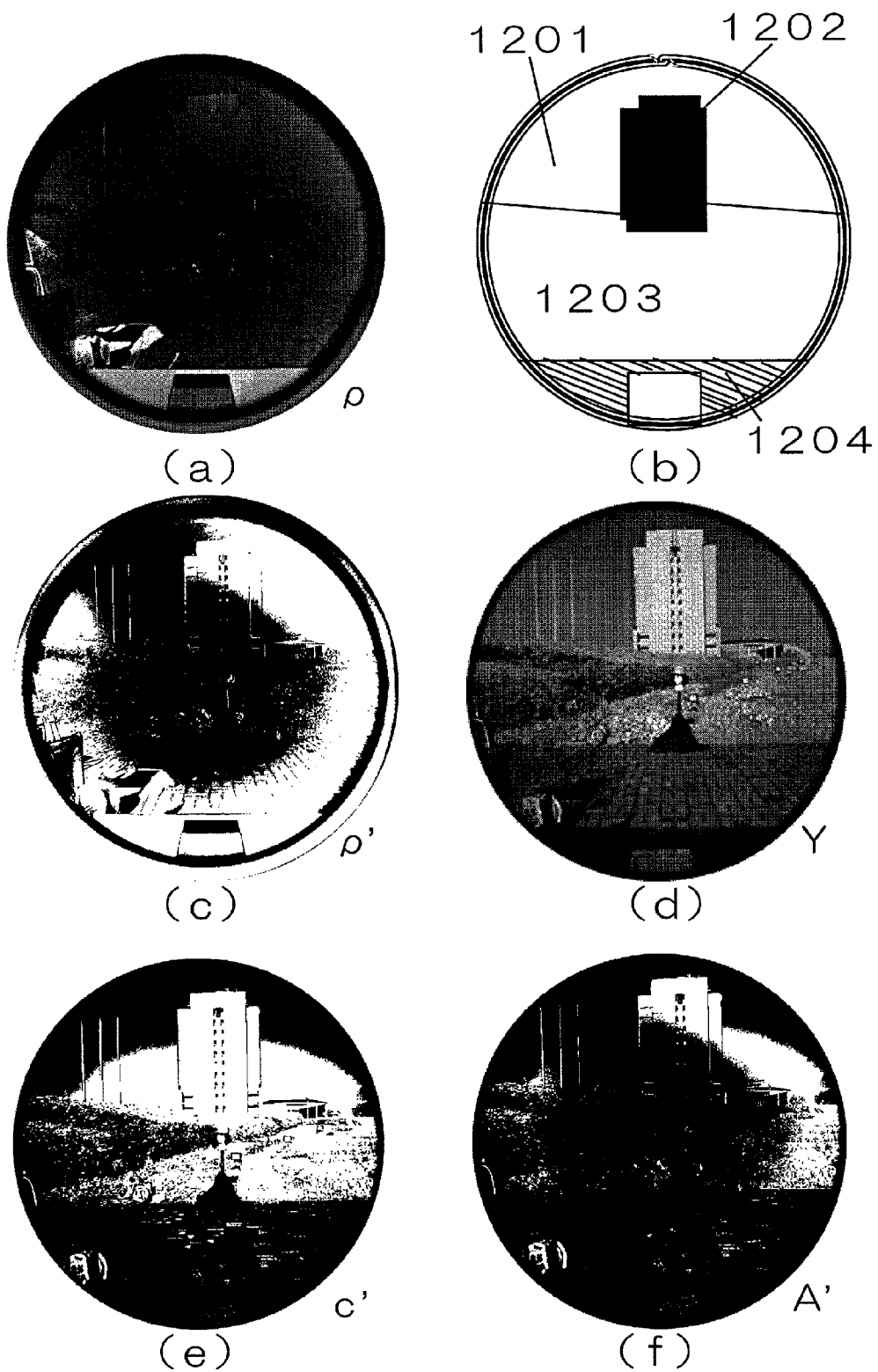
Figure 15:
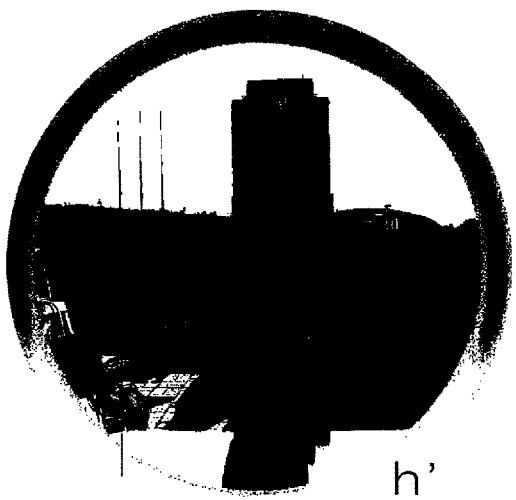
Figure 15:
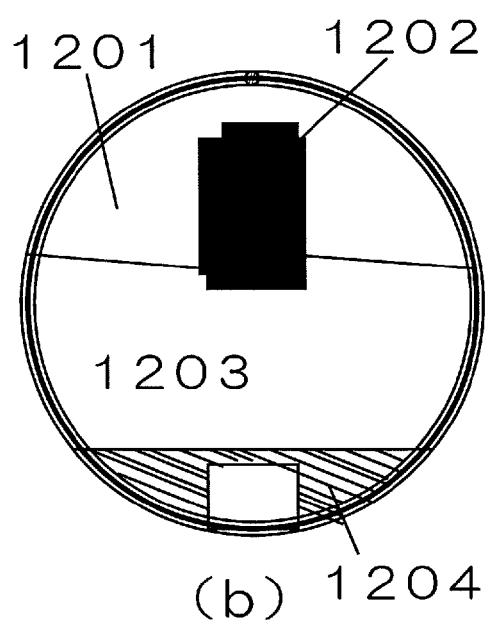
Figure 15:
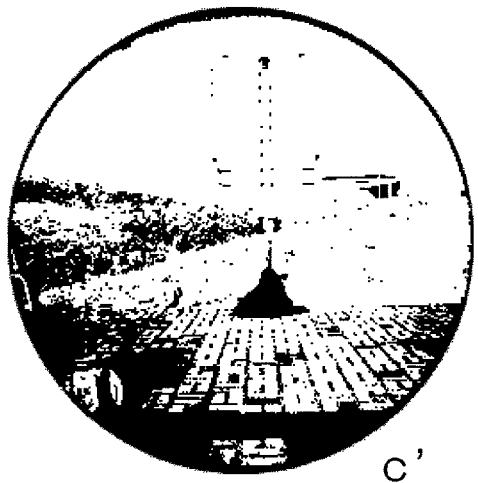
Figure 15:
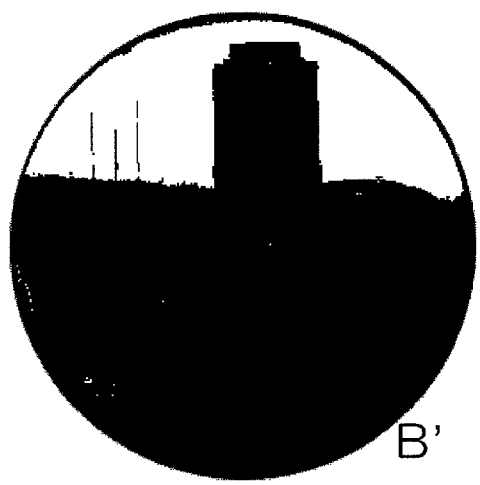

Next, how to deal with the case in which the minimum configuration 1012 is not applicable will be described with reference to FIG. 14. FIG. 14 shows a scene of the eastern sky early in the evening.

Specifically, FIGS. 14(a) through 14(f) show a degree of polarization image ρ of a scene, a schematic representation of that scene image, a binarized image ρ' of the degree of polarization image ρ, a luminance image Y, and a binarized image C2' of the luminance image Y, respectively. As shown in FIG. 14(b), this scene image includes a sky part 1201, a building part 1202, a ground part 1203 and a camera pedestal 1204.

If the same series of steps as the ones that have been described with reference to FIGS. 12(a) through 12(f) are performed also in this case of FIG. 14, the mask image A' shown in FIG. 14(f) is obtained as a result. It is clear that the detection of the clear sky has failed. This is because in the scene degree of polarization image ρ shown in FIG. 14(a), the clear sky part has not only a low degree of polarization but also a low luminance as well.

Thus, according to this preferred embodiment, the degree of polarization determining section 1010 shown in FIG. 11A is used to handle such a problem. Specifically, in such cases, the average degree of polarization is obtained by reference to the degree of polarization histogram of the degree of polarization image ρ, and if the average degree of polarization is lower than a predetermined threshold value (where Tρ1=0.1), then the average degree of polarization is not adopted, and a hue and a luminance is used instead. Such processing will be described with reference to FIGS. 11A and 15.

First of all, the hue similarity converting section 1006 calculates a hue angle error, representing a difference between the hue angle of the color blue of the sky and that of the color image C, thereby converting the color image C into a hue similarity image. In this case, the hue of the sky is supposed to be blue because the process with a color image can be carried out only when the sky has a low degree of polarization and a low luminance. And as such a situation is observed only in the western sky in the morning and in the eastern sky early in the evening, the color of the sky may be regarded as blue.

Suppose the hue angle (in the range of 0 through 360 degrees) of a typical sky blue color is Hsky (=254 degrees) and the hue angle of a given scene is Htest. Using an equation (RGB_to H) for converting a well-known RGB color space into the hue H of an HSV (hue, saturation and lightness) space and considering that one cycle of the hue angle is 360 degrees, the hue similarity ΔH is calculated according to the following Equations (11):

$$Htest = RGB\_to\_H(R,G,B)$$

$$H\min = \min(Htest, Hsky)$$

$$H\max = \max(Htest, Hsky)$$

$$\Delta H = \min(H\max - H\min, H\min + 360 - H\max)$$

By obtaining this hue similarity image h subjected to threshold processing by the hue similarity binarizing section 1007, a mask image h' can be obtained as a clear sky candidate region. FIG. 15(a) shows a hue error image obtained with the same scene image as the one shown in FIG. 14 converted by the hue similarity converting section.

FIG. 15(b) is a schematic representation of the scene image shown in FIG. 15(a). FIG. 15(c) shows an image binarized with respect to a threshold value (where TC2=0.29) at the luminance binarizing section 1004. And FIG. 15(d) shows a mask image B' obtained as a result of the logical AND product between the hue binarized image h' shown in FIG. 15(a) and the luminance binarized image C2' shown in FIG. 15(c) calculated at the image computing section 1008.

In cases where ρd, that has been supplied from the degree of polarization determining section 1010, does not exceed the threshold value, the output selecting section 1009 shown in FIG. 11A adopts the mask image B' instead of the mask image A' that has been obtained based on the degree of polarization. In that case, the image computing section 1011 executes the logical AND product operation between the mask image B' and the polarization angle image φ, thereby obtaining a clear sky polarization angle image φsky.

As described above, it depends mostly on the time whether or not the clear sky part can be determined with only the minimum configuration 1012. Therefore, the masks for extracting the clear sky part may be switched according to just the date and time of shooting, instead of running the degree of polarization determining section 1010. For example, "early in the evening" may be defined from 4 pm through sunset. Then, the clear sky part may be determined with only the minimum configuration 1012 unless it is early in the evening, and the entire configuration shown in FIG. 1A may be used only early in the evening.

Next, alternative configurations of the "clear sky polarization image processing section" 100c will be described with reference to FIGS. 11B and 11C.

As described above, in the clear sky polarization image processing section 100c shown in FIG. 11A, the output selecting section 1009 determines whether the first clear sky part mask A' that has been generated based on the binarized luminance and degree of polarization images C1' and ρ', or the second clear sky part mask B' that has been generated based on the binarized luminance and hue similarity images C2' and h', should be adopted by reference to the output ρd of the degree of polarization determining section 1010.

On the other hand, in the clear sky polarization image processing section 100c shown in FIG. 11B, the choosing section 1014 determines whether to generate the first clear sky part mask A' or to generate the second clear sky part mask B', based on the output ρd of the degree of polarization determining section 1010 in advance. For example, if the output ρd of the degree of polarization determining section 1010 does not exceed the threshold value, the choosing section 1014 shown in FIG. 11B employs the second clear sky part mask B', not the first clear sky part mask A'. As a result, the clear sky polarization image processing section 100c shown in FIG. 11B generates only the second clear sky part mask B' without generating the first clear sky part mask A'. In that case, only the second clear sky part mask B' will be entered into the image computing section 1011. If generating only one employed mask is enough, the process of generating a mask which may not be utilized can be omitted.

Likewise, in the clear sky polarization image processing section 100c shown in FIG. 11C, the choosing section 1014 determines whether to generate the first clear sky part mask A' or to generate the second clear sky part mask B' in advance. However, the clear sky polarization image processing section 100c shown in FIG. 11C chooses a mask to generate in reference to the image timestamp provided by a timestamp information obtaining section 1016, not to the output ρd of the degree of polarization determining section 1010. For example, if the timestamp indicates early in the evening (e.g., sometime from 4 pm through sunset), the choosing section 1014 shown in FIG. 11C chooses to generate the second clear sky part mask B', not the first clear sky part mask A'. In that case, only the second clear sky part mask B' will be entered into the image computing section 1011.

Figure 16:
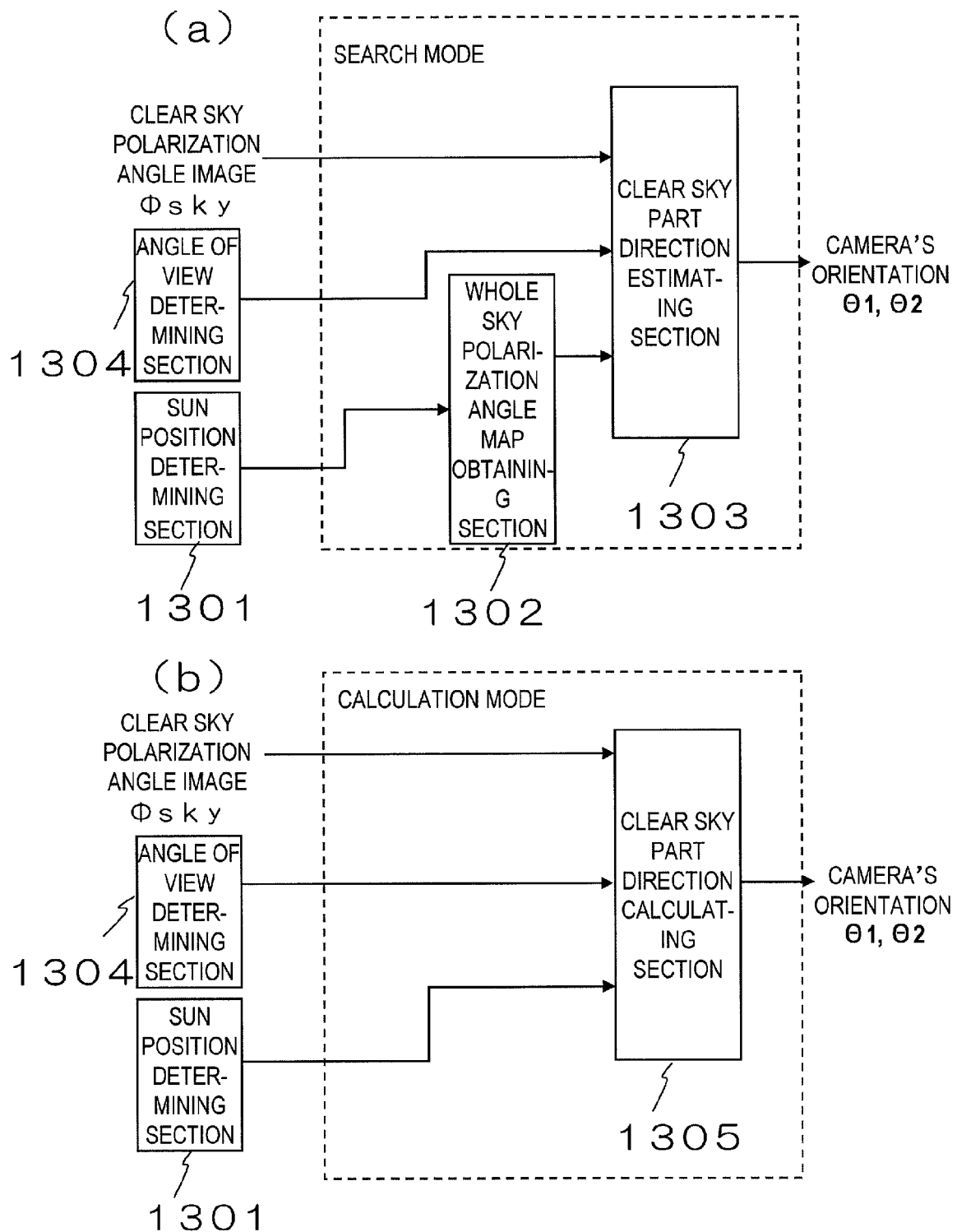

Next, the camera direction estimating section 101 estimates the direction of optical axis of the camera (hereafter, simply to call "direction of the camera"). FIG. 16 illustrates a configuration of the camera direction estimating section 101.

FIG. 16(a) illustrates a configuration designed to perform "search mode" process. This configuration includes a sun position determining section 1301, a whole sky polarization angle map obtaining section 1302, a clear sky part direction estimating section 1303 and an angle of view determining section 1304.

On the other hand, FIG. 16(b) illustrates a configuration designed to perform "calculation mode" process. This configuration includes the sun position determining section 1301, the angle of view determining section 1304 and a clear sky part direction calculating section 1305.

Both of these two configurations receive the same clear sky polarization angle image φ and use the same sun position determining section 1301. The camera direction estimating section 101 may have either both or only one of these two configurations shown in FIGS. 16(*a*) and 16(*b*). The shooter may decide which of these two modes should be used by him- or herself, or this choice may also be made automatically inside the camera. Further details of each of these modes will be described later.

The camera direction estimating section 101 determines in what direction on the whole sky the polarization angle pattern captured is located. First of all, the polarization state of the sky will be described.

The sunlight falling from the sky has a property of an electromagnetic wave. Generally, a secondary electromagnetic wave will be radiated from the region where a kind of variation or change has occurred: for example, the change of the medium or the structural change along the propagation path of an electromagnetic wave, or appearance of some object on its path, etc This phenomenon is called "scattering".

If the scatterer, which is a structure that produces the re-radiation, is sufficiently greater than the wavelength of the wave, the phenomenon occurring at the surface of the scatterer can be locally treated as reflection and incidence of a planar wave. The kind of scattering that occurs in such a case is "geometrical-optics scattering".

On the other hand, if the scatterer is much smaller than the wavelength, the electromagnetic field at the surface of the scatterer can be approximated as a static magnetic field. The kind of scattering that occurs in such a case is "Rayleigh scattering". No matter what shape the scatterer has, the scattering property of Rayleigh scattering is the same as the directional characteristics of micro dipoles.

Furthermore, if the scatterer is approximately as large as the wavelength (i.e., if the degree of scattering is somewhere between the geometrical-optics scattering and the Rayleigh scattering), then transient current will flow at the surface or inside of the scatterer during polarization. Such a transient phenomenon will produce resonance and eventually produce a particular scattering dphenomenon. This is so-called "Mie scattering".

In the air, molecules that are approximately one thousandth as large as the wavelength of the sunlight are present as the medium. That is why the sunlight is subjected to Rayleigh scattering. When subjected to Rayleigh scattering, the molecules are scattered at a scattering coefficient that is inversely proportional to the fourth power of the wavelength. That is why the shorter the wavelength of the incoming light, the greater the degree of its scattering would be.

Considering the color of the sky, sky looks blue in the daytime because light in the "blue" region with a short wavelength is scattered significantly before striking our eyes. On the other hand, the sky looks red at sunset because the distance from us to the sun as the light-source becomes too long to retain the blue component and only the remaining transmitted light in the "red" region strikes our eyes. When scattered by Rayleigh scattering, light will be polarized to some extent according to its position with respect to the sun as the light-source. This is how and why the polarization pattern of the sky is produced and continues to vary from moment to moment.

Suppose a planar wave has been incident on a spherical scatterer. If the size of the scatterer is sufficiently smaller than the wavelength of the light, then the electric polarization inside the scatterer is determined instantaneously. In that case, a sufficiently far scattering field can be approximated as a micro dipole that has the dipole moment of the polarization charge of the scatterer. Particularly if the scattering angle is equal to $\pi/2$, the micro dipole comes to get fully polarized. In that case, a polarization angle is perpendicular to the scattering plane which is defined by the position of the sun, a point of observation on the clear sky, and the viewpoint. Otherwise, the polarization angle property will depend on the relative positions of the sun, the point of observation and the viewpoint. And when the polarization of the sky is observed from the ground, an intense polarization component will be observed in a tangential direction with respect to the circle drawn around the sun.

According to Non-Patent Document No. 3, it was discovered, as a result of actual measurements, that there are three singular points with singular polarization properties besides the sun. Meanwhile, according to Non-Patent Document No. 4, a polarization pattern of the sky similar to the actual one could be derived successfully using a theoretical model with those singular points taken into consideration.

It should be noted that a region with cloud has a different polarization property from that of clear sky part. Cloud is a collection of cloud droplets such as water droplets. That is why a person can see through a thin cloud but cannot see beyond a thick cloud which looks completely white. This occurs due to multiple scattering produced between the cloud particles. As used herein, the "multiple scattering" refers to an iterative scattering phenomenon that the light that has been scattered by a scatterer is incident on another scatterer to trigger another scattering there. Particularly if a lot of scatterers are densely distributed, the light rays that have been scattered and dispersed will overlap among each other to make the cloud look white. In the same way, the light rays that have been polarized by scattering will also overlap among each other and lose their polarization property. In fact, according to the thickness and amount of the cloud, the polarization property of the light would not be lost completely but could remain partially. So, according to the technique adopted in this preferred embodiment, the cloud part is not removed at an initial stage but only a part with a low degree of polarization is removed. And this technique is applied to only a region where the polarization of the sky can be used.

Hereinafter, it will be described in detail, with reference to FIG. 16(*a*) first, how the camera direction estimating section 101 operates in "search mode".

As described above, the polarization pattern of the sky depends on where the sun is currently located (which includes the altitude and azimuth of the sun and which will sometimes be simply referred to herein as "sun's position"). That is why first of all, the sun position determining section 1301 needs to collect information about the sun's position (which will sometimes be referred to herein as "to determine the sun's position").

The sun's position will vary widely according to the specific date, time, and location (i.e., latitude and longitude) at which the viewer looks up to the whole sky. Thus, the sun's position can be determined by calculating the altitude and azimuth of the sun using the clock normally built in the camera or a GPS, for example. Hereinafter, it will be described exactly how to calculate the solar altitude and solar azimuth in that case.

First, the angular variable, identified by θ0, is defined as follows using the number of days do that have passed since the New Year's Day of the given year:

$$\theta_0 = \frac{2\pi(dn-1)}{365} \quad (12)$$

The solar declination, identified by δ, can be calculated according to the following Equation (13) using θ0:

δ=0.006918−0.399912 cos θ$_0$+0.070257 sin
 θ$_0$−0.006758 cos 2θ$_0$+0.000907 sin
 2θ$_0$−0.002697 cos 3θ$_0$+0.001480 sin 3θ$_0$ (13)

Also, supposing φ denotes the latitude, λ denotes the longitude, Eq denotes the equation of time, JST denotes the Japanese standard time, and JSK denotes the longitude of Japan Standard Time Meridian, the hour angle of the sun t is calculated according to the following Equations (14) and (15):

Eq=0.000075+0.001868 cos θ$_0$−0.032077 sin
 θ$_0$−0.014615 cos 2θ$_0$−0.040849 sin 2θ$_0$ (14)

$$t = \frac{(JST - 12)\pi}{12} + (JSK - \lambda) + Eq \quad (15)$$

Thus, the solar orientation θs and altitude hs can be calculated according to the following Equations (16) and (17), respectively:

θ$_s$=arcsin(sin φ sin δ+cos φ cos δ cos t) (16)

$$h_s = \arctan \frac{\cos\varphi \cos\delta \sin t}{\sin\varphi \sin\theta s - \sin\delta} \quad (17)$$

These parameters are calculated according to approximation equations proposed by Nakagawa laboratory of Rissho University.

It should be noted that this is just an exemplary method for determining the sun's position. But there are various other methods for determining the sun's position. For instance, the sun's position could also be determined by the equations disclosed in a document such as Ko Nagasawa, "Sunrise and Sunset Calculations", Chijin Shokan Co., Ltd. or by a method that uses the Chronological Scientific Tables.

Next, the whole sky polarization angle map obtaining section 1302 obtains a whole sky polarization angle pattern corresponding to the specific shooting location and the specific time of shooting. To do that, data may be collected by actually measuring the polarization angle patterns at respective solar altitudes and solar azimuth, and then complied into a database as disclosed in Non-Patent Document No. 3. If a whole sky polarization angle map associated with the solar altitude and solar azimuth at the time of shooting is retrieved from the database thus complied, the whole sky polarization pattern can be known. It should be noted that if no data associated with the solar altitude and solar azimuth at the time of shooting is available, then interpolation may be made using multiple close data items.

Figure 17:
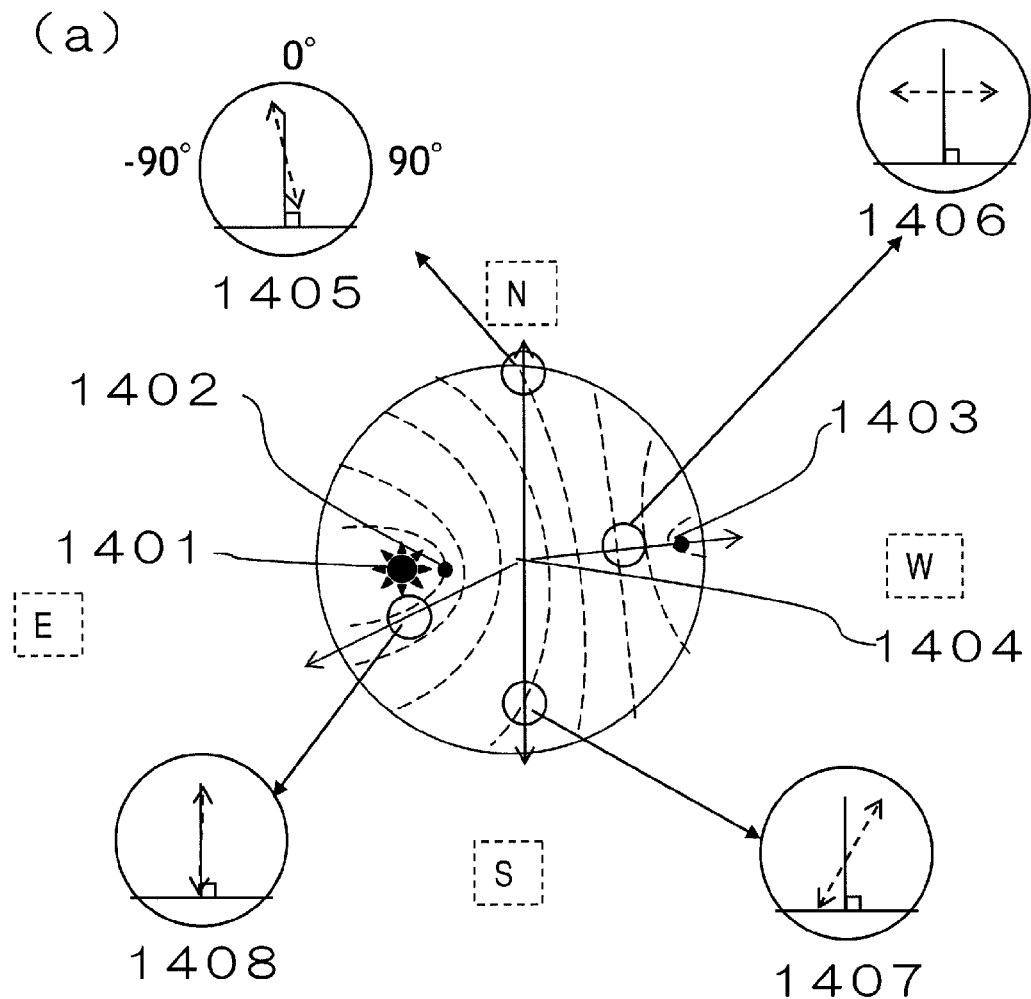
Figure 17:
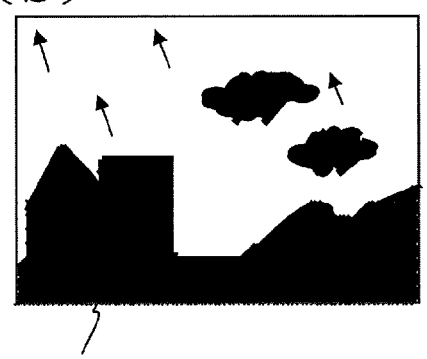
Figure 17:
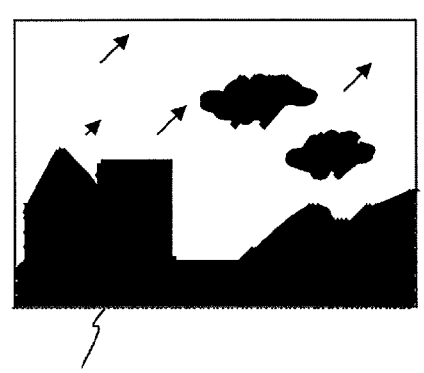

The whole sky polarization angle map can also be calculated theoretically based on the solar altitude and solar azimuth by the equations used in Non-Patent Document No. 1, 2 or 4. FIG. 17 illustrates schematically the whole sky polarization angle pattern obtained by performing calculations based on the theoretical model mentioned above and also illustrates conceptually how the whole sky polarization angle pattern matches to the clear sky polarization angle patterns. In FIG. 17(a), the central big circle is an exemplary whole sky polarization diagram at around 9 am. In this case, the phase pattern is drawn in dashed lines to make this drawing easily understandable. Actually, however, each point on this map has its own phase. Thus, FIG. 17(a) draws only some of their phase planes as visible ones.

As shown in FIG. 17(a), the whole sky polarization pattern is a concentric pattern drawn around the sun 1401. More specifically, it is known that the Babinet point 1402 and the Arago point 1403, which are known as singular points, have some influence. The point 1404 right under the zenith indicates the camera position. Suppose a line is drawn perpendicularly to the horizon from the zenith to define a local meridian. In FIG. 17(a), it is indicated by the dashed curve what will be the tilt of the polarization angle that the light coming from each point on the whole sky as viewed from the camera position has with respect to its associated local meridian. It will be described in further detail later exactly how to read such a polarization pattern diagram. It should be noted that as shown in the drawing that indicates the polarization angle θ pix at the position 1405, the direction of the polarization is defined to be zero degrees when parallel to the local meridian and to increase clockwise. In respective portions representing the positions 1405 through 1408, the respective polarization angles are indicated by the dotted double-headed arrows. The polarization angle is determined by defining the local meridian which passes a celestial point at the far end of the optical axis of the camera as a base line. In this case, the polarization direction (i.e., the polarization angle) is supposed to be determined by how the polarization angle line on the map crosses the reference line. For example, at the position 1405 near the horizon, the polarization angle is approximately −20 degrees with respect to the local meridian. On the other hand, at the position 1406 on the path of the sun, the polarization angle is ±90 degrees with respect to the local meridian. It is known that the same is true of every point on the path of the sun. At the position 1407, the polarization angle is approximately 40 degrees with respect to the local meridian. And at the position 1408 near the sun, the polarization angle is approximately 0 degrees with respect to the local meridian.

Thus, it can be seen that the polarization angle varies with respect to the local meridian obtained according to the direction of the camera.

FIGS. 17(b) and 17(c) are schematic representations 1409 and 1410 illustrating polarization angle images captured. It should be noted that the arrows shown in these drawings just indicate the directions of the polarization axis schematically for illustrative purposes and cannot be seen on actual photos.

As already described for the scene image and scene polarization image capturing section 100a, each pixel of the polarization image has a value indicating the polarization angle. Then the arrangement of the polarization angles of multiple pixels on that image helps one to know what part of the whole sky has been shot.

Hereinafter, a preferred method of determining the shooting direction will be described as an example.

First of all, suppose the clear sky polarization angle images 1409 and 1410 shown in FIGS. 17(b) and 17(c) are obtained at a certain time. These images seem to represent the same scene but actually have mutually different sky polarization patterns. Specifically, in the clear sky polarization angle image 1409, the entire sky part polarization has its axis of polarization in eleven o'clock direction. On the other hand, in the clear sky polarization angle image 1410, the entire sky part polarization has its axis of polarization in two o'clock direction. By comparing these two clear sky polarization angle images 1409 and 1410 to the celestial polarization pattern shown in FIG. 17(*a*), it turns out, for example, that the clear sky polarization angle image 1409 has been shot northward because this image 1409 has the same polarization angle as the one at the position 1405. In addition, it also turns out that the clear sky polarization angle image 1410 has been shot southward because this image 1410 has the same polarization angle as the one at the position 1407. In this manner, even if the two scene images look the same but if the respective sky parts included in those images have mutually different polarization angles, it turns out that those images were shot in mutually different camera directions.

In FIG. 17(*a*), the polarization patterns are illustrated to have two-dimensional coordinates for the sake of simplicity. Actually, however, it is preferred that the polarization patterns be searched for in a three-dimensional global coordinate system as shown in portions (a) and (b) of FIG. 18, which illustrates conceptually the relation between the sun's position and the direction of the camera in a global coordinate system. With respect to the direction of the camera to estimate, its azimuth is identified by θ1 and its angle of elevation is identified by θ2. Also, the +x, −x, +y and −y directions are supposed to represent northward, southward, westward and eastward directions, respectively. It should be noted that the coordinates do not always have to be set as shown in FIG. 18 but could be set in any other manner as long as the correspondence between the azimuth and the celestial sphere can be known. In the example illustrated in FIG. 18, the direction of the camera is represented by the angle of northward rotation from the eastward direction (which indicates zero degrees), and the angle of elevation of the camera becomes the angle of perpendicular elevation from the horizon. These angles represent the direction of the camera to estimate.

In portion (a) of FIG. 18, the sun 1501 is located by coordinates Ps. A point 1502 on the celestial sphere 1505, corresponding to a certain point on the clear sky polarization angle image, is located by coordinates Pv. The reference numeral 1503 denotes the polarization angle φpix at Pv. The camera 1504 is located by coordinates Pc (0, 0, 0). Ps has a zenith angle φ2 and Pv has a zenith angle θ2. Portion (b) of FIG. 18 illustrates the x-y plane shown in portion (a) of FIG. 18 as viewed from the positive z-axis. In this case, Ps has an azimuth angle φ1 and Pv has an azimuth angle θ1.

In this case, if the radius of the celestial sphere 1505 is identified by r, the respective points located by the coordinates Ps and Pv can be represented as follows using φ1, φ2, θ1 and θ2:

$$Ps(xs,ys,zs)=(r\sin\phi 2\cos\phi 2, -r\cos\phi 1\cos\phi 2, r\sin\phi 2)$$

$$Pv(xv,yv,zv)=(r\sin\theta 1\cos\theta 2, -r\cos\theta 1\cos\theta 2, r\sin\theta 2) \quad (18)$$

(where $0\leq\theta 1, \phi 1\leq 2\pi, 0\leq\phi 2, \theta 2\leq\pi/2$)
In this case, in order to associate the pixel locations of the image shot with respective positions on the celestial sphere, the pixel locations of the image shot are replaced with angles defined with respect to the center of the camera.

FIG. 19 illustrates conceptually the relative positions of the camera and the image shot. In FIG. 19, each element also shown in FIG. 18 is identified by the same reference numeral as the one used to identify that element.

Suppose the location 1601 of the pixel to process is identified by Pg(pgx, pgy). Also, the center 1602 of the image is supposed to be associated with Pv 1502 shown in FIG. 18 and have coordinates Pgc (cx, cy). Furthermore, the angles of view of the camera in the x and y directions are identified by θpx and θpy, respectively. These angles of view are determined by the angle of view determining section 1304 shown in FIG. 16. Since the angle of view is determined by the focal length of the lens and the chip size, the data about the angle of view may be stored in advance in an internal memory in the camera. In this example here, that saved data is retrieved and used as the angles of view to define the range of the clear sky part.

The angle formed between the line passing through the camera 1504 and Pg 1601, and the line passing through the camera 1504 and Pgc 1602 is supposed to be identified by θpx' in the direction of "wx" (i.e., width) and by θpy' in the direction of "wy" (i.e., height), respectively. It should be noted that this image has already had its levelness adjusted, θpy' contributes to only θ2 in the camera's angle of elevation direction. These angles θpx' and θpy' are represented by the following Equations (19):

$$\theta px' = \frac{\theta px}{2}\frac{(cx-pgx)}{cx}, \quad \theta py' = \frac{\theta py}{2}\frac{(cy-pgy)}{cy}, \quad (19)$$

In that case, the position on the celestial sphere Pgv corresponding to Pg on the image is represented by the following Equation (20)

$$(xv, yv, zv) = \left(r\sin\left(\theta 1 + \frac{\theta px}{2}\frac{(cx-pgx)}{cx}\right)\cos\left(\theta 2 + \frac{\theta py}{2}\frac{(cy-pgy)}{cy}\right),\right. \quad (20)$$
$$-r\cos\left(\theta 1 + \frac{\theta px}{2}\frac{(cx-pgx)}{cx}\right)\cos\left(\theta 2 + \frac{\theta py}{2}\frac{(cy-pgy)}{cy}\right),$$
$$\left.r\sin\left(\theta 2 + \frac{\theta py}{2}\frac{(cy-pgy)}{cy}\right)\right)$$

$$(0\leq\theta 1, \phi 1\leq 2\pi, \quad 0\leq\phi 2, \theta 2\leq\pi/2)$$

It should be noted that polarization angle depends on the vector directed from the viewpoint toward the sun and the vector directed from the viewpoint toward the point of observation, regardless of the length of the vectors, therefore the celestial sphere may be supposed to have a radius r of one. Based on above assumptions, the position where the polarization angle of each pixel is located on the celestial sphere can be determined.

FIG. 20 is a bird's-eye view of the camera 1504, the image area 2000 and the celestial sphere 1505. The line passing through the camera 1504 and the image center 1602 extends to a point 1502 on the celestial sphere 1505. In FIG. 20, the same element as its counterpart shown in FIGS. 18 and 19 is identified by that counterpart's reference numeral. The range defined by the angles of view 1603 and 1604 is the shooting region.

The direction of the camera may be estimated by conventional pattern matching technique. Since one cycle of a polarization angle is from 0 through 180 degrees, an angle falling within the range of 180 through 360 degrees may be reduced by 180 so as to fall within that range of 0 through 180 degrees.

As one of the simplest pattern matching techniques, the SSD (sum of squared difference) method can be used. If the direction of the camera is virtually set to a specific direction, the camera's center pixel location Pgc within the whole sky polarization map can be calculated in reference to the virtual direction of the camera. In that case, the difference between the polarization angle at each pixel location on the clear sky polarization image, and the one at a calculated corresponding position on the whole sky polarization map, which is associated with that pixel location, is calculated and a mean squared error is obtained. While changing the direction of the camera that has been set virtually, the mean squared errors are calculated and the direction of the camera that minimizes that error is determined. More specifically, the polarization angle at the point Pgv 1607 on the whole sky polarization pattern is identified by φpgv. Meanwhile, the polarization angle at the point Pg 1601 on an actual image is identified by φpg and the mean squared error is identified by Err. In that case, the mean squared error Err is calculated according to the following Equation (21):

$$Err = \sqrt{\sum^{\phi\, sky} (\phi_{pg} - \phi_{pgv})^2} \qquad (21)$$

At a part that has the smallest mean squared error Err, the polarization angles match best between the polarization angle at each pixel location on the clear sky polarization image, and the one at a corresponding position on the whole sky polarization map. Thus, the point Pv 1502 on the whole sky polarization pattern, which in fact is corresponds to the image center Pgc 1606, is moved just to minimize that mean squared error Err.

Such a matching technique is described in detail by Masao Shimizu and Masatoshi Okutomi in "Two-Dimensional Simultaneous Sub-pixel Estimation for Area-Based Matching", Transactions of the Institute of Electronics, Information and Communication Engineers (of Japan) D-II, Vol. J87-D-II, No. 2, pp. 554-564, February, 2004. Although θ1 and θ2 are actually changed to estimate Pv 1502 with a minimum mean squared error Err (i.e. the direction of the camera), Pv 1502 as a correct solution can be determined on a subpixel basis by the technique disclosed in that document. The estimated result is obtained as the direction of the camera at that time, and the obtained variables θ1 and θ2 which define the direction of the camera thus are entered into the direction of the camera output section.

Next, "calculation mode" shown in FIG. 16(*b*) will be described.

First of all, the sun's position is determined by the sun position determining section 1301 as in "search mode". According to Non-Patent Document No. 1 and 3, a theoretical whole sky polarization pattern is obtained using certain mathematical equations. To put it the other way around, camera's azimuth angle can be calculated inversely using the mathematical equations mentioned above with the pattern and the sun's position thus obtained.

According to the equation of Non-Patent Document No. 1, for example, the following Equation (22) is satisfied:

$$\tan \phi_{pg} \cos \theta_2 \cos \phi_2 \sin(\phi_1-\theta_1)-\sin \theta_2 \cos \phi_2 \cos(\phi_1-\theta_1)+\cos \theta_2 \sin \phi_2 = 0 \qquad (22)$$

where φpg is the polarization angle at a certain pixel in the clear sky polarization image.

What should be obtained in "calculation mode" is two variables θ1 and θ2 that define the celestial sphere position Pv (θ1, θ2) associated with the image center Pgc shown in FIG. 19 (see portion (a) of FIG. 18). In most cases, there are multiple pixels in the clear sky polarization angle image (i.e., pixels in the clear sky part). Since the angles of view are already known, the location of each pixel Pg can be represented by Pgv (θ1+θpx', θ2+θpy'), where θpx' and θpy' are obtained by Equation (19) based on the angles of view and the pixel locations.

As can be seen from the foregoing description, according to Equation (22), θ1 and θ2 can be calculated based on φpg, φ1 and φ2 associated with respective pixels in the clear sky polarization angle image. To obtain θ1 and θ2, calculations should be made on at least three points. Actually, however, as there would be some noise in the polarization angle image, the number of the points to use is preferably as large as possible. For example, a iterative technique that applies dynamic programming is preferably adopted.

Finally, as to the direction of the camera thus estimated, the tilt around the camera's z-axis, which has been corrected by θr degrees by the roll levelness adjusting section, is recovered by rotating the coordinate to its original position. This can be done by performing inverse calculation of Equations (10), for example.

It should be noted that in this "calculation mode", it is not always necessary to use Equation (22) described above. Alternatively, the direction of the camera can also be estimated in a similar manner by any another equation for calculating the polarization of the sky.

Next, the output section 102 shown in FIG. 1F outputs the direction of the camera including orientation and angle of elevation of the camera, which have been obtained as a result of processes described above, as data in the form to be used later. That is to say, information about θ1 and θ2 shown in FIG. 19 is output in appropriate forms depending on conditions.

Embodiment 2

FIG. 21 is a block diagram illustrating a configuration of a camera direction detector as a second specific preferred embodiment of the present invention. In FIG. 21, any component with substantially the same function as its counterpart shown in FIG. 1F is identified by the same reference numeral and a detailed description thereof will be omitted herein.

There are a few differences between the first preferred embodiment described above and this preferred embodiment. First of all, although the detector of the first preferred embodiment includes the clear sky polarization angle image capturing section 100 (see FIG. 1F), the detector of this preferred embodiment includes a clear sky polarization image capturing section 1700 (see FIG. 21). As used herein, the "clear sky polarization image" includes both a "clear sky polarization angle image" and a "clear sky degree of polarization image". That is to say, according to this preferred embodiment, not just the "clear sky polarization angle image" but also a "clear sky degree of polarization image" are obtained as well. Another difference between the first preferred embodiment and this preferred embodiment is that the detector of this preferred embodiment includes a camera direction estimating section 1701 that performs a different type of processing from the camera direction estimating section 101 of the first preferred embodiment described above.

Hereinafter, the configurations and operations of the clear sky polarization image capturing section 1700 and the camera direction estimating section 1701 of this preferred embodiment will be described.

FIG. 22A illustrates a configuration of the "clear sky polarization image processing section" 100c of the "clear sky polarization image capturing section" 1700. In FIG. 22A, any component having substantially the same function as its counterpart shown in FIG. 11A is identified by the same reference numeral and a detailed description thereof will be omitted herein.

In FIG. 22A, not just the clear sky polarization angle image φsky but also a clear sky degree of polarization image ρsky are also output, unlike the configuration shown in FIG. 11A. According to this preferred embodiment, the output selecting section 1009 also chooses either the first mask image A' or the second mask image B'. In this preferred embodiment, however, the chosen mask image (which will be referred to herein as a "mask image C'") is subjected to an logical AND operation with the degree of polarization image ρ at the image computing section 1801, thereby calculating the clear sky degree of polarization image ρsky, which is then output along with the clear sky polarization angle image φsky.

Figure 23:
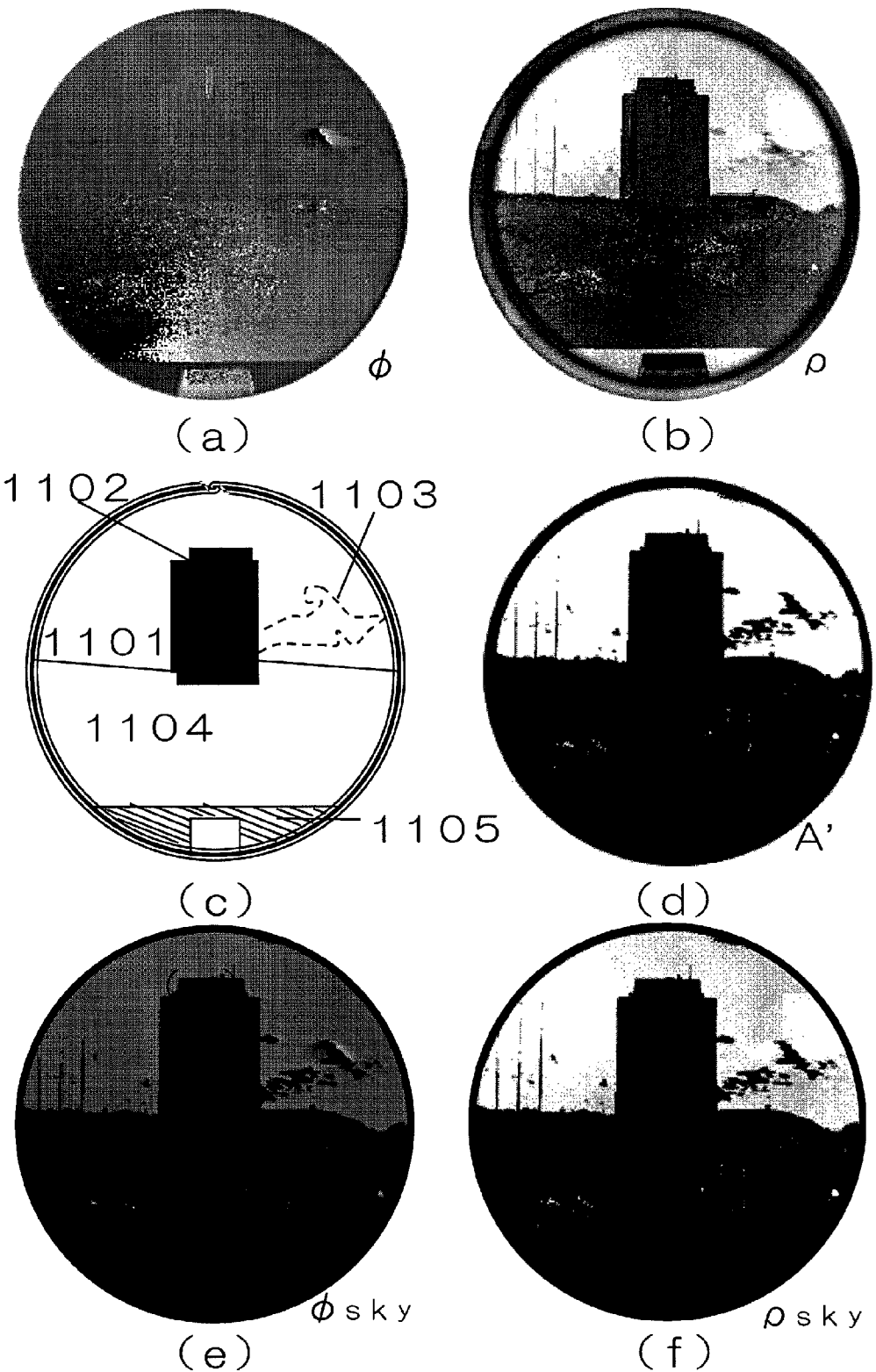

Next, it will be described, using the scene images that were actually shot as shown in FIG. 23, how this preferred embodiment works.

The image shown in FIG. 23(a) is a polarization angle image φ of the scene image. The image shown in FIG. 23(b) is a degree of polarization image ρ of the scene image. As schematically shown in FIG. 23(c), this image includes a sky part 1101, a building part 1102, a cloud part 1103, a ground part 1104 and a camera's pedestal 1105. These reference numerals are the same as the ones that are used to identify their counterparts in FIG. 12.

The image shown in FIG. 23(d) is the mask A' that has been generated by the minimum configuration 1012. The "clear sky polarization angle image" φsky shown in FIG. 23(e) is the logical AND product between that mask A' and the "polarization angle image" φ that has been computed at the "image computing section" 1011. And the "clear sky degree of polarization image" ρsky shown in FIG. 23(f) is the logical AND product between that mask A' and the degree of polarization image ρ that has been computed at the "image computing section" 1811. It can be seen that both of these images have the characteristic pattern of the sky. The degree of polarization pattern of the sky, as well as the polarization angle pattern, can also be calculated based on the sun's position, and therefore, can be used to estimate the direction of the camera.

Just like the modified examples (see FIGS. 11B and 11C) of the clear sky polarization image processing section 100c shown in FIG. 11A, "the clear sky polarization image processing section" 100c shown in FIG. 22A can also be modified as shown in FIGS. 22B and 22C. Specifically, in the configuration shown in FIG. 22B, before the first and second clear sky part masks A' and B' are generated, the choosing section 1014 decides which mask to make according to the output ρd of "the degree of polarization determining section" 1010. On the other hand, in the configuration shown in FIG. 22C, the choosing section 1014 determines whether to generate the first clear sky part mask A' or to generate the second clear sky part mask B' in advance by reference to the image timestamp.

Next, configurations of the "camera direction estimating section" 1701 shown in FIG. 21 will be described with reference to FIGS. 24 and 27, which illustrate a configuration of "search mode" and a configuration of "calculation mode", respectively. In both of FIGS. 24 and 27, any component with substantially the same function as its counterpart shown in FIG. 16 is identified by the same reference numeral and a detailed description thereof will be omitted herein. The difference between their counterparts of the first preferred embodiment and the configurations of this preferred embodiment is that clear sky polarization images, i.e., not only the clear sky polarization angle image φsky but also the clear sky degree of polarization image ρsky, are input in this preferred embodiment.

To begin with, FIG. 24 is referred here.

A yaw levelness measuring section 1901 measures the camera's angle towards the yaw direction, i.e., its angle of elevation. A "whole sky polarization map candidate region cutout section" 1903 cut outs only a candidate region of the whole sky polarization map part, associated with the clear sky polarization image captured, based on the angle of view and the angle of elevation of the camera. The "clear sky part estimating section" 1303 operates in the same way as its counterpart 1303 of the first preferred embodiment. A "degree of reliability determining section 1904 determines the degree of reliability of the direction of the camera estimated. Hereinafter, it will be described exactly how these sections operate.

The "yaw levelness measuring section" 1901 measures the angle of elevation of the camera, thereby to limit the range of the whole sky polarization map to be searched later. To do that, the same level as the one provided for the "roll levelness adjusting section" 100b of the "clear sky polarization image capturing section" 1700 may be arranged on the same plane so as to measure the angle of elevation. As described above, any level may be used as long as the level can be built in the camera as disclosed in the patent documents cited above. In any case, the angle of elevation thus obtained corresponds to θ2. As a result, the "clear sky part direction estimating section" 1303 can estimate the direction of the camera easily just by changing the azimuth angles θ1 of the camera.

FIG. 25 illustrates a concept of the process described above. As in FIG. 17, the sun 1401 and a camera position 1404 are shown in a celestial sphere representing its polarization angles. In the schematic representation 1409 of the polarization image captured, the polarization angle of the sky is schematically indicated by the arrows. As for the whole sky degree of polarization map, the searching range is limited in the same procedure as what has already been described above and its illustration is omitted herein.

If the angle of view and the angle of elevation of the camera are already known, the "whole sky polarization map candidate region cutout section" 1903 can limit the searching range to the belt-like region 2001 in the whole sky polarization map (with θ2 fixed) when the clear sky part in the scene image shot is matched to the whole sky polarization map. And the angle of elevation and the angle of view may be fixed within that region 2001 and the region 2001 may be searched only for the orientation of the camera as a parameter by the same technique as what has already been described for the first preferred embodiment. Thus, the search should be done more quickly.

Although this example is described with reference to a two-dimensional drawing, matching may also be done with θ2 fixed and with only θ1 varied even when matching is done in three-dimensional coordinate system as shown in FIG. 18.

It should be noted that it is not always necessary to fix the angle of view and the angle of elevation because the measured values should include some error. That is why it is possible to use the angle of view and the angle of elevation with their values somewhat increased and decreased from the obtained ones within appropriate ranges.

Hereinafter, a preferred embodiment in which the degree of reliability is determined according to the solar altitude will be described with reference to FIG. 26A. The configuration shown in FIG. 26A is comprised of a "sun position determining section" 1301 and a "solar altitude determining section" 1302.

If the solar altitude that has been provided by the sun position determining section 1301 is equal to or higher than a predetermined altitude, the solar altitude determining section 1302 determines that the result is "not reliable" and takes appropriate steps such as to stop the process, or to report the error. This is because if the sun is close to the zenith, the polarization map will have substantially no difference in any direction (i.e., in north, south, east or west) and the degree of reliability of the decision will be lowered significantly.

FIG. 26B illustrates a celestial polarization angle pattern in such a situation where the sun 2101 is located at the zenith. If the sun 2101 were located right at the zenith, the polarization angle as defined by the local meridian would be 90 degrees everywhere, no matter what direction the camera has. In that case, it should be impossible to estimate the direction of the camera.

It depends on the latitude, the longitude and the season exactly how close to the zenith the sun will pass actually. That is why if the culmination altitude of the sun falls within a threshold value range with respect to the zenith, it is determined that the direction of the camera cannot be estimated. In that case, the direction of the camera estimation is stopped, an error is somehow reported to the user, and the processing is aborted. For example, if the solar altitude is within 5 degrees from the zenith angle, the estimation could be regarded as impossible.

In a preferred embodiment of the present invention, the "yaw levelness measuring section" 1901 and the "whole sky polarization map candidate part cutout section" 1903 shown in FIG. 24 and the "sun position determining section" 1301 and the "solar altitude determining section" 1302 shown in FIG. 26A are all provided.

In the exemplary configuration shown in FIGS. 24 and 26A, finally, the "degree of reliability determining section" 1904 determines the degree of reliability of the result of estimation and informs the user of that. Since information about the solar altitude can be obtained according to the configuration shown in FIG. 26A, the degree of reliability can be rated by reference to that information. However, the degree of reliability can also be determined based on any other kind of information. For example, if a number of candidate regions have been obtained and if that number is excessive, the degree of reliability could be determined to be low. Or if an area with a low degree of polarization has been selected, the degree of reliability could also be determined to be low.

If the degree of reliability is low, then the user should take some sort of action when faced with such information. For example, if there are a number of camera directions provided, then the user may choose one of those directions that matches most closely to the actual direction, shooting position and sun's position. Alternatively, he or she could also change the shooting directions in accordance with the camera's recommendation function (to be described later). Or if the shooting situation permits, the shooting period could also be extended to the limit proposed by the camera's display section.

Next, "calculation mode" will be described with reference to FIG. 27.

In FIG. 27, any section having the same function as its counterpart shown in FIG. 16(b) is identified by that counterpart's reference numeral. What is different from FIG. 16(b) is that a "partial clear sky part direction calculating section" 1304 is further provided and that the yaw levelness and the solar altitude determined are also input as additional information to the "partial clear sky part direction calculating section" 1304. Using these pieces of information as constrains on calculations, the clear sky part direction is calculated as in the first preferred embodiment described above. For example, if the output of the solar altitude determining section 1902 indicates that "the altitude is too high to perform calculations", then the rest of the calculation is discarded and an error is reported to the user (e.g., shown on the display) as in a situation where the result has been determined to be "not reliable".

In addition, since the yaw levelness is either already known or can be used as a clue, just $\theta 1$ needs to be obtained when calculation is made by Equation (22). As a result, the estimation can be done easily with good reliability. Furthermore, as in "search mode", the "degree-of-reliability determining section" 1904 eventually determines the degree of reliability of the result of estimation and notifies the user of that. And if the degree of reliability is low, the user needs to take some sort of action just as described above.

Embodiment 3

FIG. 28 is a block diagram illustrating a configuration of the direction detector as a third specific preferred embodiment of the present invention. In FIG. 28, any component having substantially the same function as its counterpart shown in FIG. 21 is identified by the same reference numeral and a detailed description thereof will be omitted herein.

This third preferred embodiment is comprised of the output section 2201, with a part for calculating the sun direction in a camera coordinate system and compiling and outputting, in a predetermined format, data including information about the sun direction and information about the direction of the camera. Hereinafter, the output section 2201 will be described.

FIG. 29 illustrates a configuration of the output section 2201. A "coordinate transformation section" 2301 calculates the sun's position in the camera coordinate system based on the orientation and angle of elevation of the camera. And an "image format generating section" 2302 generates an image Im in a format including the direction of the camera and the sun direction. Hereinafter, the steps of such processes will be described.

Suppose CamVect (xcm, ycm, zcm) has been obtained as the direction of the camera on the celestial sphere. In this case, the sun is supposed to have coordinates Ps (xs, ys, zs) on the celestial sphere. First of all, with respect to CamVect, the optical axis of the camera should be aligned with the z-axis. In this case, a 3×3 rotation matrix R1 may be defined.

If R1 that satisfies the following Equation (26) is used as the sun's coordinates Ps, the sun's position when the optical axis of the camera is aligned with the z-axis can be determined:

$$\begin{pmatrix} 0 \\ 0 \\ 1 \end{pmatrix} = R1 \cdot \begin{pmatrix} x_{cm} \\ y_{cm} \\ z_{cm} \end{pmatrix} \quad (23)$$

Also, at this point in time, the camera is located at such coordinates with its roll levelness still adjusted. That is why the actual coordinates of the camera should be recovered using the roll levelness value that has been obtained by the "clear sky polarization image capturing section". A rotation matrix R2 for making the inverse calculation of Equation (10) may be used to get the recovery process described above done.

As a result, with respect to the sun's coordinates Ps (xs, ys, zs) on the celestial sphere, the sun's coordinates SUNcm (xscm, yscm, zscm) on the camera coordinate system can be obtained according to the following Equation (24) using R1 and R2:

$$\begin{pmatrix} x_{scm} \\ y_{scm} \\ z_{scm} \end{pmatrix} = R2 \cdot R1 \cdot \begin{pmatrix} x_s \\ y_s \\ z_s \end{pmatrix} \qquad (24)$$

Next, the "image format generating section" 2302 will be described. The present invention can be used to perform not only internal processing but also external processing on a camera. For example, the present invention can also be used to perform post-processing on an image shot using a computer outside of the camera. That is why a unique format for retrieving information about the direction of the camera and the sun direction is required.

An exemplary image format 2401 is shown in FIG. 30. This image format 2401 is comprised of various kinds of data about an image shot Im at the same time. Examples of those data include:

Timestamp, latitude and longitude data 2402

Information 2403 and 2404 about the direction of the camera (including azimuth angle and angle of elevation) on the celestial coordinate system Information 2405 about the sun's position on the camera's coordinate system Clear sky part cutout data 2406

Clear sky part polarization angle image 2407

Digital camera image data 2408

Of course, the image format 2401 may also have other pieces of information that are often included in a normal image format.

The minimum required pieces of information vary according to the application. But to say the least, this image format must include information about the longitude and latitude of the shooting spot and information about the direction of the camera (or orientation) as the minimum required pieces of information. An image in such a format is output by this image capture device.

If the image format includes these pieces of information, various kinds of processing including:

i) recognizing and labeling the object to shoot by the shooting location and the direction of the camera;

ii) making image correction such as backlight compensation and color correction based on the camera position and the sun's position;

iii) converting the color of the clear sky part; and iv) determining whether the image is a real one or a fake can be performed not only inside but also outside of the camera. Examples of these four applications will be described later.

First of all, the processing i) will be described. Suppose a photo was shot with a camera at a sightseeing spot such as the Arch of Triumph in Paris. In that case, if the camera is equipped with a GPS, then it can be seen that the photo was certainly taken near the Arch of Triumph. But with only such vague data, nobody can be sure whether the object of shooting was the Arch of Triumph itself or the Champs Elysees with his or her (the shooter) back to the Arch of Triumph.

If the technique of the present invention is adopted, however, the orientation of the camera 2403 can be known. That is why it can be seen, by reference to the world map, whether the object of shooting was the Arch of Triumph or the Champs Elysees. Such a piece of information can be used to sort out a number of photos saved in a person's PC by the object of shooting. And that kind of information can also be used to sort out a huge number of images on the Web by the object of shooting as well.

Furthermore, if the information 2405 about the angle of elevation of the camera is also used, an approximate view direction of the camera can be seen. And once the direction of the optical axis of the camera is known, that can be a very useful piece of information when image synthesis is carried out on a person's images or images on the Web that have been sorted out according to the object of shooting. As a result, information that can be used effectively in the fields of CG and CV is provided.

Next, the processing ii) will be described. Since the sun direction coordinates 2404 have been derived, the relative position of the sun with respect to the camera is already known. For example, if the camera is placed towards the sun, the object would be too dark due to the backlight. In that case, the camera may either "make backlight compensation automatically" or "recommend the user to apply backlight compensation". Optionally, in such a situation, the display section of the camera may also propose recommended framing so as to induce the user to turn his or her camera toward the recommended direction spontaneously by having the camera focused on the object when the camera is turned to that recommended direction and by having the camera out of focus when the camera is turned away from that recommended direction. It should be noted that the sun's position can also be calculated on a PC based on the timestamp, latitude and longitude data 2402 and the direction of the camera and angle of elevation data 2403, 2405. For that reason, the sun direction 2404 does not need to have already been derived on the PC.

Next, the processing iii) will be described. Since this format includes the clear sky part cutout data 2406, the clear sky part of a photo that was taken in the daytime may have its colors changed into that of evening sky or at least such an alternative color may be presented to the user as candidate for color conversion. Meanwhile, if the rest of the photo other than the clear sky part is (or gets ready to be) subjected to another kind of conversion (e.g., slightly darkened), then the scene image can be converted more naturally and useful information can be provided for image processing software.

Finally, the processing iv) will be described. This image format includes the clear sky part polarization images 2407. That is why even if the digital camera image data 2401 and the timestamp data 2402 of an image have been converted into those of a sunrise image by image transformation and header rewriting, it can be seen, by reference to the sunrise polarization map adopted in this technique, whether that is processed data or not. As a result, that data can be used to determine whether a given photo is a real one or a fake.

It should be noted that these four applications are only typical examples and any other kind of post-processing can also be carried out using this format.

As described above, an image capture device (such as a camera) with the direction detector of the present invention estimates the direction of the optical axis of the camera based on the polarization information of the clear sky part in the scene image. That is why there is no need to use a special kind of lens to obtain the whole sky polarization pattern.

As shown in FIG. 31, the camera direction detecting method of the present invention includes the steps of: obtaining polarization images and a color image captured by a camera (S2500); generating a clear sky polarization angle image, indicating the polarization angle of a clear sky part included in the color image, based on the polarization images and the color image (S2502); estimating the direction of the camera by reference to the clear sky polarization angle image (S2504); and outputting information about the direction of the optical axis of the camera (S2506). The camera direction detecting method of the present invention, including these steps of processes, can be carried out using not only the device described above but also a device with any other configuration. Also, if a program is designed to get these steps of processes executed by a computer and if the operation of a computer built in an image capture device such as a camera is controlled using such a program, the operation of the image capture device can be improved easily by modifying the program.

Embodiment 4

Hereinafter, a fourth specific preferred embodiment of the present invention will be described.

Preferred embodiments of the present invention described above relate to an image capture device with an image capture device direction detecting section. On the other hand, this fourth specific preferred embodiment of the present invention relates to a vehicle (typically, a car) with the image capture device direction detecting section. Specifically, the vehicle of this preferred embodiment includes: an image capture device including an image capturing section for capturing polarization images, including a polarization angle image, and a luminance image; and the image capture device direction detector described above. The vehicle further includes a vehicle direction estimating section for determining the direction of the vehicle by the direction of the image capture device detected in accordance with a relation in direction between the vehicle and the image capture device.

Generally speaking, a car navigation system obtains the location of the car determined by a GPS and determines what direction (or the azimuth) the frontend of the car faces by the displacement of the moving car on the supposition that the car is now moving either forward or backward.

When the vehicle stops, however, no displacement occurs. For that reason, in such a situation, the azimuth of the vehicle should be estimated based on the past data. And not just when the car stops but also when the car changes its directions at substantially the same location (as in intersection, for example), the GPS's location data does not change, either. That is why in that case, the azimuth of the vehicle is estimated based on the past azimuth data and information about the number of revolutions of the wheels while the car is running.

According to these methods, the car's azimuth is estimated based on the past situations. That is why depending on how long the vehicle's stop state has lasted, or on the road condition, or exactly on how the running vehicle has stopped, the current actual azimuth could not be indicated properly. For example, if the car has spun around and stopped, the direction of the car cannot be calculated based on the number of revolutions of the wheels. As a result, it cannot be estimated in which direction the car faced when it stopped.

On the other hand, as a method for determining the azimuth more directly, a traditional compass could also be used. However, it is known that a compass is easily affected by magnetism. That is to say, if there were anything that generates magnetic force near the compass, the azimuth would get easily out of order. Also, if a compass were mounted on a metallic vehicle such as a car's body, the compass could also get out of order due to the magnetization of the vehicle itself. Furthermore, the compass could not be used at a lot of places where no geomagnetism can be detected.

FIG. 32A illustrates a configuration of a vehicle direction detector, which is provided for the vehicle of this preferred embodiment. Unlike the configuration of any of the preferred embodiments of the present invention described above, this vehicle direction detector includes a vehicle direction estimating section 2600 for determining the vehicle's direction and a vehicle direction output section 2601 that outputs the vehicle's direction. Furthermore, according to this preferred embodiment, a database 260 that provides information about the relation between the direction of the camera and the vehicle's direction is connected to the vehicle direction estimating section 2600. This database 2600 could be built in the vehicle itself. Alternatively, a database 2600 provided outside of the vehicle could be either hardwired or connected wirelessly to the vehicle.

Hereinafter, it will be described with reference to FIG. 33 how the vehicle's direction is detected according to this preferred embodiment. FIG. 33 is a flowchart showing how the vehicle direction detector provided for the vehicle of this preferred embodiment operates. Specifically, after the scene image and scene polarization image capturing section (which will be simply referred to herein as "image capturing section") 100a shown in FIG. 32A has performed the image capturing step S2700, the clear sky polarization image processing section 100c performs the image processing step S2701. In this manner, a clear sky polarization image is obtained.

Next, the camera direction estimating section 101 performs a camera direction estimating step S2702, thereby estimating the imager's direction (or direction of the image capture device). And based on the information about the direction of the image capture device estimated, the vehicle direction estimating section 2600 performs a vehicle direction estimating step S2703, thereby estimating the direction of the vehicle.

Hereinafter, the relation between the direction of the image capture device and the direction of the vehicle will be described. As will be described with reference to FIG. 35 later, the relation between the directions of the image capture device and vehicle varies according to where the camera (i.e., image capturing section) is mounted. That is why the direction of the image capture device does not always agree with that of vehicle. For that reason, the direction of vehicle needs to be determined by the direction of the image capture device according to where the image capturing section is attached to the vehicle (which will be simply referred to herein as "camera position").

According to this preferred embodiment, data (or a table) having the structure shown in FIG. 32B is accumulated in the database 260. If the coordinates representing the direction of the camera are transformed according to the camera position (which may be oriented forward, backward, rightward or leftward) on the vehicle by reference to the data in the database 260, the coordinates representing the vehicle's direction can be calculated. For example, if the image capture device is mounted on the rear end of the car, the vehicle's direction can be obtained by rotating the direction of the camera 180 degrees.

Strictly speaking, the relation between the direction of the camera and the direction of the vehicle is defined by not only the camera position but also the relation between the direction of the optical axis of the camera and the direction of the vehicle. That is why the data to be amassed in the database 260 preferably contains information about a more accurate relation between the direction of the camera and the direction of the vehicle.

Finally, the "vehicle direction output section" 2601 performs a "vehicle direction output step" S2704, thereby processing the information on the direction of the vehicle so that the information can be presented to the user either visually on the display or audibly through a loudspeaker.

Hereinafter, it will be described with reference to FIG. 34 how the vehicle (e.g., a car 2801) of this preferred embodiment operates.

In this example, suppose a situation where the car 2801 has entered the intersection 2800 and stopped there. According to a method that uses a difference in speed (such as a technique that uses a GPS), to find the current direction of the car, the car is assumed to run a certain distance along one of the roads that cross each other at that intersection. In that case, if the road chosen was different from the road that the driver really wants to pass, however, the car should virtually go back to the intersection and start searching the correct road again, which would be troublesome. On the other hand, according to the present invention, just by obtaining the clear sky polarization image (in the image area 2802 shown in FIG. 34) outside of the car, the direction of the car can be presented to the user even without assuming the car has run a certain distance.

It should be noted that the direction of the car could be presented to the user either visually on the display 2803 or as an alarm 2804 as shown in FIG. 34. Particularly if a map around the current spot is now presented on the display 2803, the user can see the direction of his or her own car easily by indicating the direction of the car by the arrow 2805, for example, on the map.

Hereinafter, this preferred embodiment will be described in further detail.

Now take a look at FIG. 32A again. "The scene image and scene polarization image capturing section" 100a, "the clear sky polarization image processing section" 100c and "the camera direction estimating section" 101 shown in FIG. 32A operate in the same way as their counterparts shown in FIG. 1F and identified by the same reference numerals, and the description thereof will be omitted herein. The roll levelness adjusting section 100b could operate either in the same way as its counterpart shown in FIG. 1F or differently as will be described later.

While the car is running, the image capturing section is fixed on or inside the car. That is why once the roll levelness with respect to the ground is stored when the image capturing section is installed, the levelness may be just corrected after that with respect to the original value. In that case, since there is no need to extract the horizon every time, the processing can get done more quickly.

Next, the vehicle direction estimating section 2600 will be described.

FIG. 35 illustrates typical positions where polarization imagers (image capture devices) 2900 are mounted on a vehicle. In FIG. 35, illustrated are vehicles (cars) 2901 through 2904 according to this preferred embodiment.

Specifically, in the vehicle 2901, the polarization imager is mounted on either the front hood (such as the polarization imager 2905) or the rear hood. In this manner, the clear sky polarization angle image can be obtained at a relatively high position without interfering with driving.

Alternatively, the polarization imager 2906 or 2907 may also be mounted at a position lower than the hood (e.g., near the bottom of the car body) as in the vehicle 2902. Then, the appearance of the vehicle will be affected to a lesser degree. Also, the polarization imager may also be arranged obliquely as indicated by the reference numeral 2907.

Still alternatively, if the polarization imager 2908 is mounted on the windshield of the car right in front of the driver or the assistant as in the vehicle 2903, the clear sky polarization image can be obtained at an even higher position with good stability.

It should be noted that the polarization imagers 2905 through 2908 are mounted at different positions but have quite the same configuration, and therefore, will be collectively referred to herein as "polarization imagers 2900".

Instead of mounting the polarization imager at a fixed position permanently, the user may determine where to mount the polarization imager 2900 any time before he or she gets into the car. For example, if the image capture device and the device including the clear sky polarization image processing section can be connected together via a cable, the position of the image capturing section can be selected by the user from a wide range as in the vehicle 2904. Then, the image capturing section can be used so as to meet an individual user's convenience and will come in handier for him or her. In any case, the user may put the image capturing section anywhere in any direction as long as the clear sky polarization angle image can be obtained from outside of the car and unless the image capturing section faces right upward from the car body (because the sun will probably be included in the image in that case). That is why the image capturing section does not have to be arranged at one of the illustrated positions but could be mounted anywhere else as long as those installation conditions are met.

If it has turned out to be rainy or cloudy outdoors or if the accuracy of direction of the camera estimation should be much lower than usual according to the time of the day or the location, then a message may be posted by the device of this preferred embodiment to the vehicle 3000 in such a situation as shown in FIG. 36. For example, a message that reads "low reliability, out of service" could be presented on the display 3001 or the user may also be alerted to the fact that the device of the present invention is not available with an alarm 3002. In this manner, the probability of sending wrong information to the user can be reduced.

Embodiment 5

Hereinafter, a fifth specific preferred embodiment of the present invention will be described.

Generally, in a navigation system built in a portable device, the location of the person who holds it while moving is determined by a GPS, and it is determined, by the magnitude of displacement of that person, which direction (or azimuth) he or she is now facing on the supposition that the person is going either forward or backward.

If the person stopped, however, its location would not change anymore, which is a problem. In that case, the person's azimuth should be estimated based on the past data. Nevertheless, as a person's walking speed is much lower than the velocity of a car, it is difficult to estimate the direction of the person accurately based on the past azimuth data. Among other things, if the person once stopped and looked around, then it would be very difficult to provide information about which direction he or she is now facing and which road on the map is right in front of him or her.

The direction detector of this preferred embodiment, however, can estimate the direction of a mobile device held by a person even if that person is not walking.

FIG. 37 illustrates an exemplary configuration of a mobile device direction detector according to this preferred embodiment. Unlike the preferred embodiments of the present invention described above, the detector shown in FIG. 37 includes a mobile device direction estimating section 3100 for estimating the direction of the mobile device and a "mobile device direction output section" 3101 to output the direction of the mobile device.

Hereinafter, the mobile device direction detecting operation of this preferred embodiment will be described with reference to FIG. 38, which is a flowchart showing how the mobile device direction detector, built in a mobile device of this preferred embodiment, operates. Specifically, after the "scene image and scene polarization image capturing section" 100*a* shown in FIG. 32A has performed an image capturing step S3200, the "clear sky polarization image processing section" 100*c* performs an image processing step S3201. In this manner, a clear sky polarization image is obtained.

Next, the camera direction estimating section 101 performs a camera direction estimating step S3202, thereby estimating the direction of the imager. And based on the information about the direction of the image capture device estimated, the "mobile device direction estimating section" 3100 performs a "mobile device direction estimating step" S3203, thereby estimating the direction of the mobile device.

In this preferred embodiment, by using the database that has already been described with reference to FIGS. 32A and 32B, the direction of the mobile device can also be determined by reference to the relation between the direction of the camera and the direction of the mobile device.

Finally, the "mobile device direction output section" 3101 performs a "mobile device direction output step" S3204, thereby processing the information on the direction of the mobile device so that the information can be presented to the user either visually on the display or audibly through a loudspeaker.

FIG. 39 illustrates a typical situation where the detector of this preferred embodiment is used. In this example, a person 3301 is supposed to have entered an intersection 3300 and stopped there. According to a method that uses a difference in speed (such as a technique that uses a GPS), to find the person's current direction, he or she is assumed to walk a certain distance along one of the roads that cross each other at that intersection. In that case, if the road chosen was different from the road that he or she really wants to pass, however, he or she should virtually go back to the intersection and start searching for the correct road again, which would be troublesome. On the other hand, according to the present invention, just by obtaining the clear sky polarization image (in the image area 3302 shown in FIG. 39), the direction of the mobile device can be presented to the user even without assuming the person to walk such a distance in vain. It should be noted that the direction of the mobile device could be presented to the user either visually on the display 3303 or as an alarm 3304 as shown in FIG. 39. Particularly if a map around the current spot is now presented on the display 3303, the user can see his or her direction easily by indicating the direction of the mobile device by the arrow 3305, for example, on the map.

Hereinafter, this preferred embodiment will be described in further detail.

The "scene image and scene polarization image capturing section" 100*a*, the "clear sky polarization image processing section" 100*c* and the "camera direction estimating section" 101 shown in FIG. 37 operate in the same way as their counterparts shown in FIG. 1F and identified by the same reference numerals, and the description thereof will be omitted herein.

The "roll levelness adjusting section" 100*b* could operate either in the same way as its counterpart shown in FIG. 1F or differently as will be described later.

The roll levelness of the imager with respect to the ground is a factor indicating how the mobile device is held. Generally, both an imager and a display are arranged at fixed positions on a mobile device. Likewise, the user who is looking at the display normally either stands upright to the ground or seated. That is why if the levelness of the imager to the ground is known, then it can be regarded as representing the levelness of the display with respect to the user. Consequently, if the step of the process of entering the roll levelness, as well as the clear sky polarization angle, to the output section and adjusting the roll levelness so as to conduct a display operation according to the levelness is performed additionally, then the user can see the direction more easily.

Hereinafter, the "mobile device direction estimating section" 3100 will be described.

First of all, FIG. 40 illustrates typical arrangements of the polarization imager 3400 on a mobile device. In FIG. 40, illustrated are mobile devices (cellphones in this example) 3401 through 3403 according to this preferred embodiment.

If the camera built in the cellphone also functions as a polarization imager 3400 that can shoot both a color image and polarization images at the same time as in the mobile device 3401, a clear sky polarization angle image can be obtained with making the user feel any inconvenience.

Figure 13:
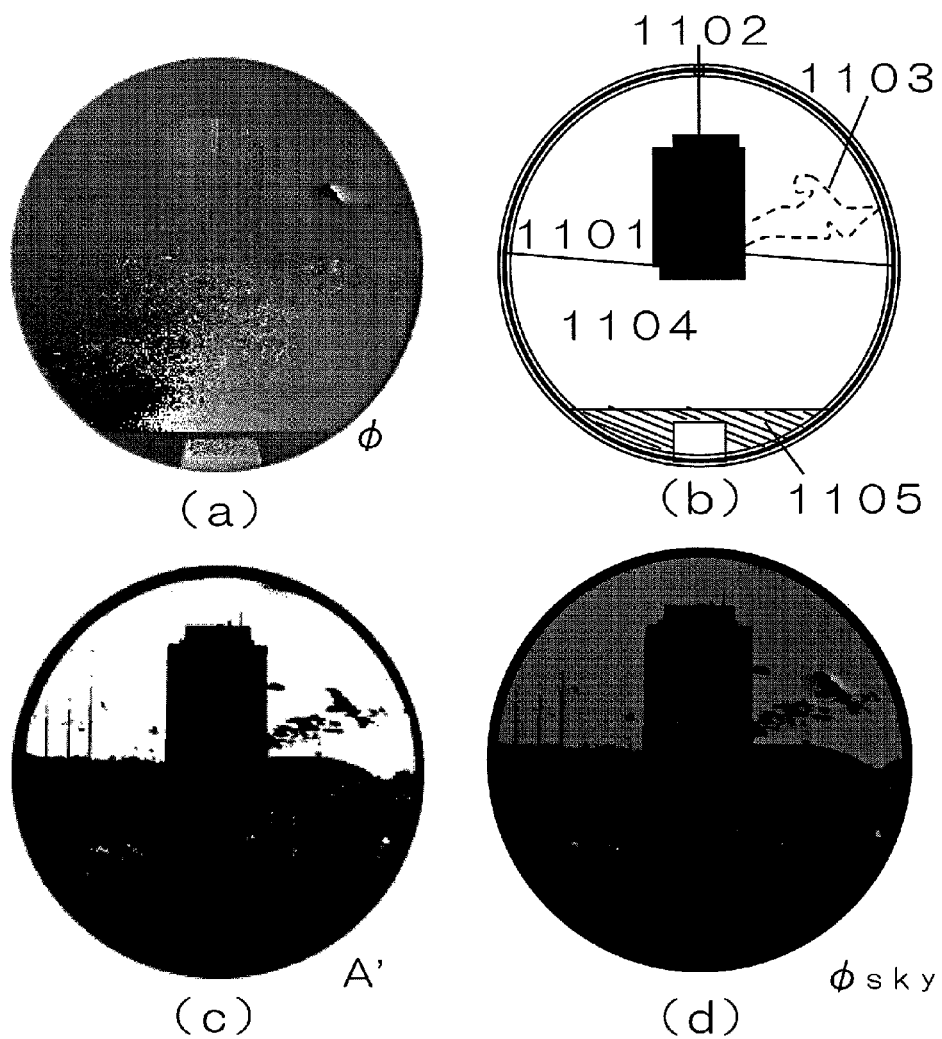

It should be noted that in that case, the device of this preferred embodiment not only operates as a camera direction detector but also may convert any image that has been shot using a cellphone with a camera into an image representing a polarization angle such as the one shown in FIG. 13(*a*) and then output it. Alternatively, an image representing only the sky part extracted may be generated as shown in FIG. 13(*d*) and only the sky part may be replaced with an image with a different texture. Still alternatively, if the polarization imager 3404 is arranged near a portion of the display to be at a higher level than anywhere else when the user unfolds the cellphone and checks the monitor as in the mobile device 3402, the clear sky polarization image could be obtained from such a high level with good stability.

Optionally, instead of attaching the device permanently to a fixed position, the device may also be an external part that can get connected with a cable as needed so that the user can decide where to attach the device anytime he or she likes. As long as the device is attached to such a position where the clear sky polarization angle image can be captured and where the sun is not located right over the device (because the image is very likely to include the sun in that case) as in the mobile device 3403, the user may put the device anywhere in any direction. In that case, each user can adjust the clear sky part obtaining position easily, which is very convenient for him or her.

Preferred embodiments of the present invention are not limited to the illustrated ones but include various other arrangements that meet the setup conditions described above.

If it has turned out to be rainy or cloudy outdoors or if the accuracy of direction of the camera estimation should be much lower than usual according to the time of the day or the location, then a message may be posted by the device of this preferred embodiment to the mobile device 3500 in such a situation as shown in FIG. 41. For example, a message that reads "low reliability, out of service" could be presented on the display 3501 or the user may also be alerted to the fact that the device of the present invention is not available with an alarm 3502. In this manner, the probability of sending wrong information to the user can be reduced.

Embodiment 6

Hereinafter, a sixth specific preferred embodiment of the present invention will be described.

Each of the preferred embodiments of the present invention described above comprised of a "color and polarization image capturing section". According to the present invention, however, to detect the direction of the image capture device, it is not always necessary to obtain a color image. Instead, the direction of the image capture device can also be determined even with a monochrome luminance image. FIG. 42 illustrates a configuration of an image capture device direction detector as a sixth specific preferred embodiment of the present invention. In FIG. 42, the direction detector includes a "scene image and scene polarization image capturing section" 3600a for capturing a scene image and a "clear sky polarization image processing section" 3600c for detecting the polarization state of the clear sky part unlike the preferred embodiments described above. In the other respects, however, the detector has quite the same configuration as the first preferred embodiment described above, and the description thereof will be omitted herein.

It is preferred that every component of the direction detector of this preferred embodiment be contained in the camera shown in FIG. 43. However, the "scene image and scene polarization image capturing section" 3600a, and a level to measure the tilt angle of the camera towards the roll direction, could be contained in the image capturing section 3600 shown in FIG. 42, while the "roll levelness adjusting section" 100b, the "clear sky polarization image processing section" 3600c, the "camera direction estimating section" 101 and the "output section" 102 could be arranged outside of the camera, for example.

FIG. 43 illustrates a configuration of the "scene image and scene polarization image capturing section" 3600a.

Since the camera includes an image capturing section that functions as the "scene image and scene polarization image capturing section" 3600a, the contents of the scene image and the scene polarization image to be shot will vary according to the direction of the camera.

A series of steps to estimate the direction of the camera is preferably performed inside of the camera, but do not always have to be so.

FIG. 43 illustrates a configuration of the "scene image and scene polarization image capturing section" 3600a of this preferred embodiment. If a shooting on location is to be done satisfactorily, both a scene image and a scene polarization image need to be captured at once. Also the clouds may be carried with the wind, the polarization image is also preferably captured in real time. It is preferred that the scene image and the scene polarization image be captured at the same time. However, those images could be captured at an interval of at most several seconds.

The "scene image and scene polarization image capturing section" 3600a shown in FIG. 43 is designed to simultaneously obtain both the object's information on luminance image and polarization image in real time, and output information on two different kinds of polarization image (i.e., a degree of polarization image ρ and a polarization angle image φ).

In the scene image and scene polarization image capturing section 3600a shown in FIG. 43, the incident light passing through the lens 3700a and a diaphragm 3700b enters the polarization obtaining section 3701. From this incident light, the polarization obtaining section 3701 can obtain both the information on luminance image sequence, and polarization image in real time. The polarization obtaining section 3701 outputs signals representing the information on luminance image sequence, and the polarization image, to the "luminance information processing section" 3702 and "polarization information processing section" 3703, respectively, which subject those signals to various types of processing and output the luminance image C, the degree of polarization image ρ and the polarization angle image φ.

The "polarization obtaining section" 3701 captures a monochrome image and a polarization image at the same time. To do that, the technique disclosed in Patent Document No. 3 may be used, for example. According to that technique, to capture a luminance image and an object's partial polarization image at the same time, a patterned polarizer with multiple different polarization principal axes (i.e., polarization transmission axes) is arranged spatially in an image capture device. As the patterned polarizer, either a photonic crystal or a form birefringent micro-retarder array can be used. FIG. 44 illustrates an exemplary configuration of such a polarization and luminance image capture device. In FIG. 44, a narrow band color filter 3800 and a patterned polarizer 3801 are stacked one upon the other in front of the pixels of the image capture device 3802. The incoming light transmitted through the narrow band color filter 3800 and the patterned polarizer 3801, finally reach the image capture device, of which pixels 3802 monitor a monochrome luminance. In this manner, both the information on luminance image and polarization image can be obtained at once. The narrow band color filter 3800 preferably has a transmission range of 500 to 550 nm to select a wavelength range in which the patterned polarizer operates.

FIG. 45 illustrates a portion of the image sensing plane of the polarization obtaining section 3701 as viewed from right over the plane in the direction of the optical axis. In FIG. 45, only four fine polarization pixels (i.e., 2×2) on the imaging area are illustrated for the simplicity. In FIG. 45, the lines drawn in each of these fine polarization pixels schematically indicate the polarization principal axis direction of its associated fine polarizing plate. Specifically, in the example illustrated in FIG. 45, the four fine polarization pixels have their polarization principal axes defined by angles ψi of 0, 45, 90 and 135 degrees, respectively.

To obtain polarization components of specularly-reflected light from an object accurately even if the reflection is particularly bright, or to obtain polarization components derive from the object's shadow area just as intended, the dynamic range of the luminance of the image capture device and bit-depth thereof are preferably as high and large as possible (which may be 16 bits, for example).

The information on luminance obtained from each polarization pixel arranged as shown in FIG. 45 is then processed by the polarization information processing section 3703 shown in FIG. 43. This is the same process as what has already been described with reference to FIG. 8.

By performing these steps of processes, the three parameters A, B and C can be approximated by the sinusoidal function. In this manner, a degree-of-polarization image representing the degree of polarization ρ and a polarization angle image representing the polarization angle φ are obtained. The degree of polarization ρ represents how much the light on a given pixel has been polarized. The polarization angle φ represents the direction of polarization defined by the principal axis of partial polarization of the light on a given pixel. It should be noted that the polarization angle of 0 and 180 degrees (π) are equal to each other. The values ρ and φ (where $0 \leq \phi \leq \pi$) are also calculated according to Equations (6) and (7), respectively, as in the first preferred embodiment described above.

In this preferred embodiment, the patterned polarizer may be a photonic crystal, a film polarizer, a wire grid polarizer or a polarizer operating under any other principle.

The luminance information processing section 3702 shown in FIG. 43 calculates the luminance based on the information provided by the "polarization obtaining section" 3701. The intensity of the light after transmitted through a polarizer is different from the original intensity of the light before reaching the polarizer surface. Theoretically, the average of the intensities of polarized light measured along all polarization principal axes under a non-polarized illumination corresponds to the original intensity of the light yet to be incident on the polarizer. Suppose the measured intensity of an angular polarization pixel P1 is identified by I1, the luminance can also be calculated according to working out the average of the measured intensities as in Equation (8).

By obtaining the intensities of respective polarization pixels, a conventional luminance image can be generated.

In each of the luminance image C, the degree-of-polarization image ρ and the polarization angle image φ, the intensity and polarization information of each pixel can be obtained by using the four polarization pixels shown in FIG. 45. That is why information on each piece of light intensity and polarization can be regarded as representing a value at the virtual pixel point 3900 that is located at the center of four polarization pixels shown in FIG. 45. Consequently, the resolution of a luminance image and that of a polarized image both reduced to quarter size (i.e., a half (vertically) by a half (horizontally)) of the original one of the single-panel color image capture device. For that reason, the number of pixels of the image capture device is preferably as large as possible.

The tilt of the scene image and scene polarization image shot may be corrected by the roll levelness adjusting section 100b shown in FIG. 42 as in the first preferred embodiment, and the description thereof will be omitted herein.

Next, a configuration of the clear sky polarization image processing section 3600c will be described with reference to FIG. 46A.

The clear sky polarization image processing section 3600c receives a degree of polarization image ρ, a polarization angle image φ and a luminance image Y, and outputs a clear sky polarization angle image φsky, which is used to estimate the directions of the camera and the sun from the scene.

In this clear sky polarization image processing section 3600c, a degree of polarization binarizing section 1001 binarizes the degree of polarization image ρ with a threshold value Tρ. A luminance binarizing section 1003 binarizes the luminance image Y with a threshold value TC1. An image computing section 1005 executes the logical AND (product) operation between the degree of polarization image ρ' that has been binarized by the degree of polarization binarizing section 1001 and the luminance image C1' that has been binarized by the luminance binarizing section 1003, to thereby output a mask image A'.

An image computing section 1011 executes the logical AND operation between the "clear sky part mask" Msky adopted and the "polarization angle image" φ, thereby generating a "clear sky polarization angle image" φsky.

It should be noted that the binarization threshold value Tρ may be determined by reference to a histogram of the degrees of polarization of respective pixels in an image. In this histogram of degree of polarization, the intermediate value between its two peaks is supposed to be the threshold value Tρ. In this case, the binarization threshold value Tρ is a threshold value for use to determine whether the degree of polarization is high or low and satisfies the following relation: 0<Tρ<1.

By having these two kinds of mask images ρ' and C1' subjected to the logical AND operation at the image computing section 1005, a mask image A', in which only the clear sky part has been separated and the cloud part with a low degree of polarization removed, can be obtained. Then, that mask image A' is selected and then is subjected to an logical AND operation with the polarization angle image φ at the image computing section 1011.

By performing these steps of processes, the clear sky polarization angle image φsky can be obtained.

It should be noted that in determining the clear sky part, the cloud part is preferably removed. In the subsequent process of detecting the direction of the optical axis of the camera, corresponding between the clear sky polarization angle image φsky and the whole sky polarization map will need to be searched. Obviously, the whole sky polarization map does not take account of cloud. That is why if the polarization angle of the "polarization angle of the clear sky image" φsky has been disturbed with the presence of cloud, were used, estimation errors could occur in such cases.

However if the cloud were thin enough, the polarization angle could not be disturbed even in the cloud part. In that case, the clear sky part could include such cloud. the magnitude of decrease in the degree of polarization in the cloud part gives an indication whether the polarization angle would be disturbed by the cloud or not. The benefit of the processes of this preferred embodiment that detects the clear sky part based on the polarization is that, only a cloud part with a low degree of polarization can be removed automatically.

It should be noted that if the sky part appearing on an image had a low degree of polarization, then the clear sky part separation described above might fail. To avoid such a failure, the output selecting section 4001 and the degree of polarization determining section 1010 shown in FIG. 46B may be used. Based on the output ρd of the degree of polarization determining section 1010, the output selecting section 401 determines, whether or not a first clear sky part mask A' that has been generated based on the binarized luminance image C1' and the degree of polarization image ρ' should be adopted.

More specifically, the degree of polarization determining section 1010 calculates the average degree of polarization based on the degree of polarization histogram of the scene degree of polarization image ρ. Next, if the average degree of polarization ρd provided by the degree of polarization determining section 1010 does not exceed a threshold value, then the output selecting section 4001 shown in FIG. 46B is supposed to stop its processing because the clear sky polarization angle image φsky extracted based on such a low degree of polarization would have a low degree of reliability. For example, if the degree of polarization is lower than a predetermined threshold value Tρ1=0.1, then the image on the screen may be switched into "outside of the range".

As described above, it depends mostly on the time whether or not the clear sky part can be determined with only the configuration shown in FIG. 46A. Therefore, the masks for extracting the clear sky part may be switched according to just the date and time of shooting, instead of determining whether or not the clear sky part can be separated by running the output selecting section 4001 and the degree of polarization determining section 1010. For example, "early in the evening" may be defined from 4 pm through sunset. Then, the clear sky part may be determined with only the minimum configuration shown in FIG. 46A unless it is early in the evening, and the entire configuration shown in FIG. 46B may be used only early in the evening to determine whether the clear sky part can be separated or not.

Next, alternative configurations of the "clear sky polarization image processing section" 3600c will be described with reference to FIGS. 46C and 46D.

As described above, in the clear sky polarization image processing section 3600c shown in FIG. 46B, the output selecting section 4001 determines whether the clear sky part mask A' that has been generated based on the binarized luminance and degree of polarization images C1' and ρ' should be adopted or not by reference to the output ρd of the degree of polarization determining section 1010.

On the other hand, in the clear sky polarization image processing section 100c shown in FIG. 46C, the choosing section 4101 determines whether to generate the clear sky part mask A' or not based on the output ρd of the degree of polarization determining section 1010 in advance. For example, if the output ρd of the degree of polarization determining section 1010 does not exceed the threshold value, the choosing section 4101 shown in FIG. 46C chooses to stop the process without making the clear sky part mask A'. As a result, the clear sky polarization image processing section 3600c shown in FIG. 46C stops the process without making the first clear sky part mask A'. In that case, the user may be provided the message like "outside of the range". As a result, the mask needs to be generated only when the degree of polarization is sufficiently high and the process of generating a mask which will not be utilized can be omitted.

Likewise, in the clear sky polarization image processing section 3600c shown in FIG. 46D, the choosing section 4201 also determines whether the mask should be generated or not before the first clear sky part mask A' is generated. However, the clear sky polarization image processing section 3600c shown in FIG. 46D determines whether or not to make the mask in reference to the image timestamp provided by a timestamp information obtaining section 1016, not on the output ρd of the "degree of polarization determining section" 1010. For example, if the timestamp indicates "early in the evening" (e.g., sometime from 4 pm through sunset), the "choosing section" 4201 shown in FIG. 46D decides that the first clear sky part mask A' should not be generated. In that case, the mask A' is not generated and the process stops. Since the mask which will not be utilized is not generated as in FIG. 46C, the process can get done more efficiently.

The direction of the image capture device is estimated using the "clear sky polarization angle image" or the "clear sky degree of polarization image" that has been generated in the procedure described above. The "camera direction estimating section" 101 and the "output section" 102 shown in FIG. 42 operate in the same way as in the other preferred embodiments described above, and a detailed description thereof will be omitted herein.

As shown in FIG. 47, the camera direction detecting method of this preferred embodiment includes the steps of: obtaining polarization images and a luminance image captured by a camera (S4300); generating a clear sky polarization angle image, indicating the polarization angle of a clear sky part included in the luminance image, based on the polarization images and the luminance image (S4301); estimating the direction of the camera by reference to the clear sky polarization angle image (S4302); and outputting information about the direction of the camera (S4303). The camera direction detecting method of the present invention, including these steps of processes, can be carried out by not only the device with the configuration described above but also a device with any other configuration as well. Also, if a program is designed to get these steps of processes executed by a computer is provided and used to control the operation of the computer that is built in an image capture device such as a camera, the performance of the image capture device can be improved easily by modifying the program.

According to the camera direction detecting method of this preferred embodiment, in the situations shown in FIGS. 46B, 46C and 46D (i.e., if the output selecting section 4001 needs to determine whether or not to continue the process, based on the output provided by the degree of polarization determining section 1010), the camera direction estimating section 101 does not have to operate once it has been determined that the process should not be continued.

That is why the device of this preferred embodiment may have a path for sending an instruction to "stop the process", for example, from the "clear sky polarization image processing section" 3600c to the "output section" 102 and presenting such a message to the user as shown in FIG. 48(a). Likewise, as shown in FIG. 48(b), in a process for carrying out this method, information about whether or not the process should be continued may be provided directly from the step S4301 of generating a clear sky polarization angle image to the step of outputting. By adopting such a configuration or such a flow, it is possible to prevent the camera direction estimating section from performing unnecessary processing.

INDUSTRIAL APPLICABILITY

By paying special attention to the sky's polarization phenomenon, the image capture device of the present invention can obtain light-source information between the camera and the sun in a normal environmental scene with a completely passive method. That is why the present invention is applicable to various types of digital still cameras, digital movie cameras and surveillance cameras. Also, even in a situation where information about the image luminance that should be more and more lacking as cameras are further downsized is compensated for by computer graphics processing, this device should work fine as a practical input device.

REFERENCE SIGNS LIST

| | |
|---|---|
| 10 | camera |
| 100 | clear sky polarization angle image capturing section |
| 100a | scene image and scene polarization image capturing section |
| 100b | roll levelness adjusting section |
| 100c | clear sky polarization image processing section |
| 101 | camera direction estimating section |
| 102 | output section |
| 1301 | sun position determining section |
| 1302 | whole sky polarization angle map obtaining section |
| 1303 | clear sky part direction estimating section |
| 1304 | angle of view determining section |
| 1305 | clear sky part direction calculating section |
| 1901 | pitch levelness measuring section |
| 1902 | solar altitude determining section |
| 1904 | degree of reliability determining section |
| 2301 | coordinate transformation section |
| 2401 | image format |

The invention claimed is:

1. An image capture device direction detector for detecting the direction of the optical axis of an image capture device, the device including an image capturing section for capturing polarization images, including a polarization angle image, and a luminance image, the detector comprising:
  an image processing section for generating a clear sky polarization angle image, which indicates the polarization angle of a clear sky part of the luminance image, based on the polarization images and the luminance image;
  an direction estimating section for estimating the direction of the optical axis of the image capture device, which is determined by the direction of the image capturing section, by reference to the clear sky polarization angle image; and
  an output section for providing information about the direction of the optical axis of the image capture device that has been estimated by the direction estimating section.

2. The image capture device direction detector of claim 1, comprising a sun position determining section for obtaining information about the sun's position at the time of shooting, wherein the direction estimating section estimates the direction of the optical axis of the image capture device by reference to that information.

3. The image capture device direction detector of claim 2, comprising a whole sky polarization map obtaining section to obtain a whole sky polarization map, indicating the polarization state of the sky at the time of shooting, by reference to the information about the sun's position,
wherein the direction estimating section estimates the direction of the optical axis of the image capture device based on the clear sky polarization angle image and the whole sky polarization map.

4. The image capture device direction detector of claim 3, wherein the whole sky polarization map obtaining section retrieves a whole sky polarization map, which indicates the polarization state of the sky at the time of shooting, from a database including the whole sky polarization maps.

5. The image capture device direction detector of claim 4, comprising one or more storage devices which can retain the database referred above.

6. The image capture device direction detector of claim 2, comprising a degree of reliability determining section for determination of the degree of reliability of the result of estimation and to present the information to its user.

7. The image capture device direction detector of claim 2, wherein coordinate transformation is carried out based on the altitude and azimuth of the sun and the direction of the optical axis of the image capture device, thereby determining the sun's position in a camera coordinate system.

8. The image capture device direction detector of claim 3, wherein the whole sky polarization map obtaining section perform calculations to generate the whole sky polarization map which indicates the polarization state of the sky at the time of shooting.

9. The image capture device direction detector of claim 4, comprising a telecommunication device to have access to the data on one or more external storage devices which retain the database referred above.

10. The image capture device direction detector of claim 6, comprising a solar altitude determining section to determine, by the solar altitude derived from the information about the sun's position at the time of shooting, whether the result of estimation is reliable or not.

11. The image capture device direction detector of claim 1, wherein the direction estimating section calculates the direction of the clear sky part based on the polarization angle of the clear sky part, thereby estimating the direction of the image capture device.

12. The image capture device direction detector of claim 1, comprising a whole sky polarization map obtaining section to obtain a whole sky polarization map indicating the polarization state of the sky at the time of shooting,
wherein the direction estimating section operates in at least one of "search mode" and "calculation mode", and
wherein when operating in "search mode", the direction estimating section searches for the direction of the clear sky part by reference to the clear sky polarization angle image and the whole sky polarization map, and
when operating in "calculation mode", the direction estimating section calculates the direction of the clear sky part based on the polarization angle of the clear sky part.

13. The image capture device direction detector of claim 1, comprising a levelness adjusting section for correcting the tilt of the image capture device.

14. The image capture device direction detector of claim 13, wherein the image capture device's tilt includes a tilt towards the roll.

15. The image capture device direction detector of claim 14, wherein the image capture device includes a level, and
wherein the level measures the degree of levelness of the image capture device, thereby used for the compensation for the tilt of the image capture device based on the degree of levelness measured.

16. The image capture device direction detector of claim 1, comprising an angle of view measuring section for measuring the angle of view of the range of shooting, thereby determining the range of the clear sky part by the angle of view measured.

17. The image capture device direction detector of claim 1, wherein the image capturing section includes multiple polarizers with mutually different polarization principal axis angles, and
wherein the polarization images are obtained as a combination of light rays that have been transmitted through the polarizers.

18. The image capture device direction detector of claim 1, wherein the polarization images further include a degree of polarization image as well as the polarization angle image.

19. The image capture device direction detector of claim 1, wherein if the degree of polarization of the sky is equal to or higher than a reference value, the image processing section cuts out the clear sky part based on the degree of polarization, but
if the degree of polarization of the sky is lower than the reference value, the image processing section cuts out the clear sky part based on a hue and outputs the clear sky polarization angle image.

20. An image capture apparatus comprising:
an image capture device including an image capturing section for capturing polarization images, including a polarization angle image, and a luminance image; and
the image capture device direction detector of claim 1.

21. A vehicle comprising the image capture device direction detector of claim 1,
wherein the vehicle further comprises:
an image capture device including an image capturing section for capturing polarization images, including a polarization angle image, and a luminance image; and
a vehicle direction estimating section to determine the direction of the vehicle by the direction of the optical axis of the image capture device detected in accordance with a relation in direction between the vehicle and the image capture device.

22. A mobile device comprising the image capture device direction detector of claim 1,
wherein the mobile device further comprises:
an image capture device including an image capturing section for capturing polarization images, including a polarization angle image, and a luminance image; and
a mobile device direction estimating section to determine the direction of the mobile device by the direction of the optical axis of the image capture device detected in accordance with a relation in direction between the mobile device and the image capture device.

23. An image capture device comprising:
an image capturing section for capturing polarization images, including a polarization angle image, and a luminance image;
an image processing section for generating a clear sky polarization angle image, which indicates the polarization angle of a clear sky part included in the luminance image, based on the polarization images and the luminance image;

a direction estimating section for estimating the direction of the optical axis of the image capture device, which is determined by the direction of the image capturing section, by reference to the clear sky polarization angle image; and an output section to output the image data that has been obtained by the image capturing section and providing information about the direction of the optical axis of the image capture device that has been estimated by the direction estimating section.

24. A method for detecting the direction of the optical axis of an image capture device, the method comprising the steps of:

capturing polarization images and a luminance image with the image capture device;

generating a clear sky polarization angle image, which indicates the polarization angle of a clear sky part of the luminance image, based on the polarization images and the luminance image;

estimating the direction of the image capture device by reference to the clear sky polarization angle image; and to output the information about the direction of the optical axis of the image capture device.

25. A non-transitory computer-readable medium having stored thereon a program defined for an image capture device direction detector that detects the direction of the optical axis of an image capture device during at the time of shooting by using a celestial polarization pattern, the program being defined so as when executed by a computer causes the computer to execute the steps of:

capturing polarization images and a luminance image with the image capture device;

generating a clear sky polarization angle image, which indicates the polarization angle of a clear sky part of the luminance image, based on the polarization images and the luminance image;

estimating the direction of the optical axis of the image capture device by reference to the clear sky polarization angle image; and to output the information about the direction of the optical axis of the image capture device.

* * * * *